(12) United States Patent
Branagan et al.

(10) Patent No.: US 10,960,487 B2
(45) Date of Patent: Mar. 30, 2021

(54) WELDABILITY IMPROVEMENTS IN ADVANCED HIGH STRENGTH STEEL

(71) Applicant: The NanoSteel Company, Inc., Providence, RI (US)

(72) Inventors: Daniel James Branagan, Idaho Falls, ID (US); Alla V. Sergueeva, Idaho Falls, ID (US); Brian E. Meacham, Idaho Falls, ID (US); Andrew E. Frerichs, Idaho Falls, ID (US); Sheng Cheng, Idaho Falls, ID (US); Scott T. Larish, Idaho Falls, ID (US); Grant G. Justice, Idaho Falls, ID (US); Andrew T. Ball, Reno, NV (US); Craig S. Parsons, Lake Orion, MI (US); Logan J. Tew, Idaho Falls, ID (US); Scott T. Anderson, Idaho Falls, ID (US); Kurtis R. Clark, Idaho Falls, ID (US); Taylor L. Giddens, Idaho Falls, ID (US); Tad V. Machrowicz, Ortonville, MI (US); Jonathan M. Cischke, Bloomfield Hills, MI (US)

(73) Assignee: United States Steel Corporation, Pittsburgh, PA (US)

(*) Notice: Subject to any disclaimer, the term of this patent is extended or adjusted under 35 U.S.C. 154(b) by 140 days.

(21) Appl. No.: 16/134,005

(22) Filed: Sep. 18, 2018

(65) Prior Publication Data
US 2019/0084074 A1 Mar. 21, 2019

Related U.S. Application Data

(60) Provisional application No. 62/722,482, filed on Aug. 24, 2018, provisional application No. 62/561,474, filed on Sep. 21, 2017.

(51) Int. Cl.
*B23K 11/00* (2006.01)
*B23K 11/16* (2006.01)
(Continued)

(52) U.S. Cl.
CPC ........ *B23K 11/166* (2013.01); *B23K 11/0026* (2013.01); *B23K 11/08* (2013.01);
(Continued)

(58) Field of Classification Search
CPC ... B23K 11/166; B23K 11/0022; C22C 38/02; C22C 38/04; C22C 38/08; C22C 38/16; C22C 38/18
See application file for complete search history.

(56) References Cited

U.S. PATENT DOCUMENTS 4,738,301 A * 4/1988 Ueshima .................. C21D 1/84
148/541
5,729,463 A 3/1998 Koenig et al.
(Continued)

FOREIGN PATENT DOCUMENTS

EP 3147065 3/2017

OTHER PUBLICATIONS

International Search Report and Written Opinion dated Nov. 26, 2018 issued in related International Patent Application No. PCT/US2018/05620.

*Primary Examiner* — Scott R Kastler
(74) *Attorney, Agent, or Firm* — Alan G. Towner; Leech Tishman Fuscaldo & Lampl

(57) ABSTRACT

This disclosure relates to weldability of steel alloys that provide weld joints which retain hardness values in a heat affected zone adjacent to a fusion zone and which also have improved resistance to liquid metal embrittlement due to the presence of zinc coatings.

29 Claims, 47 Drawing Sheets

Summary of self-to-self welding of alloys herein.

(51) Int. Cl.

| | | |
|---|---|---|
| *C22C 38/02* | (2006.01) | |
| *C22C 38/04* | (2006.01) | |
| *C22C 38/08* | (2006.01) | |
| *C22C 38/18* | (2006.01) | |
| *C23C 2/06* | (2006.01) | |
| *C22C 38/16* | (2006.01) | |
| *B23K 11/24* | (2006.01) | |
| *B23K 15/00* | (2006.01) | |
| *B23K 11/11* | (2006.01) | |
| *C21D 9/50* | (2006.01) | |
| *B23K 26/32* | (2014.01) | |
| *B23K 26/24* | (2014.01) | |
| *B23K 26/22* | (2006.01) | |
| *C21D 9/46* | (2006.01) | |
| *B23K 11/08* | (2006.01) | |
| *B23K 26/322* | (2014.01) | |
| *C23C 2/28* | (2006.01) | |
| *C21D 8/02* | (2006.01) | |
| *C23C 2/26* | (2006.01) | |
| *B23K 103/04* | (2006.01) | |
| *B23K 101/00* | (2006.01) | |
| *B23K 101/34* | (2006.01) | |
| *B23K 101/18* | (2006.01) | |

(52) U.S. Cl.
CPC ............. *B23K 11/115* (2013.01); *B23K 11/16* (2013.01); *B23K 11/241* (2013.01); *B23K 15/008* (2013.01); *B23K 15/0046* (2013.01); *B23K 15/0053* (2013.01); *B23K 15/0093* (2013.01); *B23K 26/22* (2013.01); *B23K 26/24* (2013.01); *B23K 26/32* (2013.01); *B23K 26/322* (2013.01); *C21D 8/021* (2013.01); *C21D 9/46* (2013.01); *C21D 9/50* (2013.01); *C21D 9/505* (2013.01); *C22C 38/02* (2013.01); *C22C 38/04* (2013.01); *C22C 38/08* (2013.01); *C22C 38/16* (2013.01); *C22C 38/18* (2013.01); *C23C 2/06* (2013.01); *C23C 2/26* (2013.01); *C23C 2/28* (2013.01); *B23K 2101/006* (2018.08); *B23K 2101/18* (2018.08); *B23K 2101/34* (2018.08); *B23K 2103/04* (2018.08)

(56) References Cited

U.S. PATENT DOCUMENTS

| | | |
|---|---|---|
| 5,820,703 A | 10/1998 | Suzuki et al. |
| 2003/0221752 A1 | 12/2003 | Utsumi et al. |
| 2004/0025979 A1 | 2/2004 | Bruckner et al. |
| 2007/0190255 A1 | 8/2007 | Branagan et al. |
| 2017/0137911 A1 | 5/2017 | Gaganov et al. |
| 2019/0084074 A1* | 3/2019 | Branagan ............. B23K 11/115 |

* cited by examiner

Step 1: A metal alloy comprising at least 70 atomic % iron and at least four or more elements selected from Si, Mn, Cr, Ni, Cu, or C, melting said alloy, cooling at a rate of < 250 K/s, and solidifying to a thickness of 25 mm up to 500 mm;

Step 2: processing said alloy into sheet form with thickness of up to 5.0 mm with the sheet having a total elongation 10.0 to 75.0 %, yield strength 250 to 1200 MPa, tensile strength 700 to 1700 MPa, and hardness H1;

Step 3: welding said sheet self-to-self by heating and forming: (i) a fusion zone in said sheet at a temperature above the alloy Tm; and (ii) a heat affected zone in said sheet at a temperature T2 that is less than the alloy Tm;

Step 4: cooling said sheet and forming a hardness H2 in said heat affected zone of the sheet wherein H2 = H1 +/- 100 HV.

FIG. 2  Summary of self-to-self welding of alloys herein.

Step 1 — A metal alloy comprising at least 70 atomic % iron and at least four or more elements selected from Si, Mn, Cr, Ni, Cu, or C, melting said alloy, cooling at a rate of < 250 K/s, and solidifying to a thickness of 25 mm up to 500 mm;

Step 2 — processing said alloy into sheet form with thickness up to 5.0 mm with the sheet having a total elongation 10.0 to 75.0 %, yield strength 250 to 1200 MPa, tensile strength 700 to 1700 MPa., and hardness H1;

Step 3 — welding said sheet to other steels by heating and forming: (i) a fusion zone in said sheet at a temperature above the alloy Tm; and (ii) a heat affected zone in said sheet at a temperature T2 that is less than the alloy Tm;

Step 4 — cooling said sheet and forming a hardness H3 in said heat affected zone of said sheet wherein H3 = H1 +/- 125 HV.

FIG. 3   Summary of mixed metal welding of alloys herein.

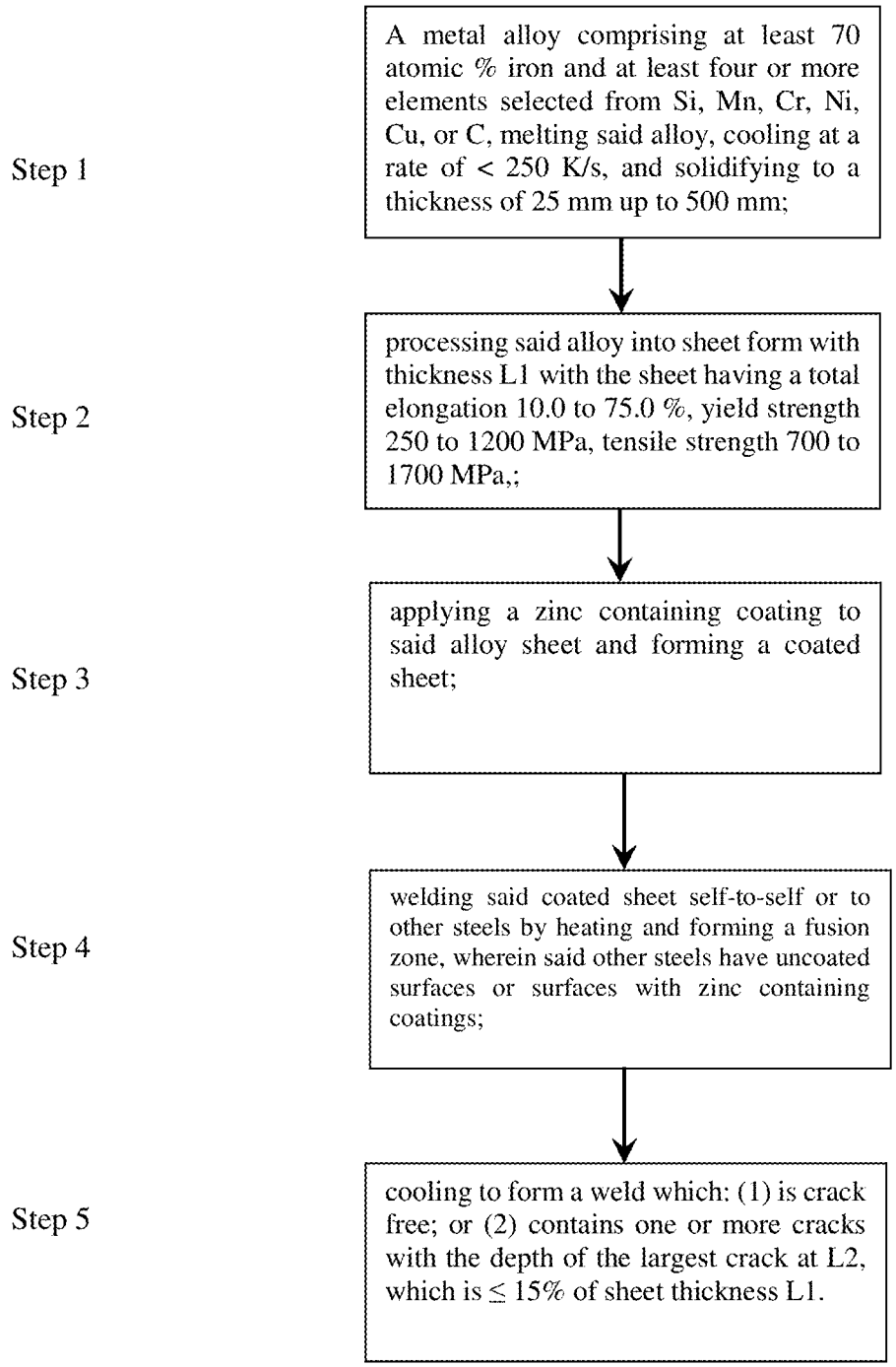
FIG. 4   Summary of welding of alloys herein in a presence of coating.

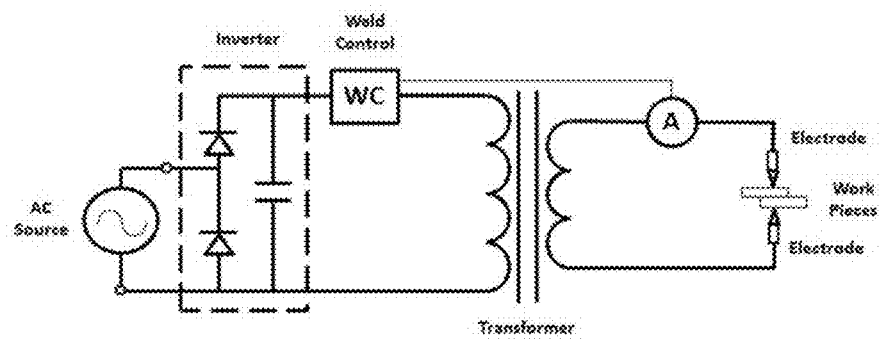
FIG. 5    Schematic illustration of the mid frequency inverter (MFDC) method of spot welding.
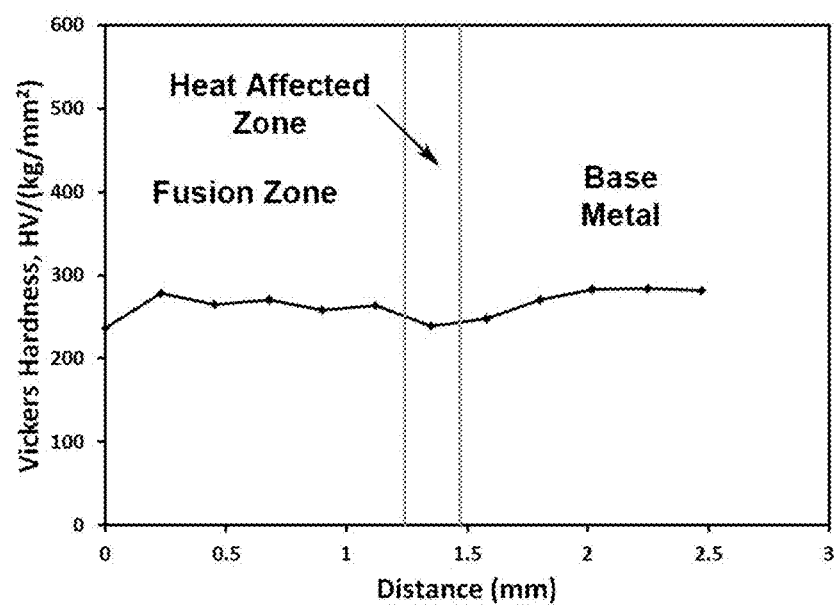
FIG 6

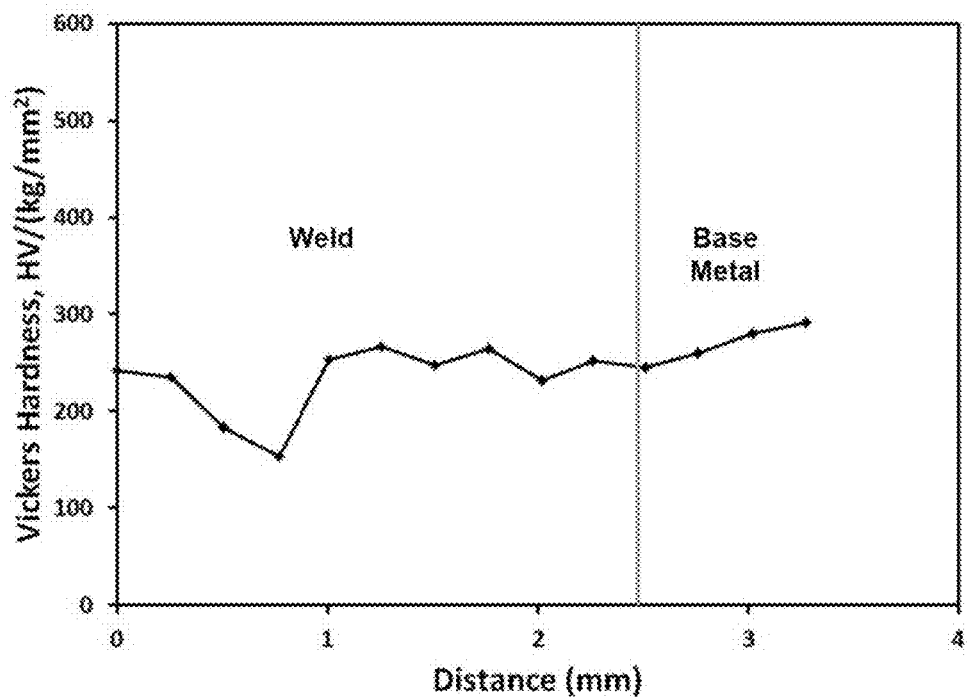
FIG. 35
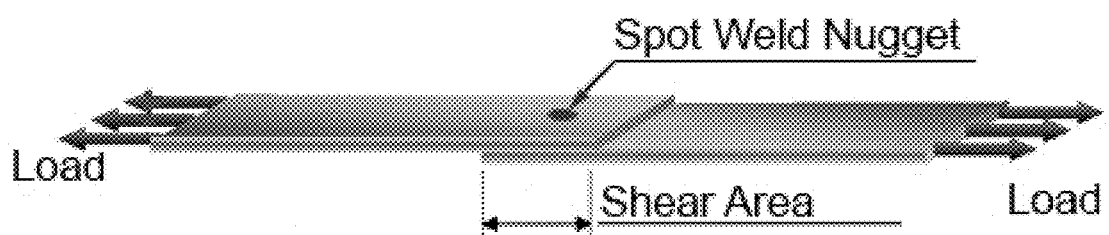
FIG. 36   A schematic illustration of the lap shear testing.

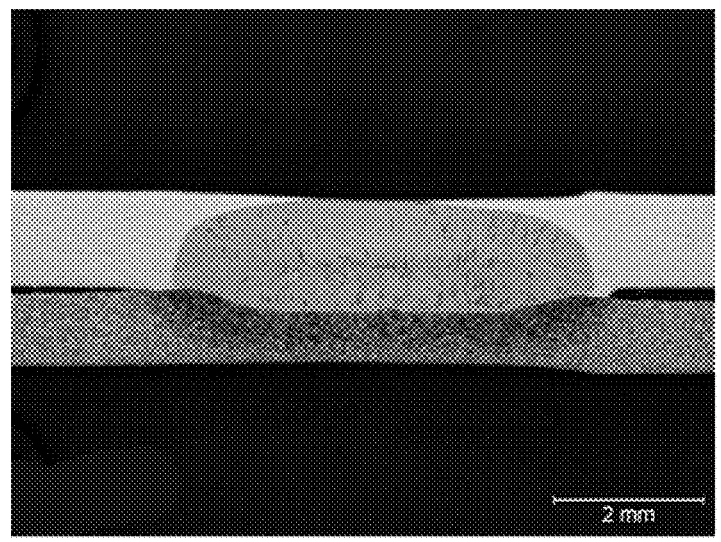
FIG. 52
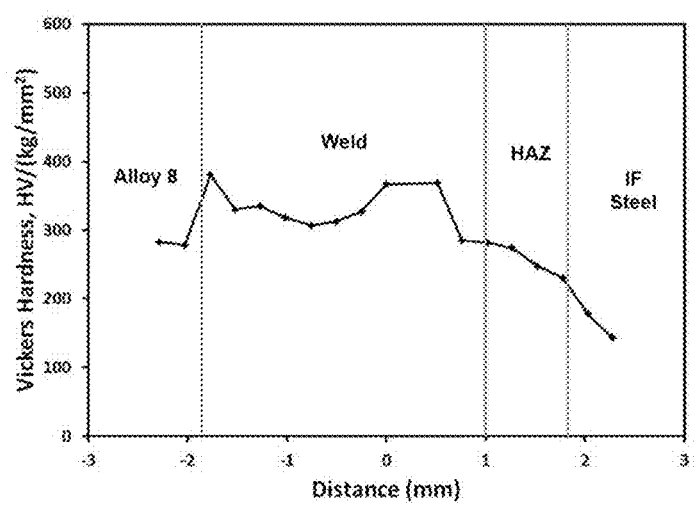
FIG. 53    Microhardness as a function of the distance across the Alloy 8 to IF steel spot weld nugget.

FIG. 59  Microhardness as a function of the distance across the Alloy 8 to DP980 spot weld nugget.

WELDABILITY IMPROVEMENTS IN ADVANCED HIGH STRENGTH STEEL

CROSS REFERENCE TO RELATED APPLICATIONS

This application claims the benefit of U.S. Provisional Application Ser. No. 62/561,474 filed Sep. 21, 2017 and U.S. Provisional Application Ser. No. 62/722,482 filed Aug. 24, 2018.

FIELD OF INVENTION

This disclosure relates to weldability of steel alloys that provide weld joints which retain hardness values in a heat affected zone adjacent to a fusion zone and which also have improved resistance to liquid metal embrittlement due to the presence of zinc coatings.

BACKGROUND

Production of steel continues to increase, with a current US production around 100 million tons per year with an estimated value of $75 billion. Steel utilization in vehicles is also high, with advanced high strength steels (AHSS) currently at 17% and forecast to grow by 300% in the coming years [American Iron and Steel Institute, Profile 2013, Washington, D.C.]. With current market trends and governmental regulations pushing towards higher efficiency in vehicles, AHSS are increasingly being pursued for their ability to provide high strength to mass ratio. The high strength of AHSS allows for a designer to reduce the thickness of a finished part while still maintaining comparable or improved mechanical properties. In reducing the thickness of a part, less mass is needed to attain the same or better mechanical properties for the vehicle thereby improving vehicle fuel efficiency. This allows the designer to improve the fuel efficiency of a vehicle while not compromising on safety.

The joining and bonding of steel is an important consideration for manufacturing processes. Materials are commonly joined self-to-self, to metallic materials, and to non-metallic materials through a variety of methods in manufacturing settings. These joining and bonding methods include but are not limited to the use of structural adhesives, soldering, brazing, and various types of welding. Each of these joining and bonding techniques possess a myriad of sub-types, each with its own applications. For steel in particular, welding techniques are commonly used due to low cycle times, cost, and complexity which is enabling for usage in high volume production settings. In particular, resistance spot welding (RSW) is utilized extensively in the manufacturing process for automobile production with the average American mid-sized car estimated to contain greater than 5000 resistance spot welds. The number of resistance spot welds in automobiles is expected to remain constant or increase in the coming years.

Resistance spot welding is typically performed on sheet material and functions by running a current pulse or pulses between two electrodes and through the materials to be welded after clamping pressure is applied. With current passing through the material, the materials' bulk and surface electrical resistance cause the sheet to undergo resistive heating, rapidly melting the sheet at the point of contact between the sheets. The pool of molten metal grows outward from the sheet surface interface and into both sheet materials until the current pulse or pulses are complete. At this time, the liquid melt pool undergoes rapid cooling and solidification. The weld fusion zone forms between the two sheets from metal that was previously the melt pool, providing a metallurgical bond. Schematic illustration of the typical weld is shown in FIG. 1.

During the current pulse, heat is generated in and around the pool of molten metal that will become the weld fusion zone. In the area that surrounds the weld fusion zone, the metal was exposed to heat although not sufficient heat to melt. Metal directly adjacent to the weld fusion zone is exposed to temperatures that are greater than 90% of the alloy's melting temperature in many cases. Material that is further from the weld fusion zone has decreasing amounts of thermal exposure as a function of its distance from the weld fusion zone. Often, this heat exposure at the temperature range from 400° C. up to the melting point (Tm) results in a change in the microstructure of the metal, and the area in which the change has occurred is known as the heat affected zone (HAZ). In the HAZ, the microstructure changes are often detrimental to the weld. The HAZ is commonly associated with embrittlement effects, grain growth, martensite formation and other microstructure related effects that degrade the mechanical performance of the metal. For instance, commercial dual phase (DP) steels [i.e. steels which consist mainly of ferrite and martensite phases] exhibit a range of HAZ effects where HAZ hardening is often observed near the weld fusion zone. Commercial Transformation Induced Plasticity (TRIP) steels are also known for a marked increase in the hardness of the HAZ as compared to the base metal. The mechanical properties of the weld are also affected by the nature of the HAZ in any given steel correspondingly. The HAZ may affect the maximum tensile strength, bendability, and fatigue lifetime of a weld. The HAZ will affect steels differently, and different welding configurations will result in different HAZ conditions. HAZ has been observed in steel materials welded by various arc welding methods (GMAW, SMAW, GTAW, etc.), gas welding (oxy-fuel welding), various resistance welding methods (spot welding, laser welding, seam welding, etc.).

The HAZ formed as a consequence of the welding process adds another variable to consider during materials selection for automobile parts designers. If the steel cannot be resistance spot welded without the creation of a detrimental HAZ, the steel will likely only have limited uses in automobile markets. As such, steels with smaller heat affected zones or with heat affected zones that exhibit minimal effects on mechanical properties are desirable.

For many applications, there is a requirement for the steel sheet material to be coated to prevent oxidation and rusting of the material. Zinc is not used as an alloying addition to steel but is used to coat the surface of steel since it is anodic to steel and provides effective corrosion protection in a wide variety of environments. Zinc is applied to a steel surface by several techniques including hot dip galvanization, galvanneal, and electrogalvanization. Coated materials present a unique complication to resistance spot welding in the form of liquid metal embrittlement (LME). The basic mechanism of LME in steel involves the presence of one or more galvanized coatings at the weld joint interface. LME is prevalent during welding and first involves the formation of molten zinc. During welding, in the weld fusion zone, the steel is melted, which typically may occur from 1425 to 1540° C. Pure zinc melts at 420° C. and depending on the amount of alloying which occurs during the galvanization process and the specific chemistry of steel which is being coated, the resulting zinc coating has a melting point from 420 to 650° C. Thus, molten zinc will form during the welding process. The second step to LME is zinc penetration into the base steel. This occurs through diffusion and is assisted through high diffusion rate pathways such as grain boundaries, with much higher diffusivity and penetration occurring in larger grained microstructures. The third step of LME is thermal expansion and contraction during cooling which results in initial crack formation, often along the zinc coated grain boundaries and resulting propagation. The presence of the LME cracks causes an embrittlement of the weld leading to early weld failure in service.

SUMMARY

A method for joining high strength sheet steel comprising:
a. supplying a metal alloy comprising at least 70 atomic % iron and at least four or more elements selected from Si, Mn, Cr, Ni, Cu or C and melting said alloy and cooling at a rate of <250 K/s and solidifying to a thickness of 25 mm up to 500 mm and forming an alloy having a melting point Tm;
b. processing said alloy into sheet form with thickness up to 5.0 mm with the sheet exhibiting a total elongation 10.0 to 75.0%, a yield strength 250 to 1200 MPa, a tensile strength 700 to 1700 MPa, and a hardness H1;
c. welding said sheet self-to-self by heating and forming: (i) a fusion zone in said sheet at a temperature above the alloy Tm; and (ii) a heat affected zone in said sheet at a temperature T2 that is less than the alloy Tm; and
d. cooling said sheet and forming a hardness H2 in said heat affected zone of the sheet wherein H2=H1+/−100 HV.

A method for joining high strength sheet steel with other steel grades comprising:
a. supplying a metal alloy comprising at least 70 atomic % iron and at least four or more elements selected from Si, Mn, Cr, Ni, Cu or C and melting said alloy and cooling at a rate of <250 K/s and solidifying to a thickness of 25 mm up to 500 mm and forming an alloy having a melting point Tm;
b. processing said alloy into sheet form with thickness up to 5.0 mm with the sheet exhibiting a total elongation 10.0 to 75.0%, a yield strength 250 to 1200 MPa, a tensile strength 700 to 1700 MPa, and a hardness H1;
c. welding said sheet to other steels by heating and forming: (i) a fusion zone in said sheet at a temperature above the alloy Tm; and (ii) a heat affected zone in said sheet at a temperature T2 that is less that the alloy Tm; and
d. cooling said sheet and forming a hardness H3 in said heat affected zone of said sheet wherein H3=H1+/−125 HV.

A method for joining a coated high strength sheet steel comprising:
a. supplying a metal alloy comprising at least 70 atomic % iron and at least four or more elements selected from Si, Mn, Cr, Ni, Cu or C and melting said alloy and cooling at a rate of <250 K/s and solidifying to a thickness of 25 mm up to 500 mm and forming an alloy having a melting point Tm;
b. processing said alloy into sheet form with thickness L1, with the sheet exhibiting a total elongation 10.0 to 75.0%, a yield strength 250 to 1200 MPa, a tensile strength 700 to 1700 MPa;
c. applying a zinc containing coating to said alloy sheet and forming a coated sheet;
d. welding said coated sheet self-to-self or to other steels by heating and forming a fusion zone, wherein said other steels have uncoated surfaces or surfaces with zinc containing coatings; and
e. cooling to form a weld which: (1) is crack free; or (2) contains one or more cracks with the depth of the largest crack at L2, which is ≤15% of sheet thickness L1.

BRIEF DESCRIPTION OF THE DRAWINGS

The detailed description below may be better understood with reference to the accompanying FIGS. which are provided for illustrative purposes and are not to be considered as limiting any aspect of this invention.

FIG. 2 Summary of self-to-self welding of alloys herein.

FIG. 3 Summary of mixed metal welding of alloys herein.

FIG. 4 Summary of welding of alloys herein in the presence of a coating.

FIG. 5 Schematic illustration of the mid frequency inverter (MFDC) method of spot welding.

FIG. 6 Alloy 1 microhardness measurement data as a function of distance from the center of the weld nugget.

FIG. 35 Microhardness as a function of the distance across the boundary between the fusion zone and the base metal in the sample welded at parameters corresponding to Point 6 of the weld lobe for Alloy 8 in FIG. 23.

FIG. 36 A schematic illustration of the lap shear testing.

FIG. 52 A micrograph of the spot weld nugget cross section of Alloy 8 (top) welded to IF steel (bottom).

FIG. 53 Microhardness as a function of the distance across the Alloy 8 to IF steel spot weld nugget.

DETAILED DESCRIPTION

Figure 1:
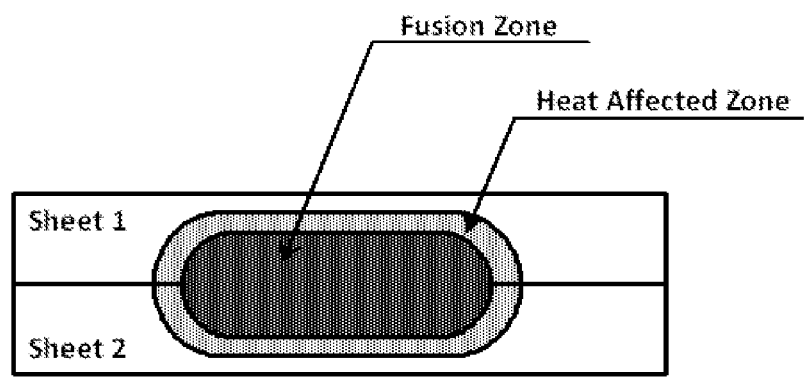
FIG. 1 Schematic illustration of the typical weld nugget formed at spot welding showing base material (sheet), HAZ, and fusion zone.
Figure 7:
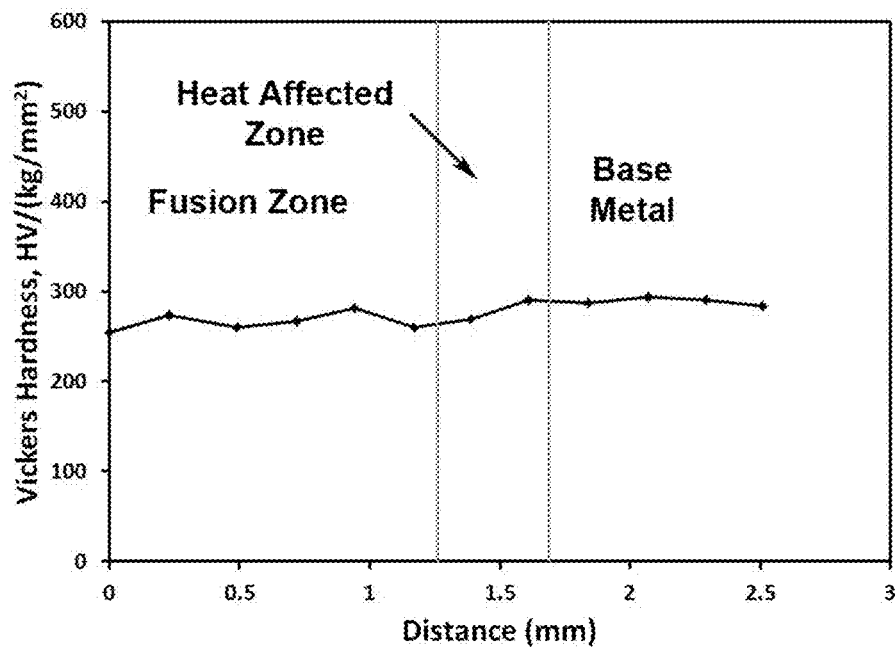
FIG. 7 Alloy 2 microhardness measurement data as a function of distance from the center of the weld nugget.
Figure 8:
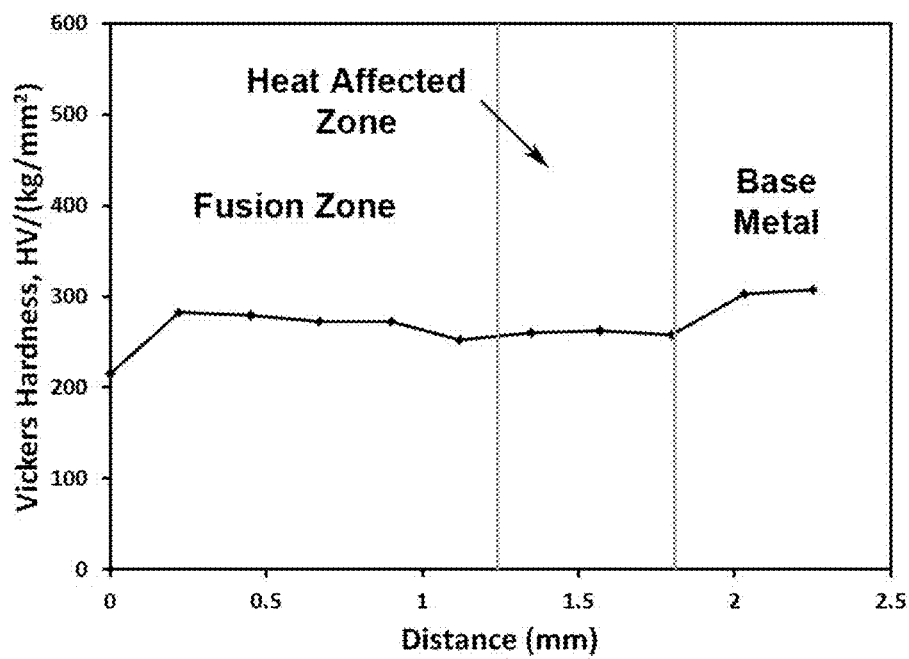
FIG. 8 Alloy 3 microhardness measurement data as a function of distance from the center of the weld nugget.
Figure 9:
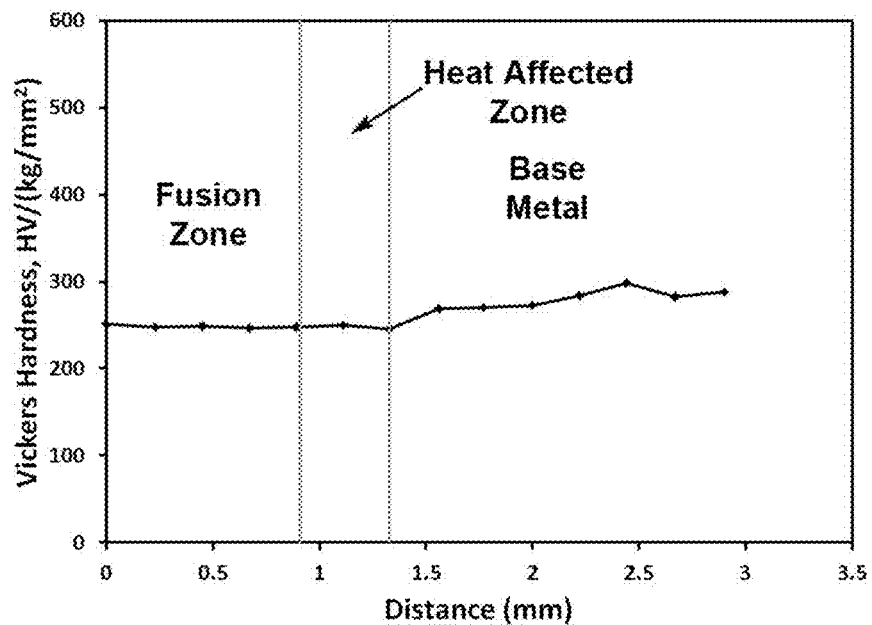
FIG. 9 Alloy 4 microhardness measurement data as a function of distance from the center of the weld nugget.
Figure 10:
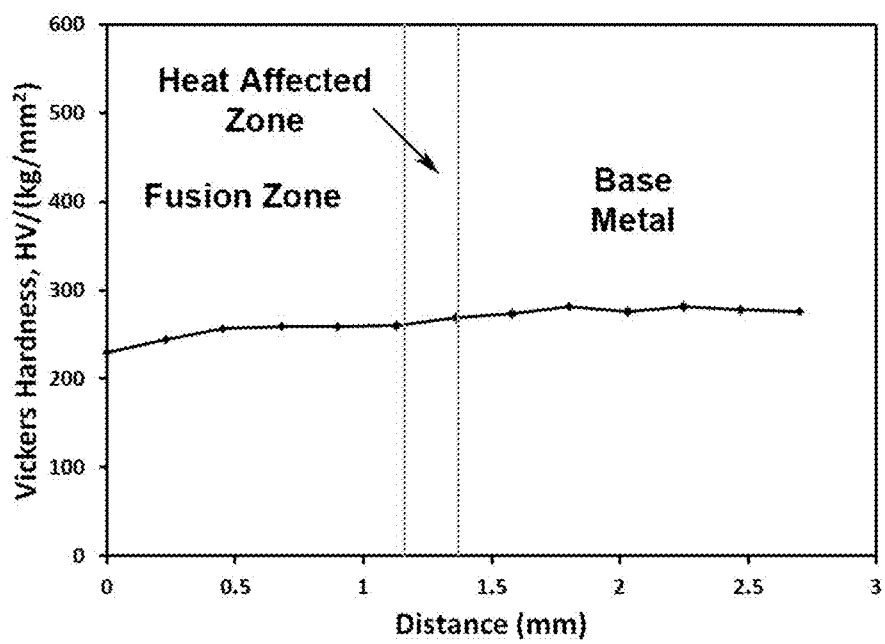
FIG. 10 Alloy 5 microhardness measurement data as a function of distance from the center of the weld nugget.
Figure 11:
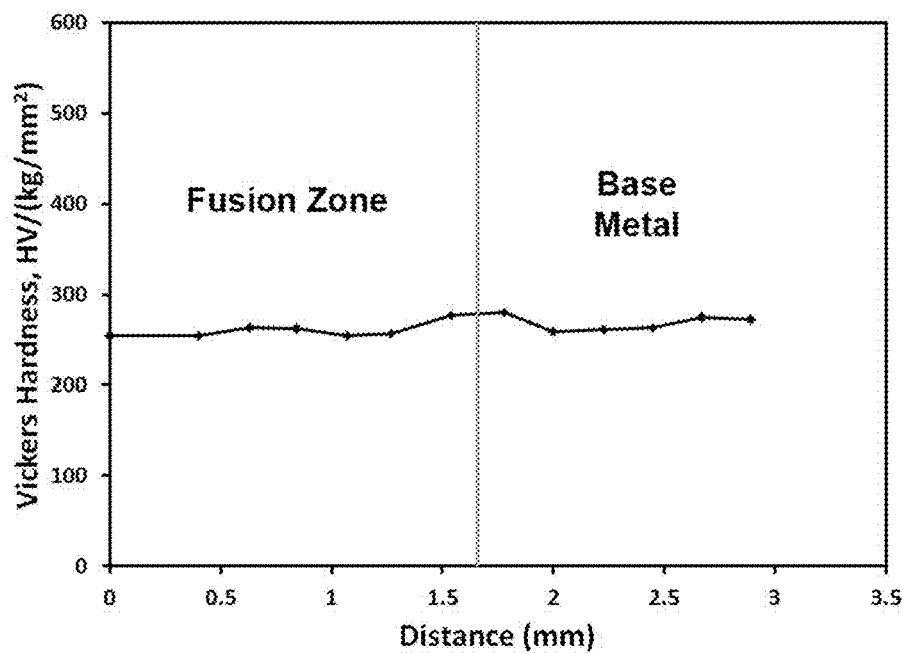
FIG. 11 Alloy 6 microhardness measurement data as a function of distance from the center of the weld nugget.
Figure 12:
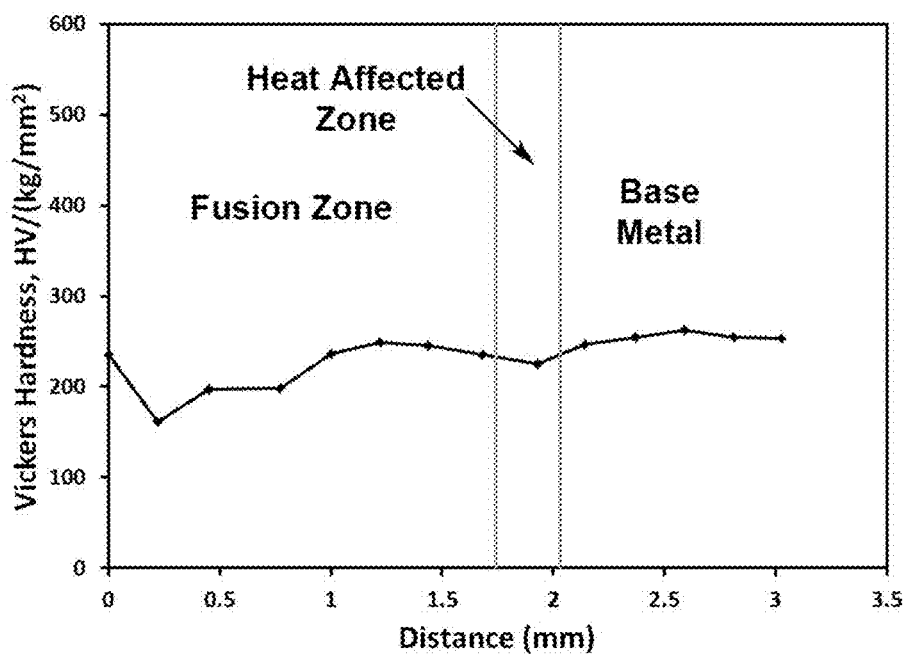
FIG. 12 Alloy 7 microhardness measurement data as a function of distance from the center of the weld nugget.
Figure 13:
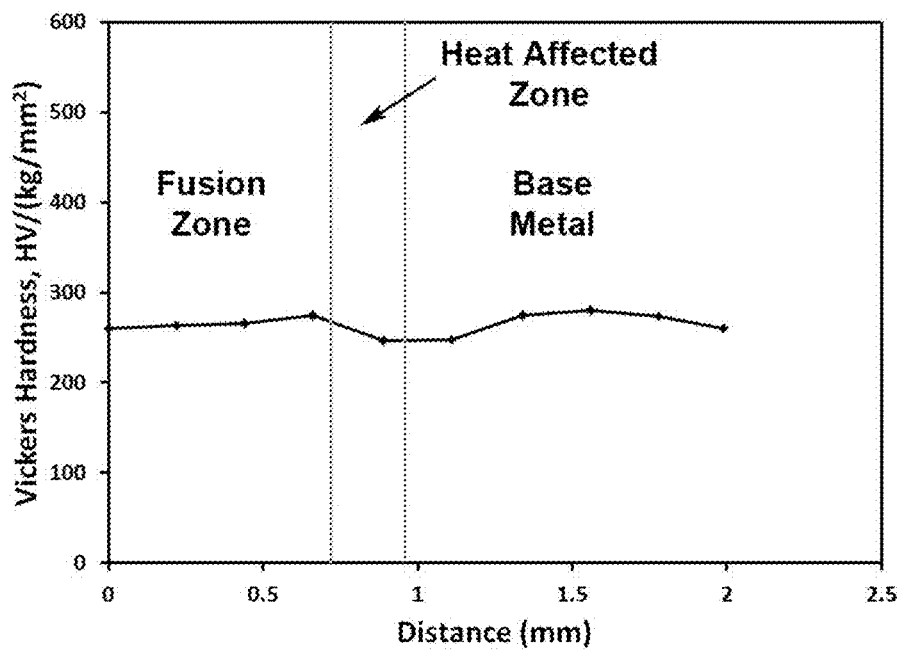
FIG. 13 Alloy 8 microhardness measurement data as a function of distance from the center of the weld nugget.
Figure 14:
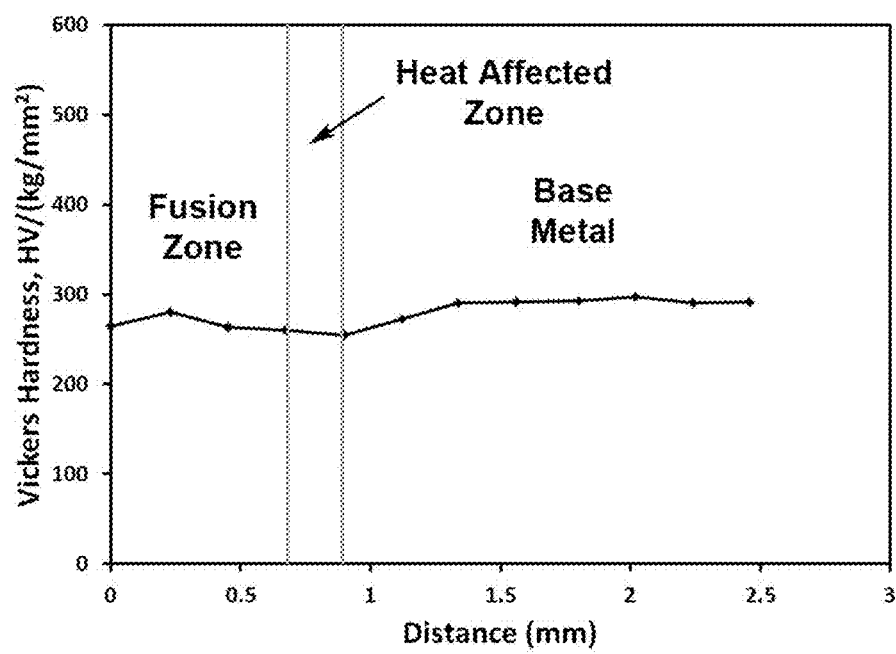
FIG. 14 Alloy 9 microhardness measurement data as a function of distance from the center of the weld nugget.
Figure 15:
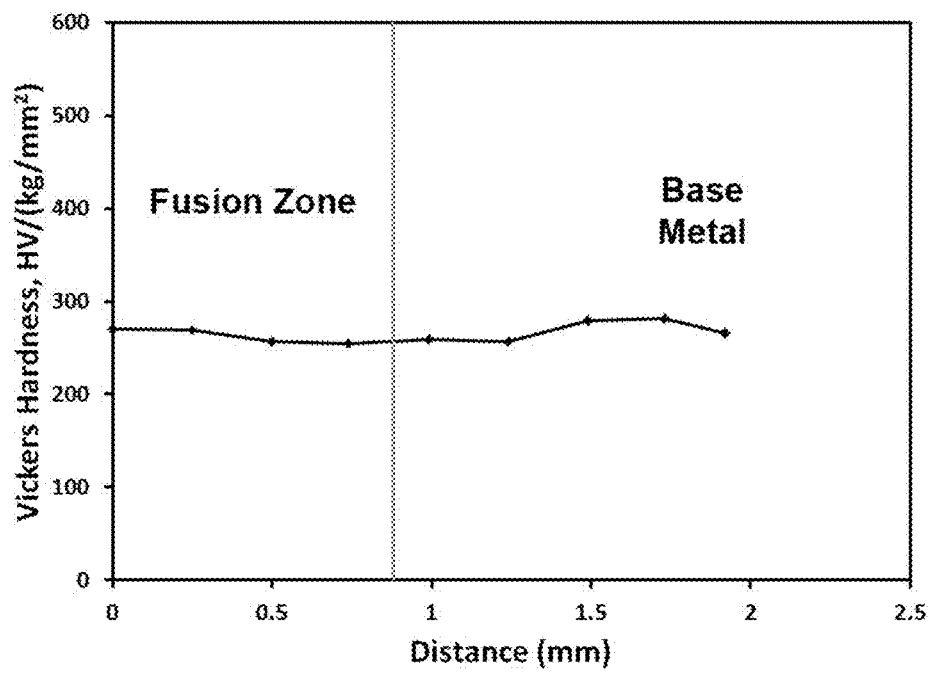
FIG. 15 Alloy 10 microhardness measurement data as a function of distance from the center of the weld nugget.
Figure 16:
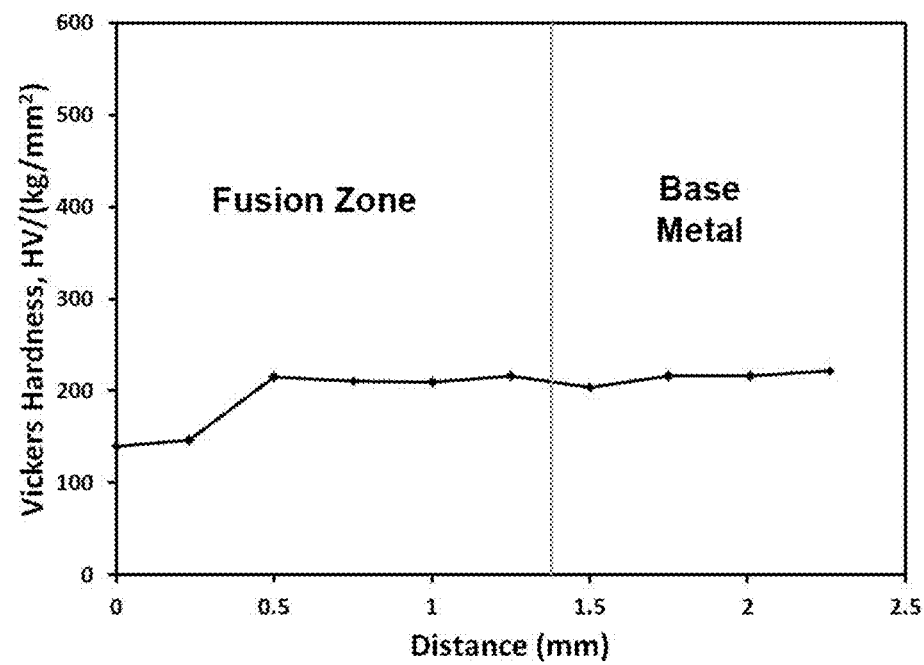
FIG. 16 Alloy 11 microhardness measurement data as a function of distance from the center of the weld nugget.
Figure 17:
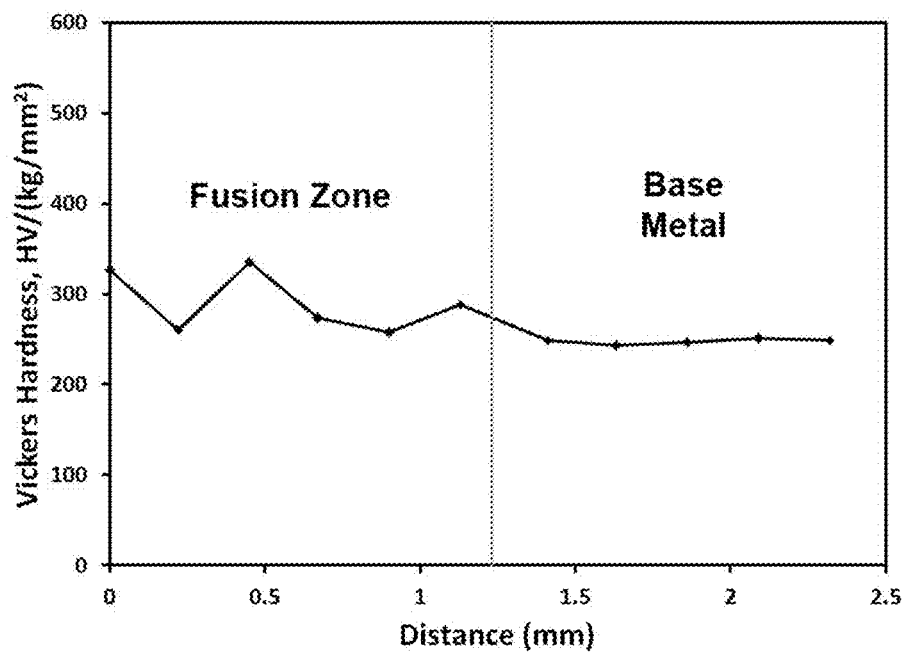
FIG. 17 Alloy 12 microhardness measurement data as a function of distance from the center of the weld nugget.
Figure 18:
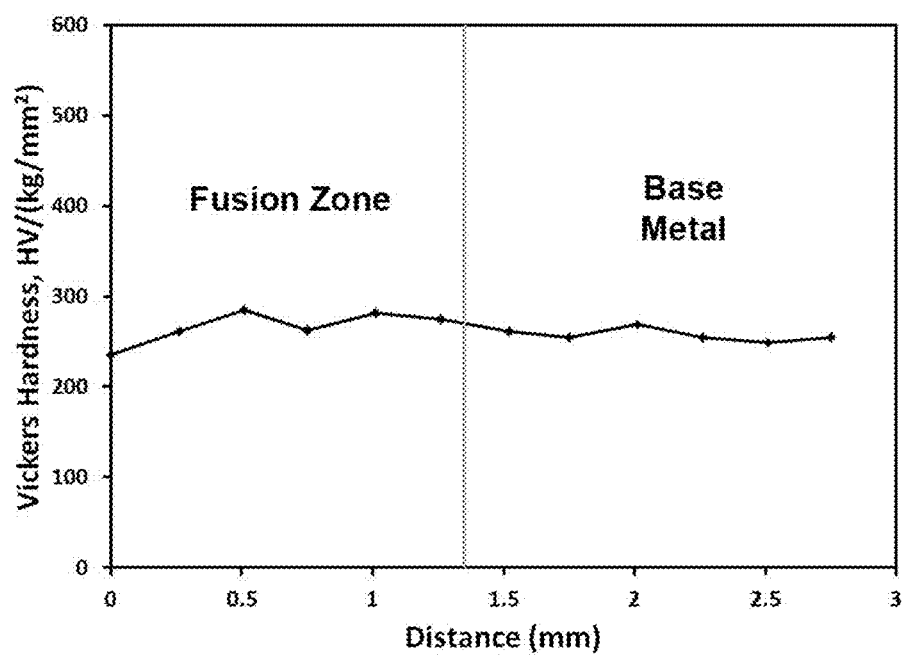
FIG. 18 Alloy 13 microhardness measurement data as a function of distance from the center of the weld nugget.
Figure 19:
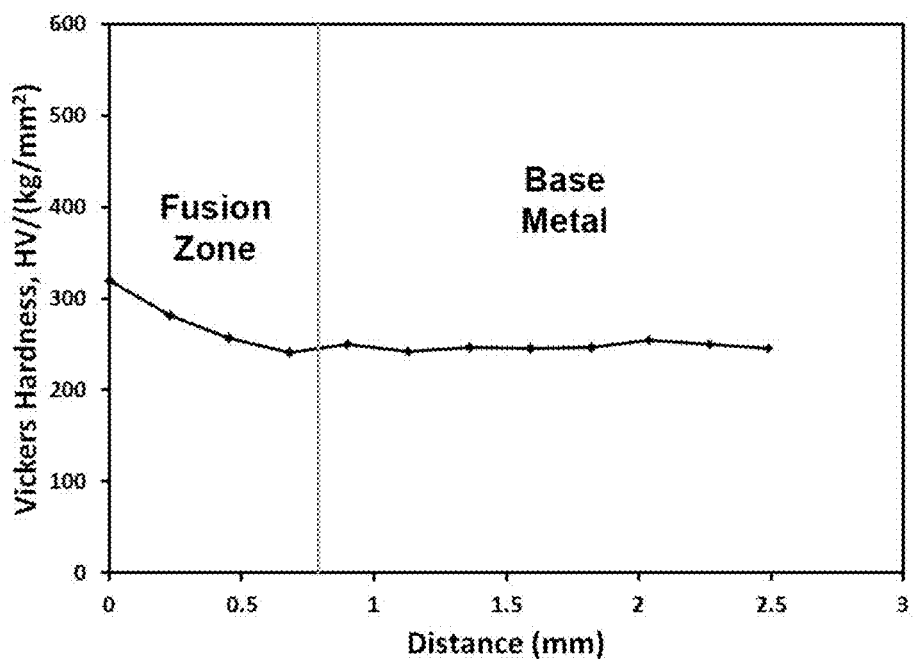
FIG. 19 Alloy 14 microhardness measurement data as a function of distance from the weld nugget center.
Figure 20:
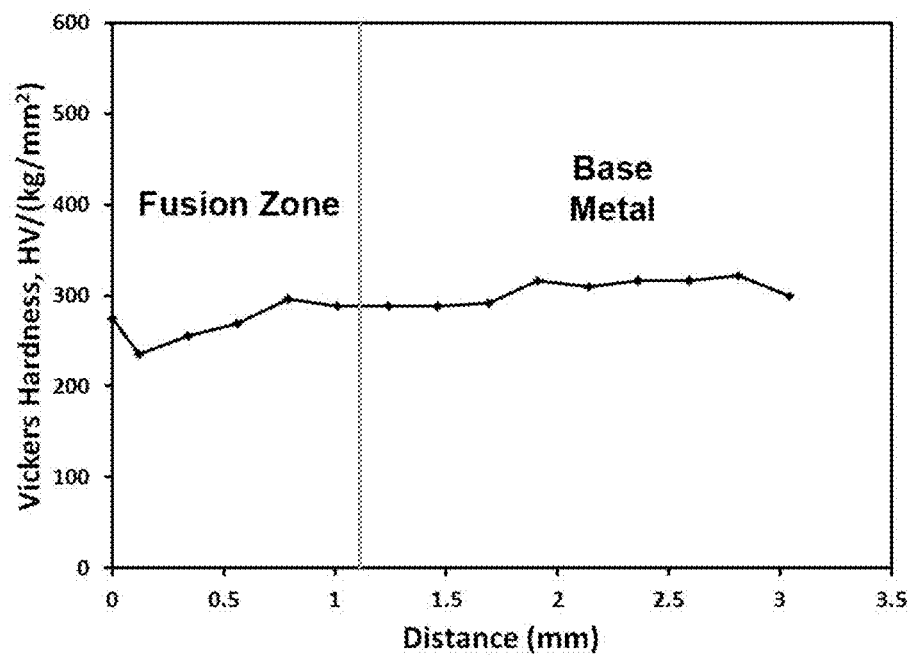
FIG. 20 Alloy 15 microhardness measurement data as a function of distance from the weld nugget center.
Figure 21:
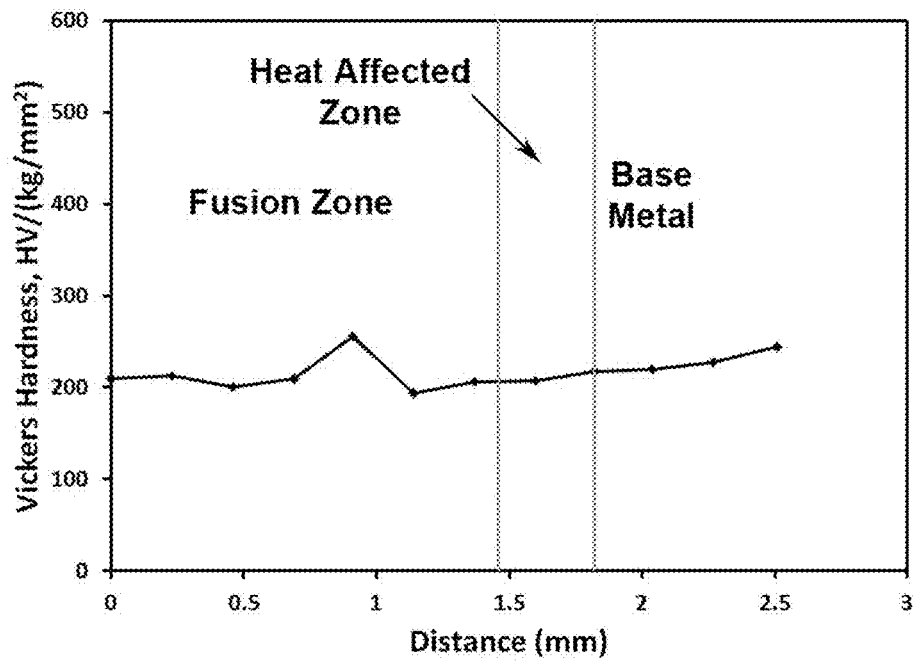
FIG. 21 Alloy 16 microhardness measurement data as a function of distance from the weld nugget center.
Figure 22:
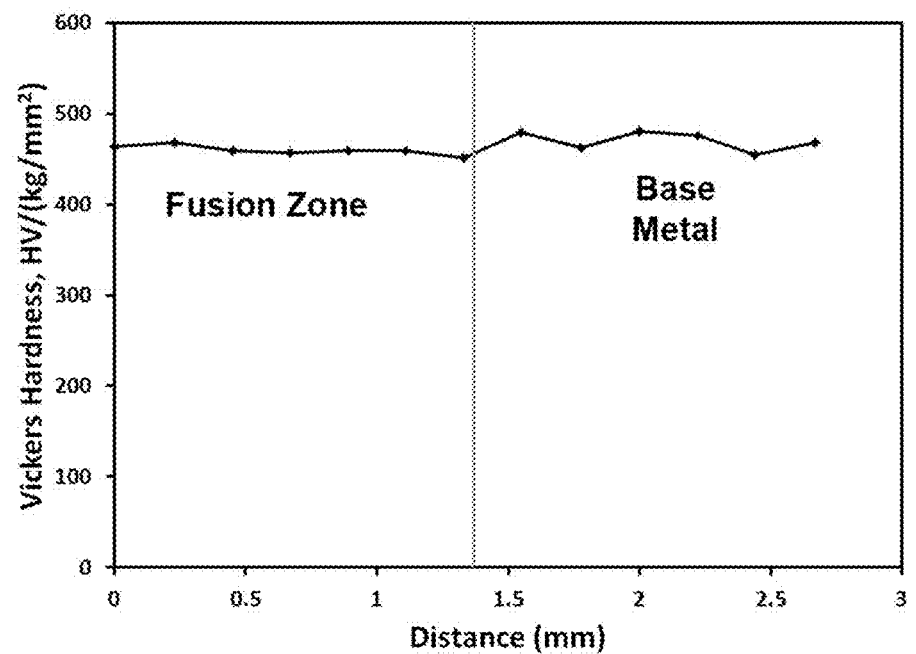
FIG. 22 Alloy 17 microhardness measurement data as a function of distance from the weld nugget center.

Alloys herein can be produced in a sheet form by different methods of continuous casting including but not limited to belt casting, thin strip/twin roll casting, thin slab casting, and thick slab casting with achievement of advanced property combinations by subsequent post-processing. After processing into a sheet form as a hot band or cold rolled sheet with or without annealing with thickness up to 5.0 mm, preferably in the range of 0.1 mm to 5.0 mm, the alloys herein have a total elongation 10.0 to 75.0%, a yield strength 250 to 1200 MPa, a tensile strength 700 to 1700 MPa, and a Vickers hardness in a range from 150 to 650 HV. The alloys are also such that they have a Tm from 1250° C. to 1650° C. and a hardness value (H1) from 150 HV to 650 HV.

Welding without Formation of Deleterious Heat Affected Zone (HAZ)

FIG. 2 summarizes the welding of alloys herein to themselves involving material melting and re-solidification with the identified retention of hardness values. In Step 1 in FIG. 2, the starting condition is to supply a metal alloy. This metal alloy comprises at least 70 atomic % iron and at least four or more elements selected from Si, Mn, Cr, Ni, Cu, or C. The alloy chemistry is melted, cooled at a rate of <250 K/s, and solidified to a thickness of 25 mm and up to 500 mm. The casting process can be done in a wide variety of processes including ingot casting, bloom casting, continuous casting, thin slab casting, thick slab casting, belt casting etc. Preferred methods would be continuous casting in sheet form by thin slab casting or thick slab casting.

To produce alloys herein in a sheet form, the cast processes can vary widely depending on specific manufacturing routes and specific targeted goals. As an example, consider thick slab casting as one process route to get to sheet product. The alloy would be cast going through a water cooled mold typically in a thickness range of 150 to 350 mm in thickness that typically processed through a roughing mill hot roller into a transfer bar slab of 15 to 150 mm in thickness and through the finishing mill into a hot band with thickness of 1.5 to 5.0 mm. Another example would be to preferably process the cast material through a thin slab casting process. In this case, after casting typically forms 25 to 150 mm in thickness by going through a water cooled mold, the newly formed slab goes directly to hot rolling without cooling down and the strip is rolled into hot band coils with typical thickness from 1.5 to 5.0 mm in thickness. Note that ingot casting would be similar to the examples above but higher thickness might be cast typically from 200 to 500 mm thick followed by hot rolling using roughing mills such as Steckel mills where the ingot can be continuously reduced in thickness followed by final rolling through finishing hot rolling mills.

Step 2 in FIG. 2 corresponds to sheet production from alloys herein with thickness up to 5.0 mm, preferably 0.1 mm to 5.0 mm. The processing of the cast material in Step 1 into one or a plurality of sheet forms can be preferably done by hot rolling forming a hot band. Produced hot band can be further processed towards smaller gauges by cold rolling that can be applied at various reductions per pass, variable number of passes and in different mills including tandem mills, Z-mills, and reversing mills. Preferably cold rolled thickness would be 0.5 mm to 5.0 mm thick. Preferably, the cold rolled material is annealed to restore the ductility lost from the cold rolling process either partially or completely. Preferably, sheet material from alloys herein, at a thickness of up to 5.0 mm, or preferably has a total elongation 10.0 to 75.0%, yield strength 250 to 1200 MPa, tensile strength 700 to 1700 MPa, and Vickers hardness (H1) ranging from 150 to 650 HV.

Alloys herein in a sheet form from Step 2 are welded and joined self-to-self by heating to a temperature T1 that is above the Tm of the alloy with formation of the fusion zone. T1 may preferably have a value of ≥1250° C. and less than 2500° C. The sheet material adjacent to the fusion zone is exposed to a temperature T2 which is less than Tm (Step 3, FIG. 2) which defines the Heat Affected Zone (HAZ). Reference to welding self-to-self should be understood as welding and joining two portions of the same identified alloy together (i.e. a metal alloy comprising at least 70 atomic % iron and at least four or more elements selected from Si, Mn, Cr, Ni, Cu or C and exhibiting a total elongation 10.0 to 75.0%, a yield strength 250 to 1200 MPa, a tensile strength 700 to 1700 MPa). Accordingly, self-to-self may include welding one portion of an alloy sheet to another portion of the same sheet, or welding two alloy sheets having the aforementioned characteristics. In addition, the HAZ is therefore reference to that portion of sheet material which experiences a temperature rise T2 up to but not including the Tm of the alloy. Such temperature rise T2 in the HAZ can be ≥400° C. and less than the melting temperature Tm of the alloy. The alloy in the HAZ upon cooling is now still capable of indicating a hardness value H2 that is within +/−100 HV of the alloy's original hardness H1. Step 4, FIG. 2). H2 itself may preferably have a value from 50 HV to 750 HV.

Case Examples 1 through 4 herein show the control of the hardness herein (i.e. H2=H1+/−100 HV after resistance spot welding involving alloy melting, fusion zone formation and temperature exposure of the material adjacent to fusion zone. Without being bound by any particular theory, this is believed to be due to the chemistry and phase stability of the alloys herein, which result in microstructures where austenite is the dominant phase (i.e. >50 volume %) in the initial sheet material and also the dominant phase (i.e. >50 volume %) in the weld fusion zone and HAZ.

FIG. 3 summarizes the welding of the alloys herein to other steels involving material melting and re-solidification. Step 1 and Step 2 are identical to that described above in relation to FIG. 2. The sheet is first formed with thickness of up to 5.0 mm, more preferably 0.1 mm to 5.0 mm, and having a total elongation 10.0 to 75.0%, yield strength 250 to 1200 MPa, tensile strength 700 to 1700 MPa, and Vickers hardness H1 ranging from 150 to 650 HV. The alloys in sheet form from Step 2 (FIG. 3) are then joined to other steels by heating to a temperature above Tm with formation of fusion zone. The sheet material adjacent to the fusion zone is exposed to a temperature T2 which is less than Tm (Step 3, FIG. 3) which again defines the Heat Affected Zone (HAZ). Reference to other steels should be understood as welding and joining the sheet material to a metal alloy that does not comprise a metal alloy comprising at least 70 atomic % iron and at least four or more elements selected from Si, Mn, Cr, Ni, Cu or C and exhibiting a total elongation 10.0 to 75.0%, a yield strength 250 to 1200 MPa, a tensile strength 700 to 1700 MPa. As above, the HAZ is therefore reference to that portion of sheet material which experiences a temperature rise T2 up to but not including the Tm of the alloy. Such temperature rise T2 in the HAZ is ≥400° C. and less than the melting temperature Tm of the alloy. Preferably T2 has a value of ≤400° C. and <1250° C. The alloy in the HAZ upon cooling is now still capable of indicating a hardness value H3 that is within +/−120 HV of the alloy's original hardness H1. H1 is again contemplated to preferably fall in the range of 150 HV to 650 HV and H3 is contemplated to have a value from 25 HV to 775 HV.

Case Examples 5 through 7 show such control of the hardness herein (i.e. H3=H1+/−125 HV. when the alloys are welded. Without being bound by any particular theory, it is well known that diffusivity increases as a function of temperature and is even higher in the liquid phase. Thus, during welding, diffusion is likely to occur in the weld HAZ and weld fusion zone. In conventional steels, this may result in the formation of brittle phases which are often harder creating high thickness HAZ which may be revealed by microhardness traverses. However, in the alloys herein, the austenite stability achieved means that during the weld process, austenite remains the dominant phase.

Welding without Formation of Deleterious Liquid Metal Embrittlement (LME)

The alloys herein based on LME welding trials, indicate improved resistance to LME crack formation (Case Example 8). The welding of the alloys herein with resistance to LME are illustrated in FIG. 4. Step 1 and Step 2 are similar to that described above in relation to FIG. 2 and FIG. 3. Once the sheet is formed with thickness L1 (up to 5.0 mm or more preferably 0.1 mm to 5.0 mm) having a total elongation 10.0 to 75.0%, yield strength 250 to 1200 MPa, and tensile strength 700 to 1700 MPa, a zinc containing coating can be applied. The coating may be preferably applied to the alloy sheet herein by galvannealing, galvanizing, metallizing, or electrogalvanizing forming a coated sheet (Step 3, FIG. 4). The zinc containing coating may have a thickness of 1.0 μm to 50.0 μm and contain 50% by weight or more of Zn. The coated sheets from alloys herein with one or both coated surfaces can then be welded and joined self-to-self or to other steels with zinc containing coatings or uncoated surfaces by heating to a temperature above Tm with formation of fusion zone (Step 4, FIG. 4) followed by cooling to form a weld which: (a) is crack free; or (b) contains one or more cracks with the depth of the largest crack at L2, which is ≤15% of sheet thickness L1 (Step 5, FIG. 4). L2 itself may preferably have a value of 75 μm to 1500 μm.

As liquid zinc is formed during welding, it penetrates into the base metal to ultimately cause LME cracking. However, LME welding results indicate that only relatively shallow penetration of zinc is found when welding the alloys herein. The depth of penetration of the crack is typically found to be less than 15% of the base metal thickness adjacent the weld. Without being bound by any particular theory this relatively low penetration may be a consequence of the relatively fine grain size (<10 μm) of the alloys herein which resist coarsening in the HAZ leading to reduced diffusivity pathways and suppressing a liquid zinc penetration into the base metal. Furthermore, after penetration of liquid zinc occurs in the grain boundaries, LME cracking may occur due to thermal expansion and contraction. There are two main components to this which both create localized stresses and can contribute to cracking. The first component of this is the thermal expansion and contraction due to changes in temperature only. This thermal factor is present in all steels including the alloys herein with variations due to their specific thermal expansion coefficients resulting from specific chemistries. The other factor creating localized stresses is the formation of new phases. In conventional steels, which are generally ferritic, increase in temperature will result in the formation of the high temperature austenite phase. Then during cooling, since the cooling rate in the weld zone is very rapid (>$10^4$ K/s), the austenite transforms to martensite. Martensite formed during cooling is a brittle phase which can lead to failure of the weld independent of LME. More importantly, the austenite (i.e. face centered cubic) to martensite (i.e. body centered tetragonal) phase transformation creates additional residual stresses due to the localized volume change as a result of phase transformation, which might be in the range of 5 to 10% depending on the specific steel chemistry. This volume change results in additional residual stress which when combined with the residual stress from the temperature gradient can then initiate crack formation and propagation in the already zinc penetrated weakened grain boundary regions. In the alloys herein, the austenite phase is relatively stable in a wide range of conditions and during solidification, even in the rapidly solidified region of a weld, martensite phase and alpha formation is either avoided or present at sufficiently small amounts, e.g. the level the martensite phase and/or alpha iron (ferrite iron) is ≤10.0%, more preferably ≤7.5%, or ≤5.0%, or ≤2.5% or ≤1.0%. Thus, this deleterious contribution to residual stresses is reduced and the LME cracking effect is minimized.

Cracks once formed will often propagate due to the concentration of stresses at the crack tip. Whether a crack propagates or not, it will depend on the plastic zone in front of the crack tip which blunts the crack tip when the stress is below that needed for crack propagation. Due to high ductility found in the alloys herein, as reflected by the elongation falling in the range of 5.0 to 80.0%, it is believed that the plastic zone in front of the crack tip is very favorable to minimize propagation of LME cracks if they do form. This is consistent with the observations that LME in the alloys herein is limited and even when a crack does form its depth is less than 15% of the base metal thickness. This level of maximum crack propagation is also contemplated to be sufficient to provide high integrity spot welds for commercial services.

Thus, welds are shown to be achieved in the alloys herein without deleterious HAZ when welded self-to-self or to other steels and with relatively high resistance to LME in a case of welding of coated sheet materials in a presence of Zn. Welding can be done by various methods including but not limited to resistance spot welding, resistance seam welding, upset welding, laser beam welding, electron beam welding, etc.

Main Body

The chemical composition of the alloys herein is shown in Table 1 which provides the preferred atomic ratios utilized.

TABLE 1

Chemical Composition of Alloys (Atomic %)

| Alloy | Fe | Cr | Ni | Mn | Si | Cu | C |
|---|---|---|---|---|---|---|---|
| Alloy 1 | 76.17 | 8.64 | 0.90 | 11.77 | — | 1.68 | 0.84 |
| Alloy 2 | 78.24 | — | 3.16 | 12.69 | 4.69 | — | 1.22 |
| Alloy 3 | 76.55 | 0.78 | 0.72 | 14.43 | 3.42 | 0.42 | 3.68 |
| Alloy 4 | 77.46 | — | — | 15.42 | 3.78 | 1.73 | 1.61 |
| Alloy 5 | 75.67 | 2.63 | 3.40 | 11.03 | 5.13 | 1.35 | 0.79 |
| Alloy 6 | 81.00 | 1.22 | 0.89 | 13.45 | 2.66 | 0.78 | — |
| Alloy 7 | 75.75 | 2.63 | 1.19 | 13.86 | 5.13 | 0.65 | 0.79 |
| Alloy 8 | 74.75 | 2.63 | 1.19 | 14.86 | 5.13 | 0.65 | 0.79 |
| Alloy 9 | 74.59 | 2.61 | — | 15.17 | 3.59 | 1.86 | 2.18 |
| Alloy 10 | 73.75 | 2.63 | 1.19 | 15.86 | 5.13 | 0.65 | 0.79 |
| Alloy 11 | 80.93 | — | 2.68 | 12.04 | 0.79 | 0.89 | 2.67 |
| Alloy 12 | 81.51 | 2.45 | 3.78 | 11.79 | — | — | 0.47 |
| Alloy 13 | 80.89 | 0.43 | 0.42 | 14.82 | 2.03 | 1.41 | — |
| Alloy 14 | 79.02 | — | 2.95 | 10.88 | 5.18 | 1.97 | — |
| Alloy 15 | 75.55 | 1.67 | 1.63 | 14.92 | 6.23 | — | — |
| Alloy 16 | 78.17 | 1.85 | 11.42 | — | 3.94 | 2.68 | 1.94 |
| Alloy 17 | 81.07 | 3.56 | 9.78 | 0.84 | 1.76 | 2.11 | 0.88 |

As can be seen from the Table 1, the alloys herein are iron based metal alloys, having greater than 70 at. % Fe. In addition, it can be appreciated that the alloys herein are such that they comprise Fe and at least four or more, or five or more or all six elements selected from Si, Mn, Cr, Ni, Cu, or C. Most preferably, the alloys herein are such that they comprise, consist essentially of, or consist of Fe at a level of 70 at. % or greater along with Si, Mn, Cr, Ni, Cu, and C, wherein the level of impurities of all other elements is in the range from 0 to 5000 ppm.

For example, in the case of the alloys containing Fe at a level of greater than 70 at. %, and four elements selected from Si, Mn, Cr, Ni, Cu, or C, the selected amounts of the four elements from Si, Mn, Cr, Ni, Cu, or C are such that the at. % of Fe and the selected elements adds up to 100 at. %, subject to the level of impurities noted above and the maximum amounts of the elements identified. The same analysis would apply if five elements are selected from Si, Mn, Cr, Ni, Cu, or C or if all six of such elements are selected. When an element is selected, the minimum amount is contemplated to be in at. % as follows; Si 0.7, Mn 0.8, Cr, 0.4, Ni 0.4, Cu 0.4, C 0.4. When an element is not present, the level would be zero atomic percent. Accordingly, in a given alloy, the levels of elements other than Fe may be as follows in at. %: Si (0-6.5); Mn (0-16.0), Cr. (0-8.8), Ni (0-11.6), Cu (0-2.8) and C (0-3.8). The alloys herein were processed into a laboratory sheet by processing of laboratory slabs. Laboratory alloy processing is developed to mimic closely the commercial sheet production by continuous casting and include hot rolling and cold rolling. Annealing might be applied depending on targeted properties. Produced sheet can be used in hot rolled (hot band), cold rolled, annealed or partially annealed states.

Laboratory Slab Casting

Alloys were weighed out into 3,000 to 3,500 gram charges according to the atomic ratios in Table 1 using commercially available ferroadditive powders and a base steel feedstock with known chemistry. As eluded to above, impurities can be present at various levels depending on the feedstock used. Impurity elements would commonly include the following elements; Al, Co, N, P, Ti, Mo, W, Ga, Ge, Sb, Nb, Zr, O, Sn, Ca, B and S which if present would be in the range from 0 to 5000 ppm (parts per million) with preferred ranges of 0 to 500 ppm.

Charges were loaded into a zirconia coated silica crucible which was placed into an Indutherm VTC800V vacuum tilt casting machine. The machine then evacuated the casting and melting chambers and flushed with argon to atmospheric pressure twice prior to casting to prevent oxidation of the melt. The melt was heated with a 14 kHz RF induction coil until fully molten, approximately from 5 to 7 minutes depending on the alloy composition and charge mass. After the last solids were observed to melt it was allowed to heat for an additional 30 to 45 seconds to provide superheat and ensure melt homogeneity. The casting machine then evacuated the chamber and tilted the crucible and poured the melt into a water cooled copper die. The melt was allowed to cool under vacuum for 200 seconds before the chamber was filled with argon to atmospheric pressure.

Laboratory casting corresponds to Step 1 in FIG. 2, FIG. 3 and FIG. 4 provides slabs with thickness of 50 mm. Depending on equipment capability, slab thickness in Step 1 can vary from 25 to 500 mm.

Density Measurements

The density of the alloys was measured on arc-melt ingots using the Archimedes method in a specially constructed balance allowing weighing in both air and distilled water. The density of each alloy is tabulated in Table 2 and was found to be in a range from 7.77 to 8.01 g/cm$^3$. Experimental results have revealed that the accuracy of this technique is ±0.01 g/cm$^3$.

TABLE 2

Density of Alloys

| Alloy | Density [g/cm$^3$] |
|---|---|
| Alloy 1 | 7.89 |
| Alloy 2 | 7.82 |
| Alloy 3 | 7.77 |
| Alloy 4 | 7.80 |
| Alloy 5 | 7.80 |

TABLE 2-continued

Density of Alloys

| Alloy | Density [g/cm³] |
|---|---|
| Alloy 6 | 7.67 |
| Alloy 7 | 7.78 |
| Alloy 8 | 7.77 |
| Alloy 9 | 7.78 |
| Alloy 10 | 7.77 |
| Alloy 11 | 7.93 |
| Alloy 12 | 8.01 |
| Alloy 13 | 7.94 |
| Alloy 14 | 7.83 |
| Alloy 15 | 7.77 |
| Alloy 16 | 7.92 |
| Alloy 17 | 7.84 |

Thermal Analysis

A sample of between 50 and 150 mg from each alloy herein was taken in the as-cast condition. Differential Scanning calorimetry (DSC) measurements were taken using a Netzsch Pegasus 404 DSC through all four stages of the experiment, and this data was used to determine the solidus and liquidus temperatures of each alloy. This sample was heated to an initial ramp temperature between 900° C. and 1300° C. depending on alloy chemistry, at a rate of 40° C./min. Temperature was then increased at 10° C./min to a max temperature between 1425° C. and 1500° C. (maximum temperature limit for the used DSC equipment) depending on alloy chemistry. Once this maximum temperature was achieved, the sample was cooled at a rate of 10° C./min back to the initial ramp temperature before being reheated at 10° C./min to the maximum temperature. Solidus temperatures varies from 1294 to 1472° C. (Table 3), with liquidus temperatures from 1432 to 1500° C. Liquidus-solidus gap is in a range from 26 to 138° C. Thermal analysis provides information on melting behavior of the alloys herein that varies depending on alloy chemistry. Note that once the solidus temperature is exceeded, the liquid is present and this is the melting temperature. It is therefore contemplated that the alloys herein will have a Tm value in the range of 1250° C. to 1650° C.

TABLE 3

Thermal Analysis of Selected Alloys

| Alloy | Solidus (° C.) | Liquidus (° C.) | Melting Gap (° C.) |
|---|---|---|---|
| Alloy 1 | 1406 | 1488 | 82 |
| Alloy 2 | 1408 | 1457 | 49 |
| Alloy 3 | 1294 | 1432 | 138 |
| Alloy 4 | 1398 | 1452 | 54 |
| Alloy 5 | 1419 | 1455 | 36 |
| Alloy 6 | 1425 | 1481 | 56 |
| Alloy 7 | 1390 | 1448 | 58 |
| Alloy 8 | 1398 | 1446 | 48 |
| Alloy 9 | 1358 | 1445 | 87 |
| Alloy 10 | 1385 | 1443 | 58 |
| Alloy 11 | 1456 | 1491 | 35 |
| Alloy 12 | 1471 | 1498 | 27 |
| Alloy 13 | 1464 | 1490 | 26 |
| Alloy 14 | 1419 | 1458 | 39 |
| Alloy 15 | 1392 | 1450 | 58 |
| Alloy 16 | 1460 | 1489 | 29 |
| Alloy 17 | 1472 | 1500 | 28 |

Laboratory Hot Rolling

The alloys herein were preferably processed into a laboratory hot band by hot rolling of laboratory slabs at high temperatures. Laboratory alloy processing is developed to simulate the hot band production from slabs produced by continuous casting. Industrial hot rolling is performed by heating a slab in a tunnel furnace to a target temperature, then passing it through either a reversing mill or a multi-stand mill or a combination of both to reach the target gauge. During rolling on either mill type, the temperature of the slab is steadily decreasing due to heat loss to the air and to the work rolls so the final hot band is formed at a reduced temperature. This is simulated in the laboratory by heating in a tunnel furnace to between 1100° C. and 1250° C., then hot rolling. The laboratory mill is slower than industrial mills causing greater loss of heat during each hot rolling pass so the slab is reheated for 4 minutes between passes to reduce the drop in temperature, the final temperature at target gauge when exiting the laboratory mill commonly is in the range from 800° C. to 1000° C., depending on furnace temperature and final thickness.

Prior to hot rolling, laboratory slabs were preheated in a Lucifer EHS3GT-B18 furnace. The furnace set point varies between 1100° C. to 1250° C., depending on alloy melting point and point in the hot rolling process, with the initial temperatures set higher to facilitate higher reductions, and later temperatures set lower to minimize surface oxidation on the hot band. The slabs were allowed to soak for 40 minutes prior to hot rolling to ensure they reach the target temperature and then pushed out of the tunnel furnace into a Fenn Model 061 2 high rolling mill. The 50 mm casts are hot rolled for 5 to 10 passes though the mill before being allowed to air cool. Final thickness ranges after hot rolling are up to 5.0 mm, preferably 0.1 mm to 5.0 mm, and even more preferably from 1.8 mm to 5.0 mm, with variable reduction per pass ranging from 20% to 50%. The relative amount of magnetic content in the hot band from alloys herein was measured by Feritscope as shown in Table 4. The magnetic phases volume percent ranging from 0.3 to 74.7 Fe % depending on alloy chemistry.

TABLE 4

Feritscope Measurement Data in Hot Band from Alloys Herein

| Alloy | Magnetic Phases Volume Percent [Fe %] |
|---|---|
| Alloy 1 | 2.0 |
| Alloy 2 | 3.4 |
| Alloy 3 | 0.7 |
| Alloy 4 | 0.8 |
| Alloy 5 | 3.7 |
| Alloy 6 | 5.8 |
| Alloy 7 | 0.8 |
| Alloy 8 | 1.3 |
| Alloy 9 | 0.3 |
| Alloy 10 | 0.8 |
| Alloy 11 | 2.5 |
| Alloy 12 | 6.3 |
| Alloy 13 | 3.4 |
| Alloy 14 | 9.8 |
| Alloy 15 | 1.7 |
| Alloy 16 | 26.8 |
| Alloy 17 | 74.7 |

Tensile properties were measured on an Instron mechanical testing frame (Model 3369), utilizing Instron's Bluehill control and analysis software. All tests were run at ambient temperature in displacement control at a constant displacement rate of 0.036 mm/s. Tensile properties of the alloys in the hot rolled condition are listed in Table 5. The ultimate tensile strength of the alloys herein varies from 912 to 1687 MPa with tensile elongation from 15.3 to 65.9%. The yield strength is in a range from 284 to 712 MPa. Hardness values are in a range from 13.3 to 47.5 HRC (205 to 478 HV). Note that the Table 5 properties correspond to Step 2 in FIG. 2, FIG. 3 and FIG. 4. Further processing of the hot band can additionally occur through cold rolling and annealing as shown below.

TABLE 5

Tensile Properties of Hot Band from Alloys Herein

| Alloy | Tensile Elongation (%) | Ultimate Tensile Strength (MPa) | Yield Strength (0.2% offset) (MPa) | Average Hardness (HRC) | (HV*) |
|---|---|---|---|---|---|
| Alloy 1 | 60.1 | 1091 | 439 | 22.5 | 251 |
|  | 61.0 | 1114 | 469 |  |  |
|  | 58.9 | 1124 | 476 |  |  |
|  | 59.4 | 1137 | 481 |  |  |
| Alloy 2 | 48.1 | 1288 | 393 | 25.5 | 269 |
|  | 48.6 | 1270 | 397 |  |  |
|  | 55.4 | 1300 | 396 |  |  |
|  | 44.4 | 1263 | 393 |  |  |
| Alloy 3 | 58.9 | 1105 | 531 | 27.3 | 281 |
|  | 61.4 | 1108 | 524 |  |  |
|  | 58.6 | 1106 | 511 |  |  |
|  | 52.9 | 1129 | 519 |  |  |
| Alloy 4 | 60.1 | 1023 | 469 | 25.0 | 266 |
|  | 65.1 | 1033 | 493 |  |  |
|  | 63.3 | 1026 | 483 |  |  |
|  | 60.9 | 1014 | 471 |  |  |
| Alloy 5 | 63.0 | 1147 | 489 | 23.9 | 259 |
|  | 62.8 | 1156 | 464 |  |  |
|  | 61.8 | 1141 | 463 |  |  |
|  | 63.6 | 1142 | 493 |  |  |
| Alloy 6 | 47.9 | 1374 | 330 | 20.8 | 242 |
|  | 48.8 | 1336 | 317 |  |  |
|  | 41.5 | 1362 | 321 |  |  |
| Alloy 7 | 53.4 | 1248 | 307 | 17.7 | 227 |
|  | 51.4 | 1248 | 284 |  |  |
|  | 49.2 | 1253 | 310 |  |  |
| Alloy 8 | 57.6 | 1175 | 313 | 17.1 | 224 |
|  | 58.6 | 1209 | 294 |  |  |
|  | 56.6 | 1167 | 307 |  |  |
| Alloy 9 | 65.9 | 963 | 515 | 24.2 | 261 |
|  | 58.7 | 954 | 485 |  |  |
|  | 56.6 | 963 | 529 |  |  |
|  | 62.1 | 970 | 545 |  |  |
| Alloy 10 | 61.6 | 1079 | 340 | 16.2 | 219 |
|  | 61.6 | 1082 | 320 |  |  |
| Alloy 11 | 55.9 | 912 | 481 | 19.5 | 236 |
|  | 57.6 | 927 | 493 |  |  |
|  | 54.7 | 912 | 470 |  |  |
|  | 58.3 | 928 | 487 |  |  |
| Alloy 12 | 45.0 | 1150 | 289 | 14.7 | 212 |
|  | 44.2 | 1152 | 296 |  |  |
|  | 45.4 | 1147 | 302 |  |  |
|  | 42.8 | 1149 | 284 |  |  |
| Alloy 13 | 45.8 | 1014 | 332 | 13.3 | 205 |
|  | 44.8 | 1006 | 321 |  |  |
|  | 48.0 | 1029 | 326 |  |  |
|  | 47.1 | 1005 | 344 |  |  |
| Alloy 14 | 42.8 | 1215 | 357 | 18.4 | 230 |
|  | 42.1 | 1231 | 347 |  |  |
|  | 42.5 | 1202 | 352 |  |  |
|  | 42.5 | 1222 | 351 |  |  |
| Alloy 15 | 46.2 | 1107 | 397 | 26.2 | 273 |
|  | 50.4 | 1099 | 376 |  |  |
|  | 46.7 | 1104 | 386 |  |  |
|  | 43.9 | 1115 | 384 |  |  |
| Alloy 16 | 25.8 | 1480 | 480 | 18.3 | 230 |
|  | 23.2 | 1383 | 446 |  |  |
|  | 30.3 | 1492 | 468 |  |  |
|  | 31.8 | 1534 | 485 |  |  |

TABLE 5-continued

Tensile Properties of Hot Band from Alloys Herein

| Alloy | Tensile Elongation (%) | Ultimate Tensile Strength (MPa) | Yield Strength (0.2% offset) (MPa) | Average Hardness (HRC) | (HV*) |
|---|---|---|---|---|---|
| Alloy 17 | 15.6 | 1649 | 676 | 47.5 | 478 |
|  | 16.2 | 1679 | 693 |  |  |
|  | 15.3 | 1682 | 712 |  |  |
|  | 15.3 | 1687 | 690 |  |  |

*Converted from Rockwell C hardness

Laboratory Cold Rolling

Hot band material was media blasted prior to cold rolling to remove surface oxides which could become embedded during the rolling process. The resultant cleaned sheet material was rolled using a Fenn Model 061 2 high rolling mill down to 1.2 mm thickness using multiple passes. Reductions were in a range ranged from 10% to 40% until the final gauge thickness was achieved. If the cold rolled sheets were not at the desired thickness an annealing is preferably applied to restore ductility and lower material's strength in order to perform additional cold rolling. This anneal was conducted with a hydrogen anneal to reduce oxidation; samples were loaded at room temperature, heated to 850° C. at a rate of 40° C./minute, allowed to stay at temperature for 15 minutes then the furnace was shut off and samples were allowed to cool to room temperature over ~60 minutes before being cold rolled again until the final gauge thickness was achieved.

Laboratory Annealing

Once the final gauge thickness of 1.2 mm was reached, tensile samples were cut from the laboratory sheet by wire-EDM. The samples were annealed under conditions intended to simulate the thermal exposure expected during an industrial continuous annealing process representing final treatment of sheet material in Step 2 in FIG. 2, FIG. 3 and FIG. 4. Samples were wrapped in stainless steel foil to prevent oxidation and loaded into a preheated furnace at 850° C. Samples were left in the furnace for 10 minutes while the furnace purged with argon before being removed and allowed to air cool. The relative magnetic phase content in sheet from alloys herein after cold rolling and annealing was measured by Feritscope as shown in Table 6. The magnetic phases volume percent ranging from 0.3 to 68.5 Fe % depending on alloy chemistry.

TABLE 6

Feritscope Measurement Data in Sheet from Alloys Herein after Annealing

| Alloy | Magnetic Phases Volume Percent [Fe %] |
|---|---|
| Alloy 1 | 0.9 |
| Alloy 2 | 0.6 |
| Alloy 3 | 0.5 |
| Alloy 4 | 1.2 |
| Alloy 5 | 0.8 |
| Alloy 6 | 0.6 |
| Alloy 7 | 1.1 |
| Alloy 8 | 1.1 |
| Alloy 9 | 0.3 |
| Alloy 10 | 1.1 |
| Alloy 11 | 1.1 |
| Alloy 12 | 2.0 |

TABLE 6-continued

Feritscope Measurement Data in Sheet
from Alloys Herein after Annealing

| Alloy | Magnetic Phases Volume Percent [Fe %] |
|---|---|
| Alloy 13 | 2.1 |
| Alloy 14 | 1.6 |
| Alloy 15 | 1.7 |
| Alloy 16 | 22.8 |
| Alloy 17 | 68.5 |

Tensile properties were measured on an Instron mechanical testing frame (Model 3369), utilizing Instron's Bluehill control and analysis software. All tests were run at ambient temperature in displacement control at a constant displacement rate of 0.036 mm/s. Tensile properties of 1.2 mm thick sheet from alloys herein after annealing are listed in Table 7. The ultimate tensile strength values of the annealed sheet from alloys herein are in a range from 759 to 1683 MPa; yield strength varies from 273 to 720 MPa and tensile elongation is recorded in the range from 13.8 to 74.3%. Hardness values are in a range from 3.1 to 47.9 HRC (154 to 483 HV). Anticipated properties are listed in Claim 1b. Note that the Table 7 properties correspond to Step 2 in FIG. 2, FIG. 3 and FIG. 4.

TABLE 7

Tensile Properties of 1.2 mm Thick Sheet
from the Alloys Herein after Annealing

| Alloy | Tensile Elongation (%) | Ultimate Tensile Strength (MPa) | 0.2% Offset Yield Strength (MPa) | Average Hardness (HRC) | (HV*) |
|---|---|---|---|---|---|
| Alloy 1 | 50.1 | 1175 | 483 | 20.3 | 240 |
|  | 50.9 | 1161 | 472 |  |  |
|  | 50.8 | 1190 | 471 |  |  |
| Alloy 2 | 28.5 | 1021 | 416 | 20.9 | 243 |
|  | 25.6 | 954 | 412 |  |  |
|  | 28.0 | 1033 | 415 |  |  |
|  | 28.1 | 1005 | 430 |  |  |
| Alloy 3 | 60.3 | 1134 | 499 | 21.9 | 248 |
|  | 58.2 | 1141 | 500 |  |  |
|  | 60.4 | 1139 | 500 |  |  |
|  | 64.2 | 1138 | 490 |  |  |
| Alloy 4 | 72.9 | 1035 | 413 | 16.8 | 222 |
|  | 70.2 | 1016 | 407 |  |  |
|  | 73.7 | 1056 | 429 |  |  |
|  | 74.3 | 1032 | 406 |  |  |
| Alloy 5 | 56.8 | 1165 | 386 | 14.4 | 210 |
|  | 67.5 | 1129 | 440 |  |  |
|  | 58.5 | 1136 | 396 |  |  |
|  | 62.2 | 1137 | 389 |  |  |
| Alloy 6 | 15.6 | 759 | 379 | 15.7 | 217 |
|  | 17.9 | 888 | 420 |  |  |
|  | 17.0 | 839 | 368 |  |  |
|  | 18.0 | 849 | 431 |  |  |
| Alloy 7 | 55.7 | 1267 | 469 | 20.1 | 239 |
|  | 52.0 | 1242 | 456 |  |  |
|  | 56.0 | 1248 | 470 |  |  |
|  | 57.7 | 1277 | 464 |  |  |
| Alloy 8 | 65.4 | 1162 | 491 | 19.7 | 237 |
|  | 59.4 | 1179 | 469 |  |  |
|  | 61.8 | 1193 | 477 |  |  |
|  | 62.6 | 1172 | 531 |  |  |
| Alloy 9 | 64.7 | 993 | 484 | 19.0 | 233 |
|  | 66.1 | 997 | 491 |  |  |
|  | 66.2 | 994 | 481 |  |  |
|  | 66.3 | 994 | 491 |  |  |
| Alloy 10 | 63.9 | 1102 | 463 | 18.2 | 229 |
|  | 63.5 | 1118 | 465 |  |  |
|  | 65.3 | 1127 | 478 |  |  |
|  | 70.8 | 1108 | 475 |  |  |
|  | 62.6 | 1112 | 473 |  |  |
| Alloy 11 | 66.4 | 892 | 326 | 3.1 | 154 |
|  | 61.6 | 876 | 319 |  |  |
|  | 64.2 | 889 | 322 |  |  |
|  | 67.5 | 886 | 321 |  |  |
| Alloy 12 | 42.5 | 1170 | 273 | 12.4 | 200 |
|  | 40.5 | 1164 | 295 |  |  |
|  | 43.3 | 1164 | 283 |  |  |
|  | 41.9 | 1175 | 296 |  |  |
| Alloy 13 | 49.5 | 987 | 388 | 12.4 | 200 |
|  | 48.7 | 988 | 381 |  |  |
|  | 49.0 | 991 | 358 |  |  |
|  | 44.2 | 999 | 377 |  |  |
| Alloy 14 | 39.5 | 1196 | 366 | 14.7 | 212 |
|  | 39.6 | 1196 | 377 |  |  |
|  | 38.4 | 1213 | 377 |  |  |
|  | 39.3 | 1187 | 355 |  |  |
| Alloy 15 | 51.1 | 1070 | 402 | 18.2 | 229 |
|  | 51.8 | 1073 | 405 |  |  |
|  | 54.3 | 1060 | 381 |  |  |
|  | 57.9 | 1067 | 395 |  |  |
| Alloy 16 | 36.6 | 1659 | 292 | 8.0 | 178 |
|  | 31.0 | 1683 | 317 |  |  |
|  | 34.7 | 1683 | 292 |  |  |
|  | 37.3 | 1655 | 286 |  |  |
| Alloy 17 | 13.8 | 1663 | 701 | 47.9 | 483 |
|  | 14.0 | 1657 | 675 |  |  |
|  | 13.8 | 1641 | 713 |  |  |
|  | 14.0 | 1665 | 720 |  |  |

*Converted from Rockwell C hardness

Based upon the data in Tables 5 and 7 and the tensile properties of Case Example 8, it is contemplated that the alloys disclosed herein may therefore have a hardness H1 of 150 HV to 650 HV, a yield strength of 250 MPa to 1200 MPa, a tensile strength of 700 MPa to 1700 MPa and a total tensile elongation of 10.0 to 75.0%.

Laboratory Welding

The laboratory produced 1.2 mm thick sheet material from alloys herein in cold rolled and annealed state with properties listed in Table 7 was joined self-to-self by melting and re-solidification process using spot welding method. Steel sheets were cleaned with a nylon mesh abrasive pad after heat treatment and prior to welding to reduce the quantity of surface oxide. H&H programmable spot welder with a P10 controller was used. A single pulse weld was used. The spot welding procedure started with the material being clamped for ⅙ of a second prior to welding. The welding time and power level were varied with the 5 parameter sets listed in Table 8. After welding, the sample was remained clamped for ⅙ of a second to cool. The electrode diameter was 0.125 inches and the clamping force was approximately 850 lbs. The result of the spot welding was the formation of weld nuggets schematically shown in FIG. 1. The melted and re-solidified area of the joint sheets formed a fusion zone. Sheet material adjacent to the fusion zone was affected by heat during welding forming a heat affected zone (HAZ).

TABLE 8

| Weld Schedule | | |
|---|---|---|
| Weld Schedule | % Power | Cycles (1/60 sec) |
| 1 | 35 | 35 |
| 2 | 40 | 40 |
| 3 | 43 | 43 |
| 4 | 46 | 46 |
| 5 | 49 | 49 |

The welded samples were cut by EDM across the weld nuggets for microstructural and microhardness analysis. After microstructural examination, the spot welds formed using Weld Schedule #2 (Table 8) were selected for microhardness measurements. Microhardness measurements as a function of distance across the interface between the fusion zone and the base metal were made for each alloy herein. The load used for the microhardness measurements was 500 g. The results of the microhardness measurement as a function of distance are listed in Table 9 through Table 17 for alloys herein and plotted in FIG. 6 through FIG. 22. In cases when the HAZ is detectable by observation in the microscope, it marked correspondingly on the plots. The hardness difference between base metal and the fusion zone of the self-to-self welds of the alloys herein is summarized in Table 18. As shown by the avg hardness changes, the maximum hardness change in the heat affected zone was 76 HV compared to the value in the sheet before welding. As individual measurements can vary as shown, it is anticipated that the hardness change in the heat affected zone would be within (i.e. +/−) 100 HV from the base metal hardness for the self to self welding of the alloys here-in.

TABLE 9

Microhardness Across the Weld Nugget in Alloy 1 & Alloy 2

| Area of the Weld | Alloy 1 | | Alloy 2 | |
|---|---|---|---|---|
| | Distance (mm) | HV (kg/mm$^2$) | Distance (mm) | HV (kg/mm$^2$) |
| Fusion Zone | 0 | 237 | 0 | 255 |
| | 0.23 | 278 | 0.23 | 274 |
| | 0.45 | 265 | 0.49 | 260 |
| | 0.68 | 270 | 0.72 | 267 |
| | 0.90 | 258 | 0.94 | 281 |
| | 1.12 | 263 | 1.17 | 260 |
| Base Metal | 1.35 | 239 | 1.39 | 269 |
| | 1.58 | 248 | 1.61 | 290 |
| | 1.80 | 270 | 1.84 | 287 |
| | 2.02 | 283 | 2.07 | 294 |
| | 2.25 | 284 | 2.29 | 290 |
| | 2.47 | 281 | 2.51 | 284 |

TABLE 10

Microhardness Across the Weld Nugget in Alloy 3 & Alloy 4

| Area of the Weld | Alloy 3 | | Alloy 4 | |
|---|---|---|---|---|
| | Distance (mm) | HV (kg/mm$^2$) | Distance (mm) | HV (kg/mm$^2$) |
| Fusion Zone | 0 | 215 | | |
| | 0.22 | 283 | 0 | 251 |
| | 0.45 | 279 | 0.23 | 248 |
| | 0.67 | 273 | 0.45 | 249 |
| | 0.90 | 272 | 0.67 | 247 |
| | 1.12 | 252 | 0.89 | 248 |
| Base Metal | 1.35 | 260 | 1.11 | 250 |
| | 1.57 | 262 | 1.33 | 245 |
| | 1.80 | 258 | 1.56 | 269 |
| | 2.03 | 303 | 1.77 | 270 |
| | 2.25 | 307 | 2.00 | 273 |
| | 2.47 | 263 | 2.22 | 284 |
| | | | 2.44 | 298 |
| | | | 2.67 | 283 |
| | | | 2.90 | 288 |

TABLE 11

Microhardness Across the Weld Nugget in Alloy 5 & Alloy 6

| Area of the Weld | Alloy 5 | | Alloy 6 | |
|---|---|---|---|---|
| | Distance (mm) | HV (kg/mm$^2$) | Distance (mm) | HV (kg/mm$^2$) |
| Fusion Zone | | | 0 | 254 |
| | 0 | 230 | 0.40 | 254 |
| | 0.23 | 244 | 0.63 | 263 |
| | 0.45 | 257 | 0.84 | 262 |
| | 0.68 | 259 | 1.07 | 255 |
| | 0.90 | 259 | 1.27 | 257 |
| | 1.13 | 260 | 1.54 | 277 |
| Base Metal | 1.36 | 269 | 1.78 | 280 |
| | 1.58 | 274 | 2.00 | 259 |
| | 1.80 | 281 | 2.23 | 261 |
| | 2.03 | 276 | 2.45 | 263 |
| | 2.25 | 282 | 2.67 | 275 |
| | 2.47 | 278 | 2.89 | 272 |
| | 2.70 | 276 | | |

TABLE 12

Microhardness Across the Weld Nugget in Alloy 7 & Alloy 8

| Area of the Weld | Alloy 7 | | Alloy 8 | |
|---|---|---|---|---|
| | Distance (mm) | HV (kg/mm$^2$) | Distance (mm) | HV (kg/mm$^2$) |
| Fusion Zone | 0 | 235 | | |
| | 0.22 | 161 | | |
| | 0.45 | 197 | | |
| | 0.77 | 198 | | |
| | 1.00 | 236 | 0 | 260 |
| | 1.22 | 249 | 0.22 | 264 |
| | 1.44 | 245 | 0.44 | 266 |
| | 1.68 | 235 | 0.66 | 275 |
| Base Metal | 1.93 | 225 | 0.89 | 247 |
| | 2.14 | 247 | 1.11 | 248 |
| | 2.37 | 254 | 1.34 | 275 |
| | 2.59 | 262 | 1.56 | 280 |
| | 2.81 | 254 | 1.78 | 274 |
| | 3.03 | 253 | 1.99 | 260 |

TABLE 13

Microhardness Across the Weld Nugget in Alloy 9 & Alloy 10

| Area of the Weld | Alloy 9 | | Alloy 10 | |
|---|---|---|---|---|
| | Distance (mm) | HV (kg/mm$^2$) | Distance (mm) | HV (kg/mm$^2$) |
| Fusion Zone | 0 | 265 | 0 | 270 |
| | 0.23 | 280 | 0.25 | 269 |
| | 0.45 | 264 | 0.50 | 257 |
| | 0.67 | 260 | 0.74 | 255 |
| Base Metal | 0.90 | 254 | 0.99 | 259 |
| | 1.12 | 273 | 1.24 | 257 |
| | 1.34 | 291 | 1.49 | 279 |
| | 1.56 | 292 | 1.73 | 281 |
| | 1.80 | 293 | 1.92 | 266 |
| | 2.02 | 297 | | |
| | 2.24 | 290 | | |
| | 2.46 | 292 | | |

TABLE 14

Microhardness Across the Weld Nugget in Alloy 11 & Alloy 12

| Area of the Weld | Alloy 11 | | Alloy 12 | |
|---|---|---|---|---|
| | Distance (mm) | HV (kg/mm$^2$) | Distance (mm) | HV (kg/mm$^2$) |
| Fusion Zone | 0 | 140 | 0 | 327 |
| | 0.23 | 147 | 0.22 | 260 |
| | 0.50 | 215 | 0.45 | 336 |
| | 0.75 | 211 | 0.67 | 274 |
| | 1.00 | 209 | 0.90 | 258 |
| | 1.25 | 216 | 1.13 | 288 |
| Base Metal | 1.50 | 204 | 1.41 | 249 |
| | 1.75 | 216 | 1.63 | 243 |
| | 2.01 | 216 | 1.86 | 247 |
| | 2.26 | 222 | 2.09 | 251 |
| | | | 2.32 | 249 |

TABLE 15

Microhardness Across the Weld Nugget in Alloy 13 & Alloy 14

| Area of the Weld | Alloy 13 | | Alloy 14 | |
|---|---|---|---|---|
| | Distance (mm) | HV (kg/mm$^2$) | Distance (mm) | HV (kg/mm$^2$) |
| Fusion Zone | 0 | 235 | | |
| | 0.26 | 261 | | |
| | 0.51 | 285 | 0 | 320 |
| | 0.75 | 262 | 0.23 | 281 |
| | 1.01 | 281 | 0.45 | 257 |
| | 1.26 | 275 | 0.68 | 241 |
| Base Metal | 1.52 | 261 | 0.90 | 250 |
| | 1.75 | 254 | 1.13 | 242 |
| | 2.01 | 269 | 1.36 | 247 |
| | 2.26 | 254 | 1.59 | 245 |
| | 2.51 | 249 | 1.82 | 247 |
| | 2.75 | 255 | 2.04 | 254 |
| | | | 2.27 | 250 |
| | | | 2.49 | 245 |

TABLE 16

Microhardness Across the Weld Nugget in Alloy 15 & Alloy 16

| Area of the Weld | Alloy 15 | | Alloy 16 | |
|---|---|---|---|---|
| | Distance (mm) | HV (kg/mm$^2$) | Distance (mm) | HV (kg/mm$^2$) |
| Fusion Zone | | | 0 | 210 |
| | 0 | 275 | 0.23 | 213 |
| | 0.12 | 235 | 0.46 | 200 |
| | 0.34 | 256 | 0.69 | 209 |
| | 0.56 | 269 | 0.91 | 256 |
| | 0.79 | 296 | 1.14 | 194 |
| | 1.01 | 288 | 1.37 | 206 |
| Base Metal | 1.24 | 288 | 1.60 | 207 |
| | 1.46 | 288 | 1.82 | 217 |
| | 1.69 | 292 | 2.04 | 220 |
| | 1.91 | 316 | 2.27 | 227 |
| | 2.14 | 310 | 2.51 | 244 |
| | 2.36 | 316 | | |
| | 2.59 | 316 | | |
| | 2.81 | 322 | | |
| | 3.04 | 300 | | |

TABLE 17

Microhardness Across the Weld Nugget in Alloy 17

| Area of the Weld | Alloy 17 | |
|---|---|---|
| | Distance (mm) | HV (kg/mm$^2$) |
| Fusion Zone | 0 | 464 |
| | 0.23 | 468 |
| | 0.45 | 459 |
| | 0.67 | 457 |
| | 0.89 | 459 |
| | 1.11 | 459 |
| | 1.33 | 451 |
| Base Metal | 1.55 | 479 |
| | 1.78 | 462 |
| | 2.00 | 481 |
| | 2.22 | 476 |
| | 2.44 | 455 |
| | 2.67 | 468 |

TABLE 18

A Summary on Microhardness of the Base Metal and the Heat Affected Zone

| Alloy | Average Microhardness (HV) of Alloys (Table 7) (kg/mm$^2$) | Average Microhardness (HV) of Base Metal of the Weld (Tables 9 through 17) (kg/mm$^2$) | Microhardness (HV) Difference (kg/mm$^2$) |
|---|---|---|---|
| Alloy 1 | 240 | 267 | 27 |
| Alloy 2 | 243 | 286 | 43 |
| Alloy 3 | 248 | 276 | 28 |
| Alloy 4 | 222 | 273 | 51 |
| Alloy 5 | 210 | 277 | 67 |
| Alloy 6 | 217 | 268 | 51 |
| Alloy 7 | 239 | 249 | 10 |
| Alloy 8 | 237 | 264 | 27 |
| Alloy 9 | 233 | 285 | 52 |
| Alloy 10 | 229 | 268 | 39 |
| Alloy 11 | 154 | 215 | 61 |
| Alloy 12 | 200 | 248 | 48 |
| Alloy 13 | 200 | 257 | 57 |
| Alloy 14 | 212 | 248 | 36 |

TABLE 18-continued

A Summary on Microhardness of the Base Metal and the Heat Affected Zone

| Alloy | Average Microhardness (HV) of Alloys (Table 7) (kg/mm$^2$) | Average Microhardness (HV) of Base Metal of the Weld (Tables 9 through 17) (kg/mm$^2$) | Microhardness (HV) Difference (kg/mm$^2$) |
|---|---|---|---|
| Alloy 15 | 229 | 305 | 76 |
| Alloy 16 | 178 | 223 | 45 |
| Alloy 17 | 483 | 470 | −13 |

CASE EXAMPLES

Case Example #1: Weld Lobe of Alloy 8 for Self-to-Self Resistance Spot Welding Alloy 8 sheet with a thickness of ~1.4 mm was used for welding trials. Chemical composition of the alloy is listed in Table 1. Sheet material for welding was used in the annealed condition and tested in tension for property evaluation. Ultimate tensile strength varied from 1141 to 1199 MPa, yield strength from 381 to 411 MPa, and tensile elongation from 44.2 to 61.8%. The Vickers hardness of the sheet material used for welding was converted from Rockwell C (HRC) hardness measurements with values from 186 to 247 HV and average value of 222 HV.

Sheet samples were sheared off in 610 mm increments. Fourteen sheared sheet samples were used for resistance spot welding trials. The spot welding system used for the study is schematically diagrammed in FIG. 5 utilizing the MFDC method. It consisted of a Miyachi MFDC ISA-500 inverter power supply with controller that provided power to the primary coil to a RoMan 9.0 V DC transformer. The secondary coil power from the transformer was reduced in voltage thus increasing the current in order to do the actual spot welding through B nose electrodes that were dressed with a face diameter of 5.5 mm. The weld current was measured using a Miyachi mm-326B weld checker system for feedback control. Sheet samples were joined self-to-self by single pulse spot welds.

Figure 23:
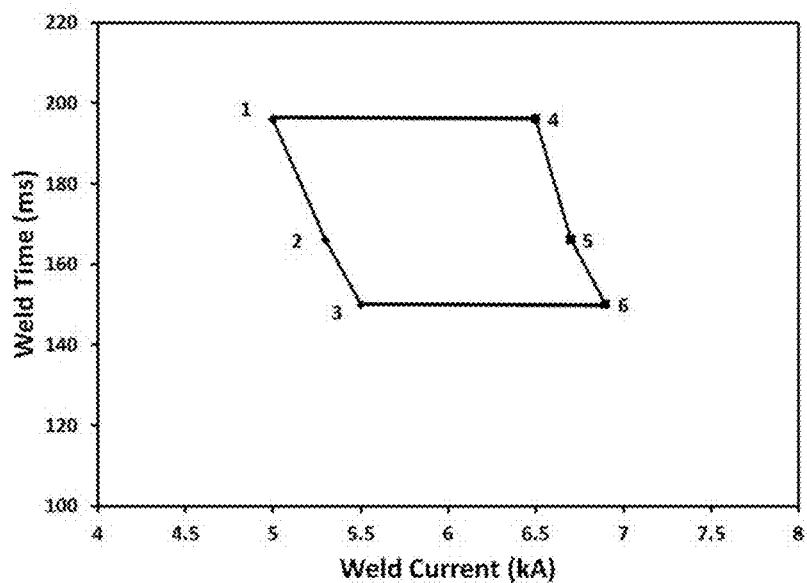
FIG. 23 The weld lobe for single pulse welding of sheet samples from Alloy 8 at 4.2 kN clamping force. Edge points defining the weld lobe area are marked from 1 to 6.
Figure 24:
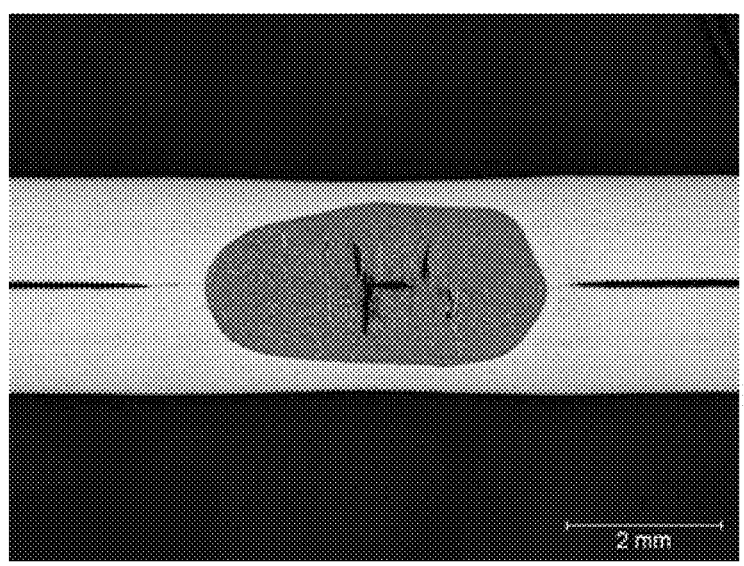
FIG. 24 An image of the spot weld nugget cross section corresponding to Point 1 of the weld lobe for Alloy 8 in FIG. 23.
Figure 25:
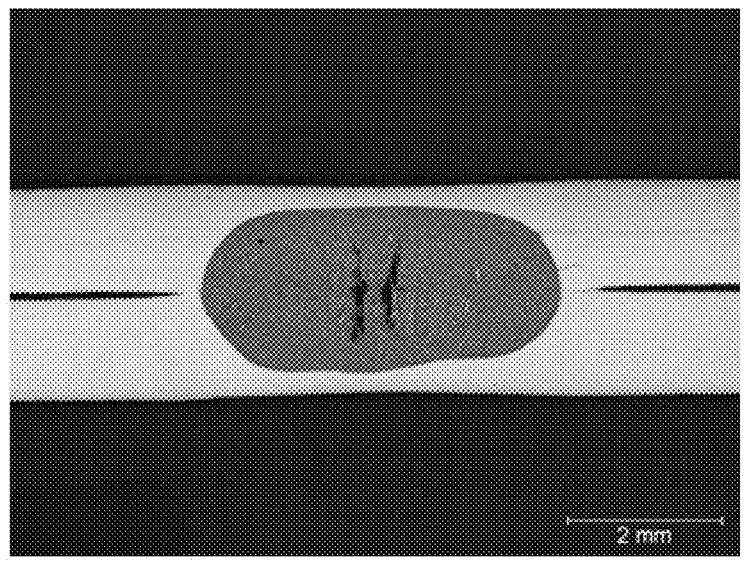
FIG. 25 An image of the spot weld nugget cross section corresponding to Point 2 of the weld lobe for Alloy 8 in FIG. 23.
Figure 26:
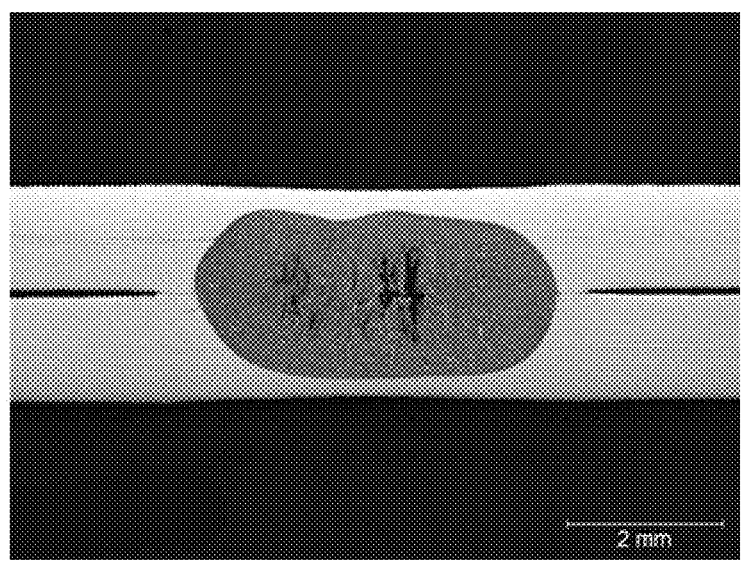
FIG. 26 An image of the spot weld nugget cross section corresponding to Point 3 of the weld lobe for Alloy 8 in FIG. 23.
Figure 27:
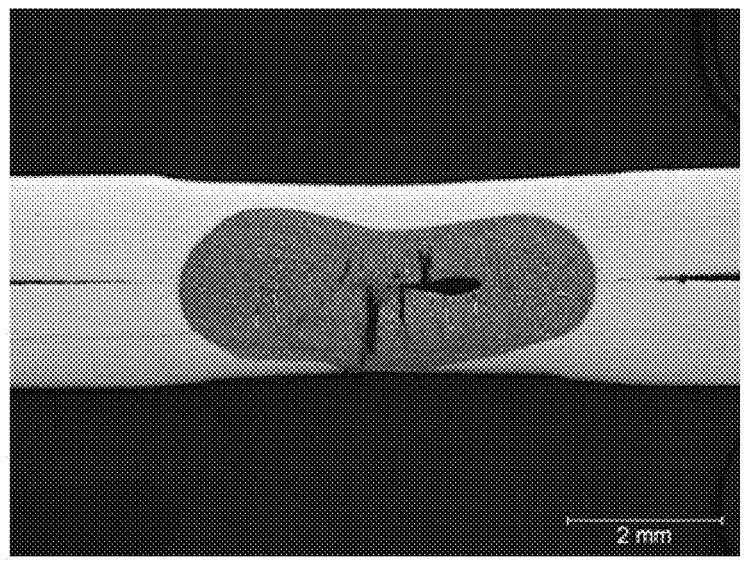
FIG. 27 An image of the spot weld nugget cross section corresponding to Point 4 of the weld lobe for Alloy 8 in FIG. 23.
Figure 28:
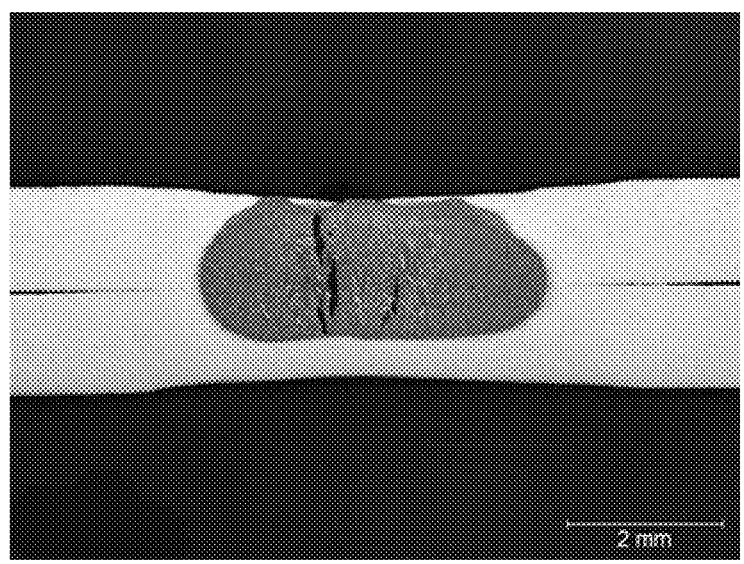
FIG. 28 An image of the spot weld nugget cross section corresponding to Point 5 of the weld lobe for Alloy 8 in FIG. 23.
Figure 29:
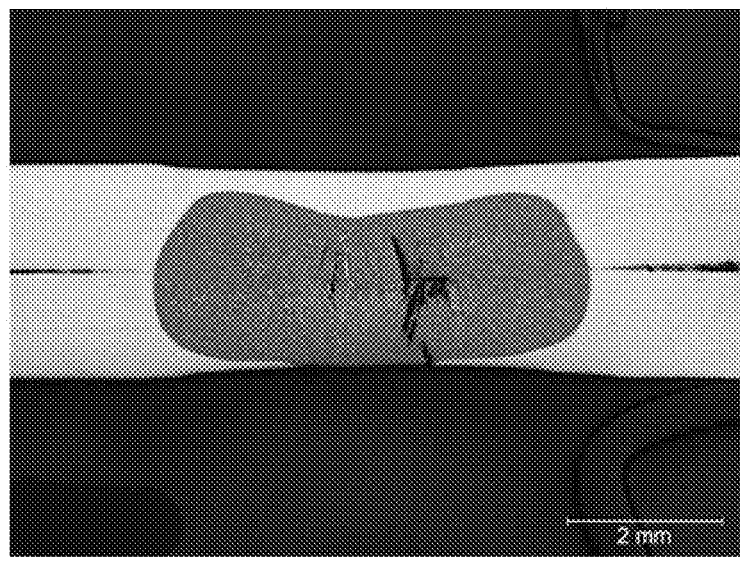
FIG. 29 An image of the spot weld nugget cross section corresponding to Point 6 of the weld lobe for Alloy 8 in FIG. 23.
Figure 30:
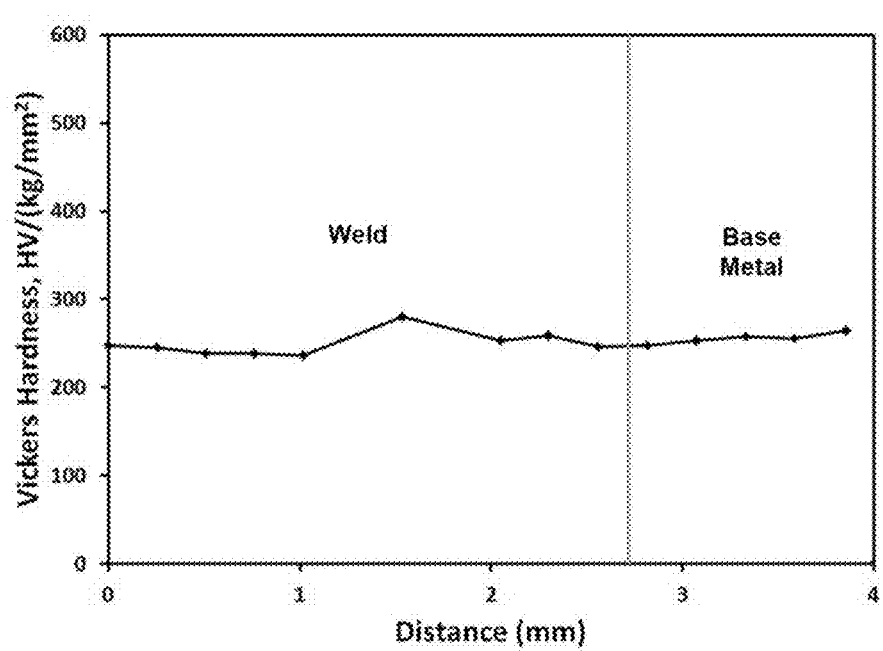
FIG. 30 Microhardness as a function of the distance across the boundary between the fusion zone and the base metal in the sample welded at parameters corresponding to Point 1 of the weld lobe for Alloy 8 in FIG. 23.
Figure 31:
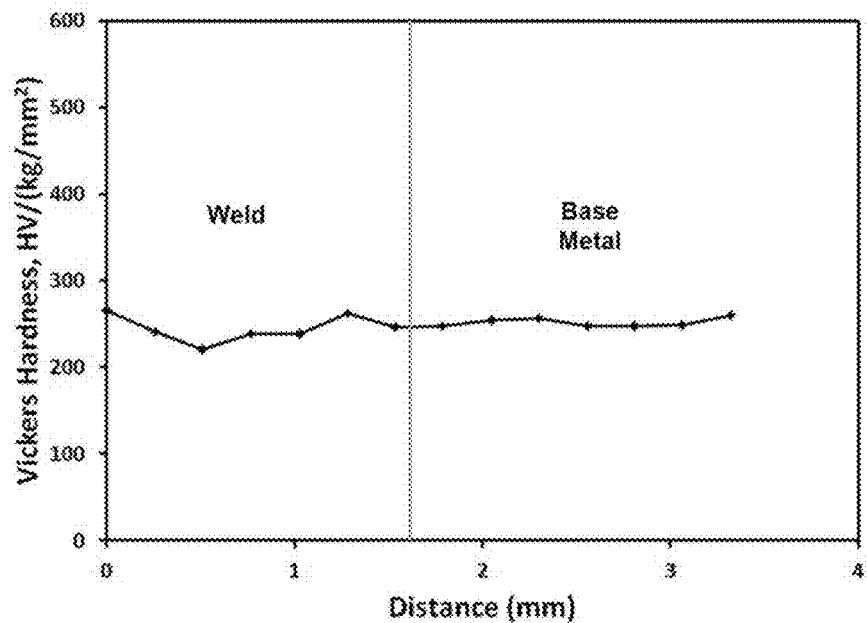
FIG. 31 Microhardness as a function of the distance across the boundary between the fusion zone and the base metal in the sample welded at parameters corresponding to Point 2 of the weld lobe for Alloy 8 in FIG. 23.
Figure 32:
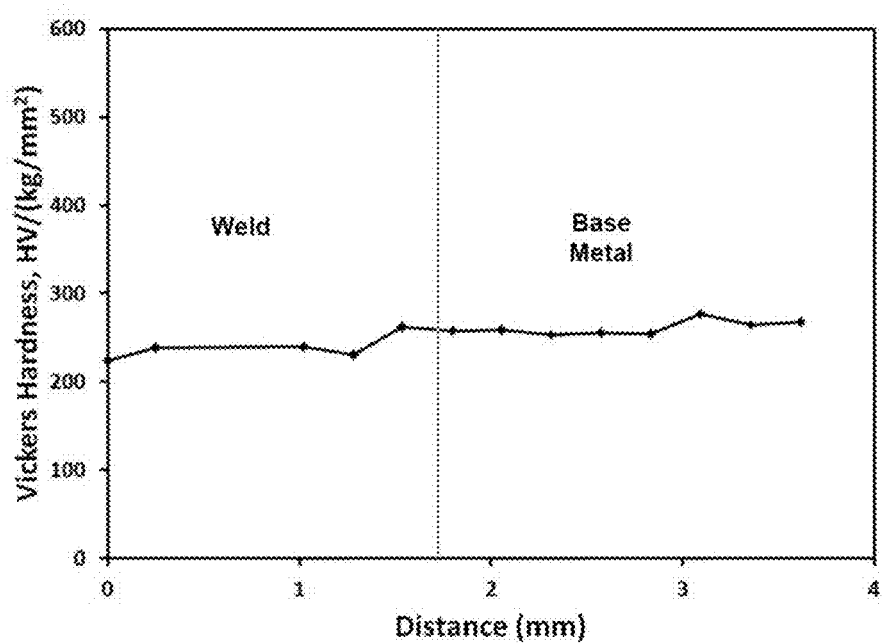
FIG. 32 Microhardness as a function of the distance across the boundary between the fusion zone and the base metal in the sample welded at parameters corresponding to Point 3 of the weld lobe for Alloy 8 in FIG. 23.
Figure 33:
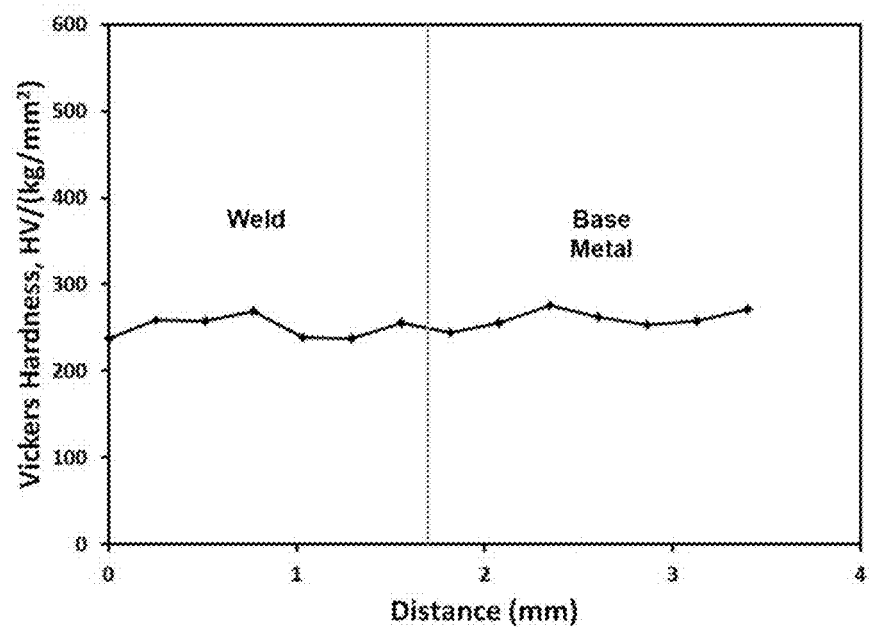
FIG. 33 Microhardness as a function of the distance across the boundary between the fusion zone and the base metal in the sample welded at parameters corresponding to Point 4 of the weld lobe for Alloy 8 in FIG. 23.
Figure 34:
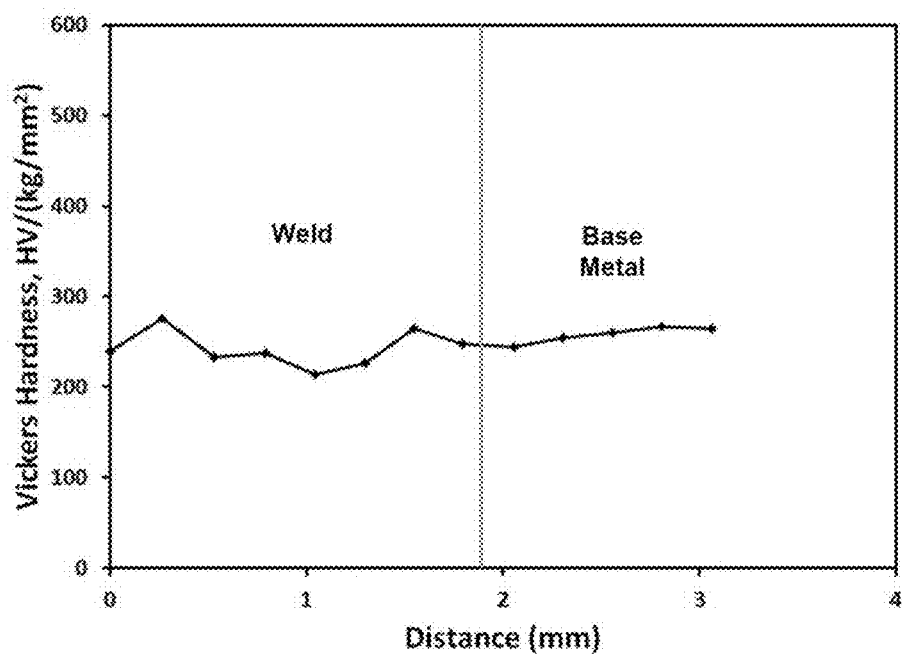
FIG. 34 Microhardness as a function of the distance across the boundary between the fusion zone and the base metal in the sample welded at parameters corresponding to Point 5 of the weld lobe for Alloy 8 in FIG. 23.

The weld parameters used to determine the weld lobe are listed in Table 19. The weld lobe is defined as the spot welding window based on the spot welding process parameters of weld current and cycle time at fixed force. The welding window is the range of current at fixed cycle time and force between expulsion and minimum nugget size, which is considered to be optimal at 5.0 mm in diameter and on the high current side when expulsion occurs. Thus at any combination of weld parameters inside the weld lobe the result of spot welding should be a good weld nugget. The weld lobe of the Alloy 8 is shown in FIG. 23 and parameters determined at weld testing corresponding to marked points in FIG. 23 are listed in Table 20. The spot weld parameters of the Alloy 8 are determined to be in a range of parameters that are commonly used in industrial spot welding applications.

Cross section samples for microstructural evaluation were cut by EDM from the spot welded sheets mounted in epoxy. The samples were polished progressively with 9 μm, 6 μm, and 1 μm diamond suspension solution then finally with 0.02 μm silica solution. After polishing the cross section was etched with 2% Nital solution. Images of the spot weld nugget cross sections corresponding to the six points defining the weld lobe of the Alloy 8 (FIG. 23) are shown in FIG. 24 through FIG. 29. In each image, the fusion zone is clearly visible due to its difference with the Alloy 8 base metal structure.

TABLE 19

Spot Welding Parameters

| Parameter | Range |
|---|---|
| Clamping Force | 4.2 kN |
| Weld Time | 150 to 196 ms |
| Weld Current | 5.0 to 6.9 kA |
| Hold Time | 33 ms |

TABLE 20

Weld Lobe Parameters

| Point | Weld Time ms | Weld Current kA | Nugget Diameter mm | Description |
|---|---|---|---|---|
| 1 | 196 | 5.0 | 5.10 | Min Nugget Size |
| 2 | 166 | 5.3 | 5.05 | Min Nugget Size |
| 3 | 150 | 5.5 | 5.05 | Min Nugget Size |
| 4 | 196 | 6.5 | 6.45 | Expulsion |
| 5 | 166 | 6.7 | 6.45 | Expulsion |
| 6 | 150 | 6.9 | 6.60 | Expulsion |

Microhardness measurements as a function of distance across the interface between the fusion zone and base metal were made on each weld lobe sample. Note, the measurements are done on one side of the weld nugget only since the welding was done self-to self. The load used for the microhardness measurements was 500 g. The results are listed in Table 21 and plotted in FIG. 30 through FIG. 35 for each sample welded at parameters corresponding to the six points defining the weld lobe of the Alloy 8 (FIG. 23). The measured microhardness of the base sheet material in the areas adjacent to the fusion zone varies from 244 to 292 HV with an average at 258 HV.

Three lap shear specimens were spot welded self-to-self from Alloy 8 sheet using the weld parameters corresponding to each of the six points defining the weld lobe of the alloy (FIG. 23) and then tested until rupture. A schematic illustration of the lap shear testing is shown in FIG. 36. The width of the sheet samples was 24 mm with a length of 125 mm. The shear area was 30 mm. The test results for the lap shear testing are listed in Table 22 with rupture force ranging from 6.8 kN to 13.5 kN.

TABLE 21

Microhardness Measurement Data Across Fusion Zone Interface With Base Metal

|  | Area of the Weld | | | | | | | | | | | |
|---|---|---|---|---|---|---|---|---|---|---|---|---|
|  | Point 1 | | Point 2 | | Point 3 | | Point 4 | | Point 5 | | Point 6 | |
|  | Dist. (mm) | HV (kg/mm²) | Dist. (mm) | HV (kg/mm²) | Dist. (mm) | HV (kg/mm²) | Dist. (mm) | HV (kg/mm²) | Dist. (mm) | HV (kg/mm²) | Dist. (mm) | HV (kg/mm²) |
| Fusion | — | — | — | — | — | — | — | — | — | — | 0 | 242 |
| Zone | 0 | 248 | — | — | — | — | — | — | — | — | 0.25 | 235 |
|  | 0.26 | 245 | — | — | — | — | — | — | 0 | 240 | 0.5 | 183 |
|  | 0.51 | 239 | 0 | 266 | — | — | 0 | 237 | 0.26 | 276 | 0.77 | 153 |
|  | 0.77 | 238 | 0.26 | 241 | — | — | 0.25 | 259 | 0.53 | 233 | 1.01 | 253 |
|  | 1.02 | 236 | 0.51 | 220 | 0 | 224 | 0.51 | 258 | 0.79 | 237 | 1.26 | 267 |
|  | 1.53 | 280 | 0.77 | 239 | 0.25 | 238 | 0.77 | 269 | 1.04 | 214 | 1.51 | 248 |
|  | 2.05 | 253 | 1.03 | 238 | 1.02 | 240 | 1.03 | 238 | 1.30 | 226 | 1.76 | 265 |
|  | 2.3 | 259 | 1.28 | 262 | 1.28 | 231 | 1.29 | 237 | 1.55 | 264 | 2.02 | 232 |
|  | 2.56 | 246 | 1.54 | 246 | 1.54 | 262 | 1.56 | 256 | 1.80 | 247 | 2.26 | 252 |
| Base | 2.82 | 247 | 1.79 | 248 | 1.8 | 258 | 1.82 | 244 | 2.05 | 244 | 2.51 | 245 |
| Metal | 3.07 | 253 | 2.05 | 254 | 2.06 | 259 | 2.08 | 255 | 2.31 | 254 | 2.76 | 260 |
|  | 3.33 | 258 | 2.30 | 257 | 2.32 | 253 | 2.34 | 276 | 2.56 | 260 | 3.02 | 280 |
|  | 3.59 | 255 | 2.56 | 248 | 2.57 | 255 | 2.61 | 262 | 2.81 | 267 | 3.28 | 292 |
|  | 3.86 | 264 | 2.81 | 247 | 2.83 | 254 | 2.86 | 253 | 3.06 | 264 | — | — |
|  | — | — | 3.06 | 249 | 3.09 | 277 | 3.13 | 258 | — | — | — | — |
|  | — | — | 3.32 | 260 | 3.36 | 264 | 3.40 | 271 | — | — | — | — |
|  | — | — | — | — | 3.62 | 268 | — | — | — | — | — | — |

TABLE 22

Lap Shear Results

| Point | Clamping Force kN | Weld Time ms | Weld Current kA | Hold Time ms | Rupture Load kN |
|---|---|---|---|---|---|
| 1 | 4.2 | 196 | 5.0 | 33 | 8.5 |
| 1 | 4.2 | 196 | 5.0 | 33 | 6.9 |
| 1 | 4.2 | 196 | 5.0 | 33 | 6.8 |
| 2 | 4.2 | 166 | 5.3 | 33 | 9.6 |
| 2 | 4.2 | 166 | 5.3 | 33 | 10.1 |
| 2 | 4.2 | 166 | 5.3 | 33 | 9.9 |
| 3 | 4.2 | 150 | 5.5 | 33 | 10.7 |
| 3 | 4.2 | 150 | 5.5 | 33 | 11.0 |
| 3 | 4.2 | 150 | 5.5 | 33 | 10.9 |
| 4 | 4.2 | 196 | 6.5 | 33 | 12.2 |
| 4 | 4.2 | 196 | 6.5 | 33 | 11.4 |
| 4 | 4.2 | 196 | 6.5 | 33 | 13.5 |
| 5 | 4.2 | 166 | 6.7 | 33 | 13.0 |
| 5 | 4.2 | 166 | 6.7 | 33 | 13.3 |
| 5 | 4.2 | 166 | 6.7 | 33 | 12.7 |
| 6 | 4.2 | 150 | 6.9 | 33 | 12.9 |
| 6 | 4.2 | 150 | 6.9 | 33 | 13.5 |
| 6 | 4.2 | 150 | 6.9 | 33 | 12.5 |

This Case Example demonstrates a weld lobe for sheet Alloy 8 with ultimate tensile strength higher than 1000 MPa (from 1141 to 1199 MPa) determined by using conventional spot welding technology. The weld lobe shows a range of welding parameters for joining Alloy 8 sheet self-to-self by resistance spot welding with good weld nuggets demonstrating high rupture force during lap shear testing. The microhardness measurements across the interface between the fusion zone and the base metal showed no evidence of deleterious HAZ with microhardness value in sheet material adjacent to fusion zone slightly higher (from 244 to 292 HV) than the average value for the sheet material used (222 HV).

Case Example #2: Single Pulse Self-to-Self Resistance Spot Welding of Alloy 8

Alloy 8 sheet with a thickness of ~1.4 mm was used for welding trials. Chemical composition of the alloy is listed in Table 1. Sheet material for welding was used in the annealed condition with ultimate tensile strength from 1141 to 1199 MPa, yield strength from 381 to 411 MPa, and tensile elongation from 44.2 to 61.8%. The average value of Vickers hardness of the sheet material used for welding was estimated at 222 HV.

Five lap shear specimens were joined by single pulse self-to-self spot welds with the parameters listed in Table 23 and then tested until rupture. A schematic illustration of the lap shear testing is shown in FIG. 36. The width of the sheet samples was 24 mm with a length of 125 mm. The shear area was 30 mm. The test results for the lap shear testing are listed in Table 24. The lap shear rupture force ranged from 14.6 kN to 15.6 kN.

TABLE 23

Spot Welding Parameters

| Parameter | Range |
|---|---|
| Clamping Force | 5.1 kN |
| Weld Time | 80 ms |
| Weld Current | 7.5 kA |
| Hold Time | 40 ms |

TABLE 24

Lap Shear Testing Results

| Sample | Clamping Force kN | Weld Tune ms | Weld Current kA | Hold Tune ms | Rupture Load kN |
|---|---|---|---|---|---|
| 51 | 5.1 | 80 | 7.5 | 40 | 15.5 |
| 52 | 5.1 | 80 | 7.5 | 40 | 15.6 |
| 53 | 5.1 | 80 | 7.5 | 40 | 15.0 |
| 54 | 5.1 | 80 | 7.5 | 40 | 14.6 |
| 55 | 5.1 | 80 | 7.5 | 40 | 14.8 |
|  | Average | | | | 15.1 |

Cross section specimens of the weld nuggets were cut by EDM from the spot welded samples for microstructural evaluation, which were mounted in epoxy. The cross section samples were polished progressively with 9 μm, 6 μm and 1 μm diamond suspension solution then finally with 0.02 μm silica solution. After polishing the cross section was etched with 2% Nital solution. The cross section microstructure was examined in a Zeiss EVO MA-10 scanning electron microscope.

Figure 37:
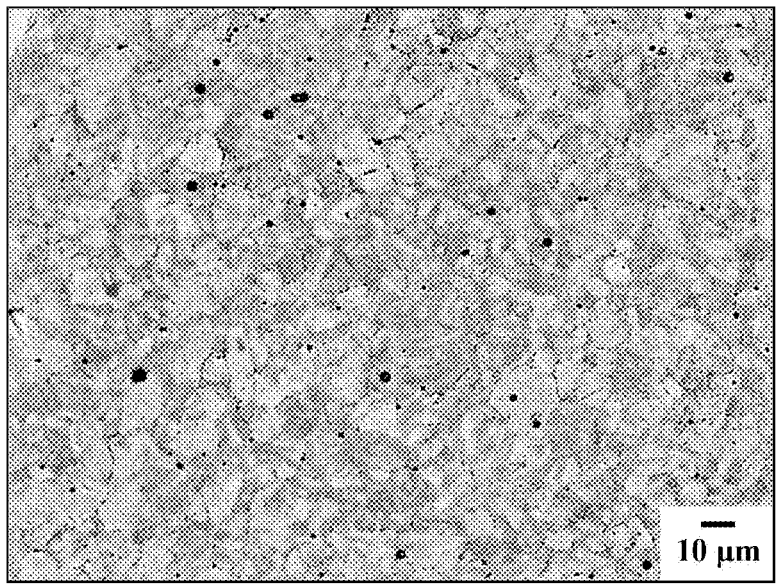
FIG. 37 A SEM micrograph of the recrystallized microstructure in the base metal in the single pulse self-to-self spot welded Alloy 8 sample.
Figure 38:
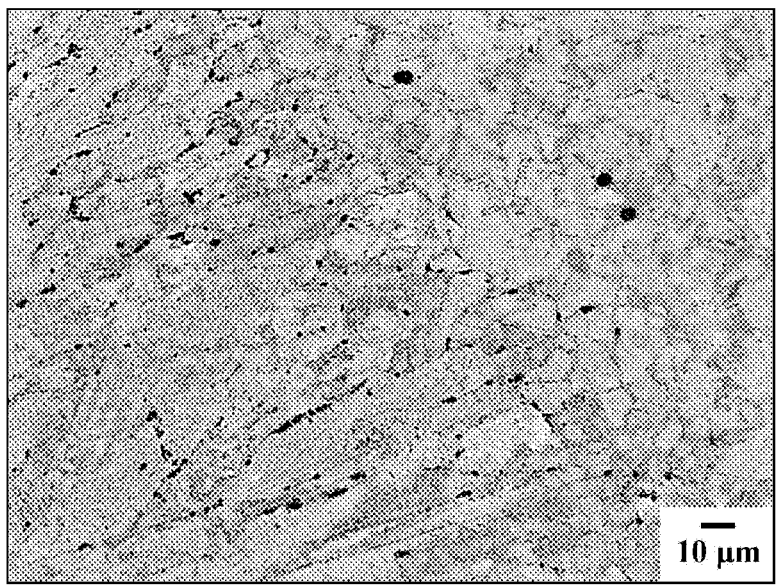
FIG. 38 A SEM micrograph of the microstructure at the interface between the fusion zone and the base metal in the single pulse self-to-self spot welded Alloy 8 sample.
Figure 39:
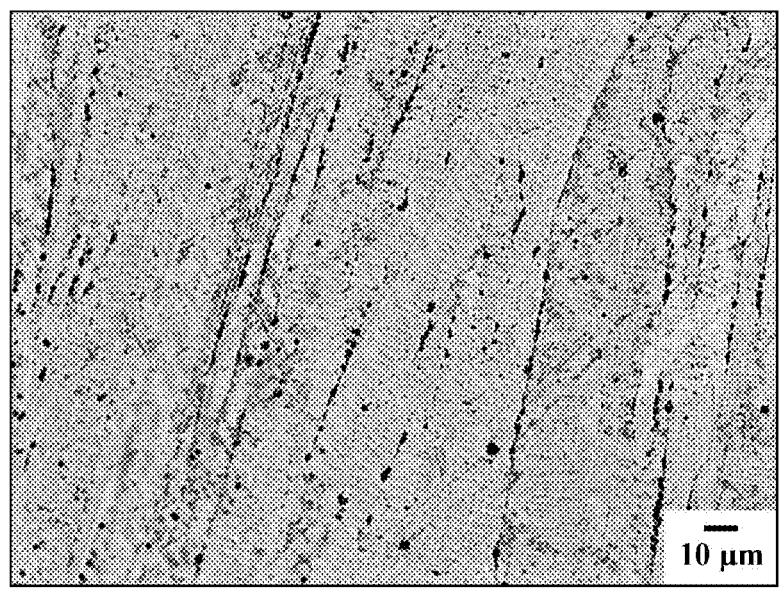
FIG. 39 A SEM micrograph of the microstructure in the fusion zone in the single pulse self-to-self spot welded Alloy 8 sample before lap shear testing.
Figure 40:
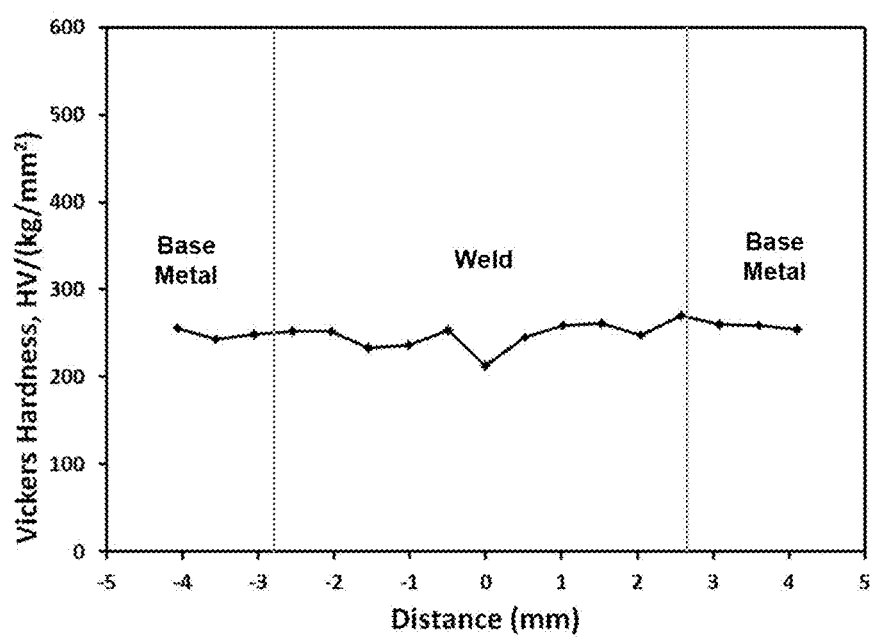
FIG. 40 Microhardness as a function of the distance across the weld nugget in the single pulse self-to-self spot welded Alloy 8 sample.

A SEM image of the microstructure of the base metal of Alloy 8 is provided in FIG. 37 showing typical recrystallized structure with equiaxed austenite grains. FIG. 38 shows a SEM image of the microstructure at the interface between the fusion zone and the base metal of Alloy 8 with a gradual transition from columnar dendritic structure in the fusion zone to the Alloy 8 sheet microstructure. FIG. 39 shows a SEM image of the microstructure in the fusion zone of the weld nugget. The microstructure contains long columnar dendrites with periodic spaced dendritic branches. Microhardness measurements were made on the self-to-self welded sample from Alloy 8 sheet across the weld nugget starting from the base metal of Alloy 8 through the fusion zone and back to the base metal. The results are plotted as a function of distance across the weld nugget in FIG. 40 and listed in Table 25. The measured microhardness of the base metal (Alloy 8 sheet) in the areas adjacent to the fusion zone varies from 243 to 260 HV with an average at 253 HV.

TABLE 25

Microhardness Measurement Data Across the Weld Nugget after Singe Pulse Self-to-Self Spot Welding of Alloy 8 Sheet

| Area of the Weld | Distance (mm) | HV (kg/mm²) |
|---|---|---|
| Base Metal | −4.06 | 255 |
|  | −3.56 | 243 |
|  | −3.05 | 249 |
| Fusion Zone | −2.55 | 252 |
|  | −2.04 | 252 |
|  | −1.54 | 233 |
|  | −1.02 | 236 |
|  | −0.50 | 253 |
|  | 0.00 | 213 |
|  | 0.52 | 245 |
|  | 1.02 | 259 |
|  | 1.53 | 261 |
|  | 2.05 | 247 |
|  | 2.57 | 270 |
| Base Metal | 3.08 | 260 |
|  | 3.60 | 259 |
|  | 4.10 | 254 |

This Case Example demonstrates that in a case of single pulse self-to-self spot welding of alloys herein, no evidence of deleterious HAZ was found with microhardness value in sheet material adjacent to the fusion zone slightly higher (from 243 to 260 HV) than the average value for the sheet material used (222 HV).

Case Example #3: Double Pulse Self-to-Self Resistance Spot Welding of Alloy 8

Alloy 8 sheet with a thickness of ~1.4 mm was used for welding trials. Chemical composition of the alloy is listed in Table 1. Sheet material for welding was used in the annealed condition with ultimate tensile strength from 1141 to 1199 MPa, yield strength from 381 to 411 MPa, and tensile elongation from 44.2 to 61.8%. The average value of Vickers hardness of the sheet material used for welding was estimated at 222 HV.

Five lap shear specimens were joined by double pulse self-to-self spot welds with the parameters listed in Table 26 and then tested until rupture. A schematic illustration of the lap shear testing is shown in FIG. 36. The width of the sheet samples was 24 mm with a length of 125 mm. The shear area was 30 mm. The test results for the lap shear testing are listed in Table 27. The lap shear rupture load ranged from 14.4 kN to 15.4 kN.

TABLE 26

Spot Welding Parameters
(Repeated Two Times)

| Parameter | Range |
|---|---|
| Clamping Force | 5.1 kN |
| Weld Time | 130 ms |
| Weld Current | 7.5 kA |
| Hold Time | 30 ms |
| Weld Time | 30 ms |
| Weld Current | 7.0 kA |

TABLE 27

Lap Shear Testing Results

| Sample | Clamping Force kN | Weld Time ms | Weld Current kA | Hold Time ms | Weld Time ms | Weld Current kA | Rupture Load kN |
|---|---|---|---|---|---|---|---|
| 40 | 5.1 | 130 | 7.5 | 30 | 30 | 7.0 | 14.4 |
| 41 | 5.1 | 130 | 7.5 | 30 | 30 | 7.0 | 15.3 |
| 42 | 5.1 | 130 | 7.5 | 30 | 30 | 7.0 | 15.4 |
| 43 | 5.1 | 130 | 7.5 | 30 | 30 | 7.0 | 15.4 |
| 44 | 5.1 | 130 | 7.5 | 30 | 30 | 7.0 | 14.6 |
| Average |  |  |  |  |  |  | 15.0 |

Cross section specimens of the weld nuggets were cut by EDM from the spot welded samples for microstructural evaluation, which were mounted in epoxy. The cross section samples were polished progressively with 9 μm, 6 μm and 1 μm diamond suspension solution then finally with 0.02 μm silica solution. After polishing the cross section was etched with 2% Nital solution. The cross section microstructure was examined in a Zeiss EVO MA-10 scanning electron microscope.

Figure 41:
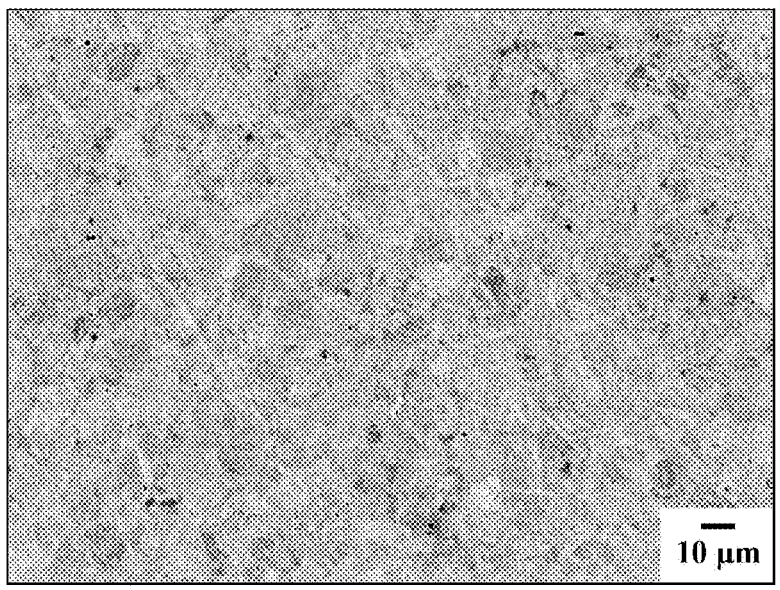
FIG. 41 A SEM micrograph of the recrystallized microstructure in the base metal in the double pulse self-to-self spot welded Alloy 8 sample.
Figure 42:
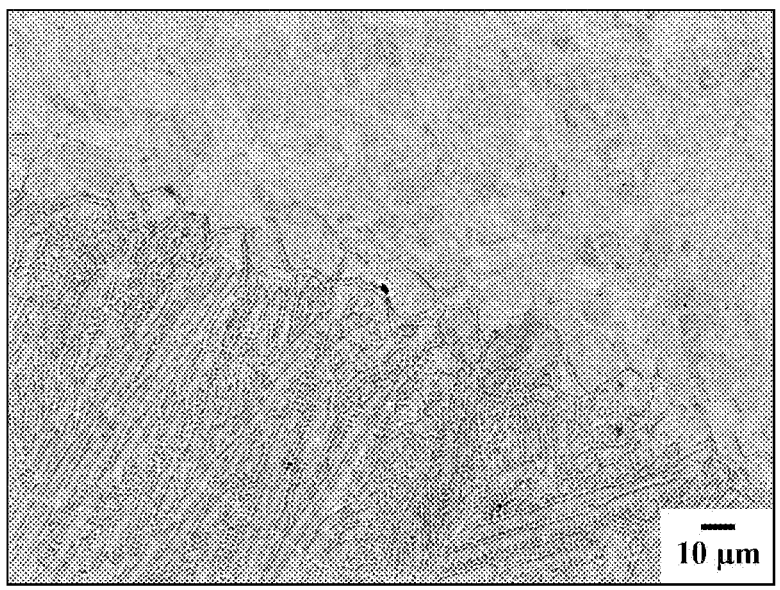
FIG. 42 A SEM micrograph of the microstructure at the interface between the fusion zone and the base metal in the double pulse self-to-self spot welded Alloy 8 sample.
Figure 43:
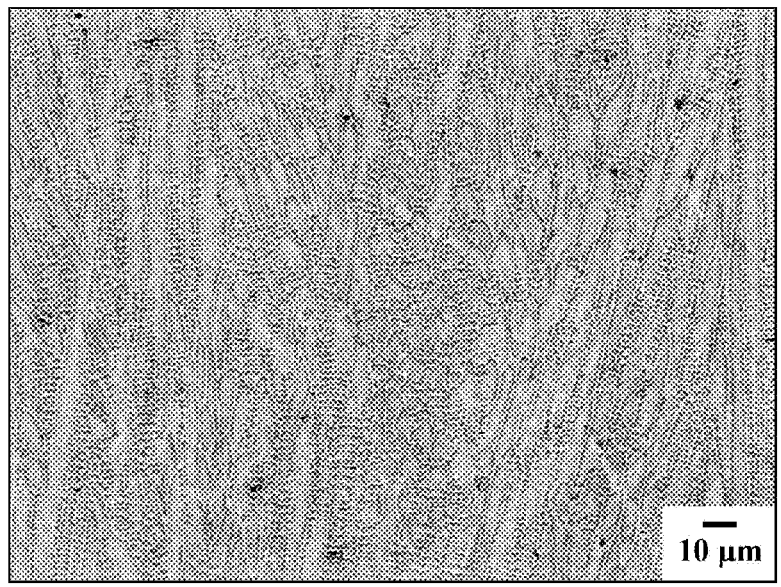
FIG. 43 A SEM micrograph of the fusion zone in the double pulse self-to-self spot welded Alloy 8 sample before lap shear testing.
Figure 44:
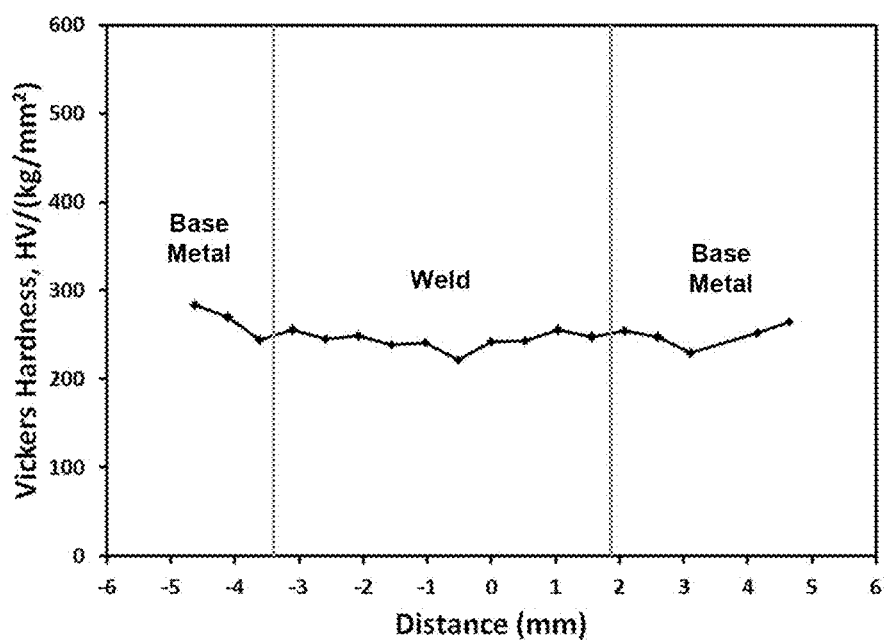
FIG. 44 Microhardness as a function of the distance across the weld nugget in the double pulse self-to-self spot welded Alloy 8 sample.

A SEM image of the microstructure of the base metal of Alloy 8 is provided in FIG. 41 showing typical recrystallized structure with equiaxed austenite grains. FIG. 42 shows a SEM image of the microstructure at the interface between the fusion zone and the base metal of Alloy 8. There is a gradual transition from columnar dendritic structure in the fusion zone of the weld nugget to the Alloy 8 sheet microstructure. A SEM image of the microstructure in the fusion zone is shown in FIG. 43. The microstructure contains long columnar dendrites with periodic spaced dendritic branches. Microhardness measurements were made on the self-to-self welded sample across the weld nugget starting from the base metal of Alloy 8 through the fusion zone and back to the base metal. The results are plotted as a function of distance across the weld nugget in FIG. 44 and listed in Table 28. The measured microhardness of the base metal (Alloy 8 sheet) in the areas adjacent to the fusion zone varies from 230 to 284 HV with an average at 256 HV.

TABLE 28

Microhardness Measurement Data Across the Weld Nugget after Double Pulse Self-to-Self Spot Welding of Alloy 8 Sheet

| Area of the Weld | Distance (mm) | HV (kg/mm$^2$) |
|---|---|---|
| Base Metal | −4.63 | 284 |
|  | −4.12 | 270 |
|  | −3.62 | 244 |
| Fusion Zone | −3.10 | 256 |
|  | −2.59 | 245 |
|  | −2.08 | 249 |
|  | −1.56 | 239 |
|  | −1.04 | 241 |
|  | −0.52 | 222 |
|  | 0.00 | 242 |
|  | 0.52 | 243 |
|  | 1.04 | 255 |
|  | 1.56 | 247 |
| Base Metal | 2.08 | 254 |
|  | 2.59 | 248 |
|  | 3.10 | 230 |
|  | 4.14 | 252 |
|  | 4.66 | 264 |

This Case Example demonstrates that in a case of double pulse self-to-self spot welding of alloys herein, no evidence of deleterious HAZ was found with microhardness value in sheet material adjacent to fusion zone slightly higher (from 230 to 284 HV) than the average value for the sheet material used (222 HV).

Case Example #4: Triple Pulse Resistance Spot Welding of Alloy 8

Alloy 8 sheet with a thickness of ~1.4 mm was used for welding trials. Chemical composition of the alloy is listed in Table 1. Sheet material for welding was used in the annealed condition with ultimate tensile strength from 1141 to 1199 MPa, yield strength from 381 to 411 MPa, and tensile elongation from 44.2 to 61.8%. The average value of Vickers hardness of the sheet material used for welding was estimated to be 222 HV.

Five lap shear specimens were joined by triple pulse self-to-self spot welding with the parameters listed in Table 29 and then tested until rupture. A schematic illustration of the lap shear testing is shown in FIG. 36. The width of the sheet samples was 24 mm with a length of 125 mm. The shear area was 30 mm. The test results for the lap shear testing are listed in Table 30. The lap shear rupture load ranged from 15.7 kN to 16.5 kN.

TABLE 29

Spot Welding Parameters (Repeated Three Times)

| Parameter | Range |
|---|---|
| Clamping Force | 5.1 kN |
| Weld Time | 80 ms |
| Weld Current | 7.5 kA |
| Hold Time | 40 ms |

TABLE 30

Lap Shear Testing Results

| Sample | Clamping Force kN | Weld Time ms | Weld Current kA | Hold Time ms | Pulses | Rupture Load kN |
|---|---|---|---|---|---|---|
| 62 | 5.1 | 80 | 7.5 | 40 | X3 | 16.5 |
| 63 | 5.1 | 80 | 7.5 | 40 | X3 | 16.0 |
| 64 | 5.1 | 80 | 7.5 | 40 | X3 | 15.7 |
| 65 | 5.1 | 80 | 7.5 | 40 | X3 | 15.8 |
| 66 | 5.1 | 80 | 7.5 | 40 | X3 | 16.0 |
| Average |  |  |  |  |  | 16.0 |

Cross section specimens of the weld nuggets were cut by EDM from the spot welded samples for microstructural evaluation, which were mounted in epoxy. The cross section samples were polished progressively with 9 μm, 6 μm and 1 μm diamond suspension solution then finally with 0.02 μm silica solution. After polishing the cross section was etched with 2% Nital solution. The cross section microstructure was examined in a Zeiss EVO MA-10 scanning electron microscope.

Figure 45:
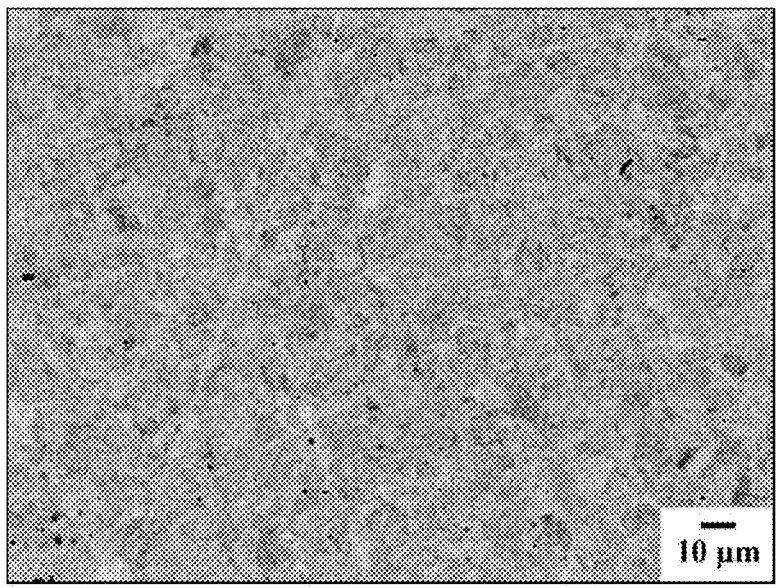
FIG. 45 A SEM micrograph of the recrystallized microstructure in the base metal of self-to-self spot welded Alloy 8 sample.
Figure 46:
FIG. 46 A SEM micrograph of the microstructure in the interface between the fusion zone and the base metal in the triple pulse self-to-self spot welded Alloy 8 sample.
Figure 47:
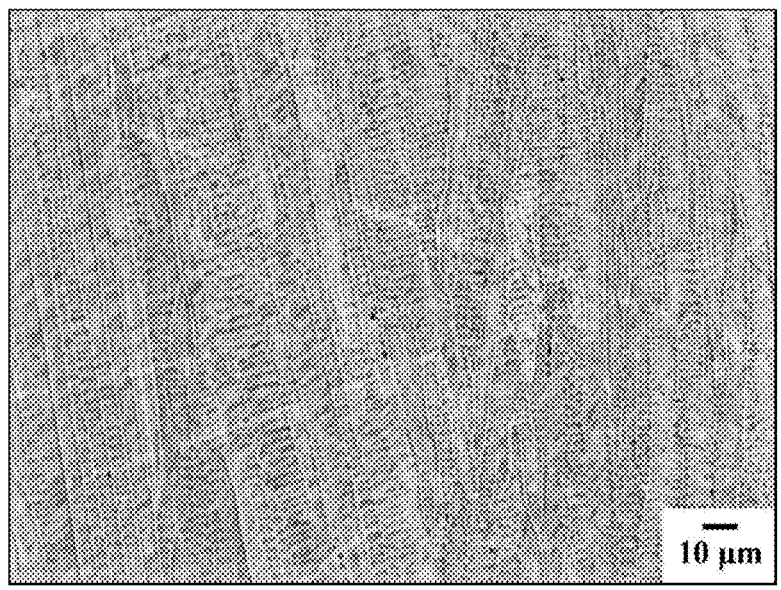
FIG. 47 A SEM micrograph of the microstructure in the fusion zone weld nugget in the triple pulse self-to-self spot welded Alloy 8 sample before lap shear testing.
Figure 48:
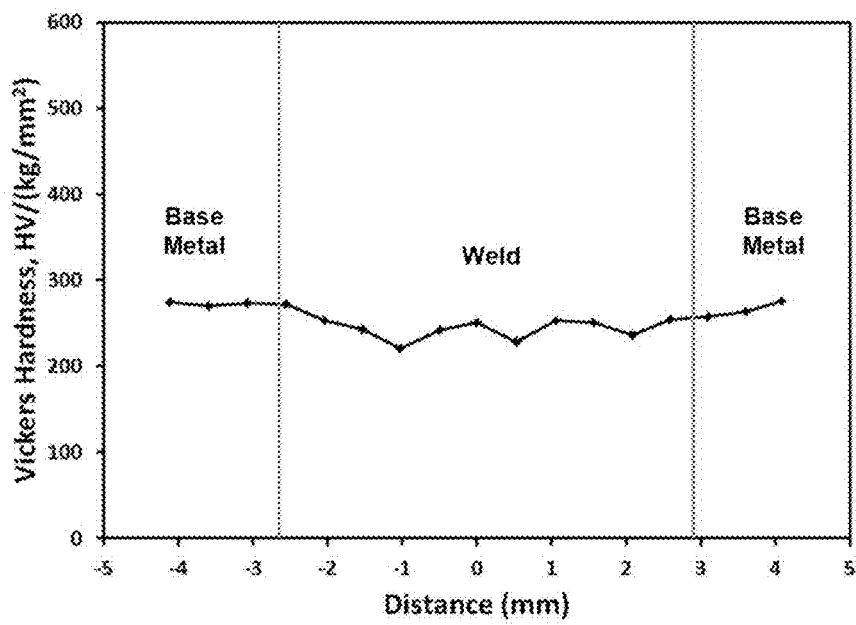
FIG. 48 Microhardness as a function of the distance across the weld nugget in the triple pulse self-to-self spot welded sample from Alloy 8.

FIG. 45 presents a SEM image of the microstructure of the base metal of Alloy 8 sheet showing typical recrystallized structure with equiaxed austenite grains. A SEM image of the microstructure at the interface between the base metal and the fusion zone of the weld nugget is shown in FIG. 46. There is a gradual transition from columnar dendritic structure of the fusion zone to the Alloy 8 sheet microstructure. A SEM image of the dendritic microstructure in the fusion zone is shown in FIG. 47. The microstructure contains long columnar dendrites with periodic spaced dendritic branches similar to that observed in cases of single and double pulse spot welding. Microhardness measurements were made on the self-to-self welded sample across the weld nugget starting from the base metal of Alloy 8 through the fusion zone and back to the base metal. The results are plotted as a function of distance across the weld nugget in FIG. 48 and listed in Table 31. The measured microhardness of the base metal (Alloy 8 sheet) in the areas adjacent to the fusion zone varies from 258 to 276 HV with an average at 269 HV.

TABLE 31

Microhardness Measurement Data Across the Weld Nugget After Triple Pulse Self-to-Self Spot Welding of Alloy 8 Sheet

| Area of the Weld | Distance (mm) | HV (kg/mm$^2$) |
|---|---|---|
| Base Metal | −4.11 | 275 |
|  | −3.59 | 270 |
|  | −3.08 | 273 |
| Fusion Zone | −2.56 | 272 |
|  | −2.05 | 253 |
|  | −1.53 | 243 |
|  | −1.02 | 220 |
|  | −0.49 | 242 |
|  | 0.00 | 251 |
|  | 0.53 | 228 |
|  | 1.06 | 253 |
|  | 1.57 | 251 |
|  | 2.08 | 236 |
|  | 2.58 | 254 |
| Base Metal | 3.09 | 258 |
|  | 3.60 | 263 |
|  | 4.08 | 276 |

This Case Example demonstrates that in a case of triple pulse self-to-self spot welding of the alloys herein, no evidence of deleterious HAZ was found with microhardness value in sheet material adjacent to fusion zone slightly higher (from 258 to 276 HV) than the average value for the sheet material used (222 HV).

Case Example #5: Resistance Spot Welding—Alloy 8 to IF Steel

Alloy 8 sheet with a thickness of ~1.4 mm and commercial sheet from IF steel were used for welding trials. Alloy 8 sheet for welding was used in the annealed condition with ultimate tensile strength from 1141 to 1199 MPa, yield strength from 381 to 411 MPa, and tensile elongation from 44.2 to 61.8%. The average value of Vickers hardness of the sheet material used for welding was estimated to be 222 HV.

The spot welding system used for the study is schematically diagrammed in FIG. 5 utilizing the MFDC method. It consisted of a Miyachi MFDC ISA-500 inverter power supply with controller that provided power to the primary coil to a RoMan 9.0 V DC transformer. The secondary coil power from the transformer was reduced in voltage thus increasing the current in order to do the actual spot welding through B nose electrodes that were dressed with a face diameter of 5.5 mm. The weld current was measured using a Miyachi mm-326B weld checker system for feedback control. Sheet samples were joined by single pulse spot welds.

Figure 49:
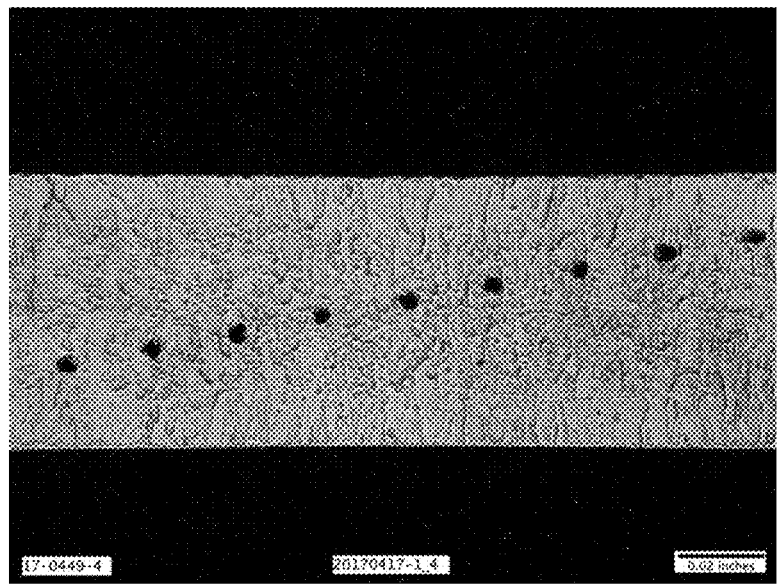
FIG. 49 A micrograph of the cross section of the IF steel self-to-self spot welded sample.
Figure 50:
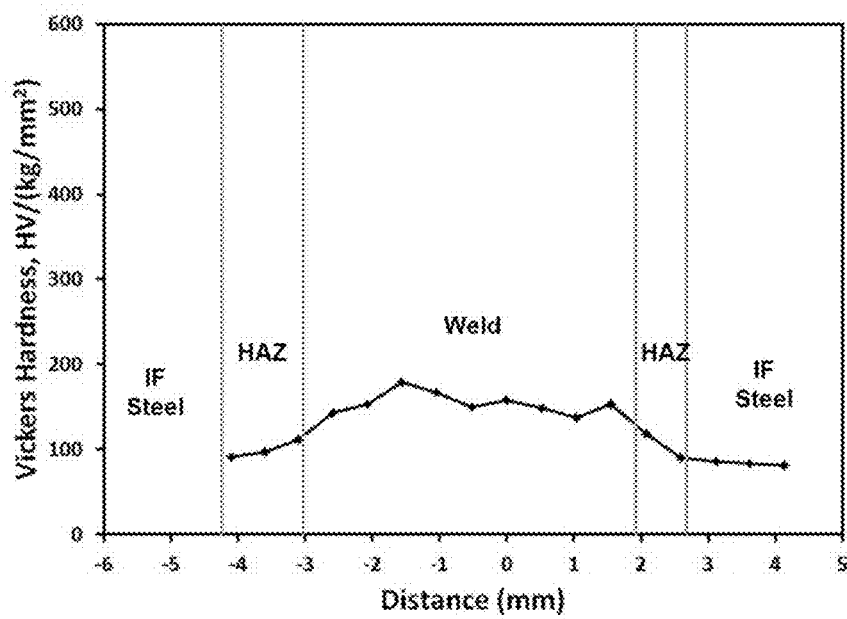
FIG. 50 Microhardness as a function of the distance across the weld nugget in the IF steel self-to-self spot welded sample.
Figure 51:
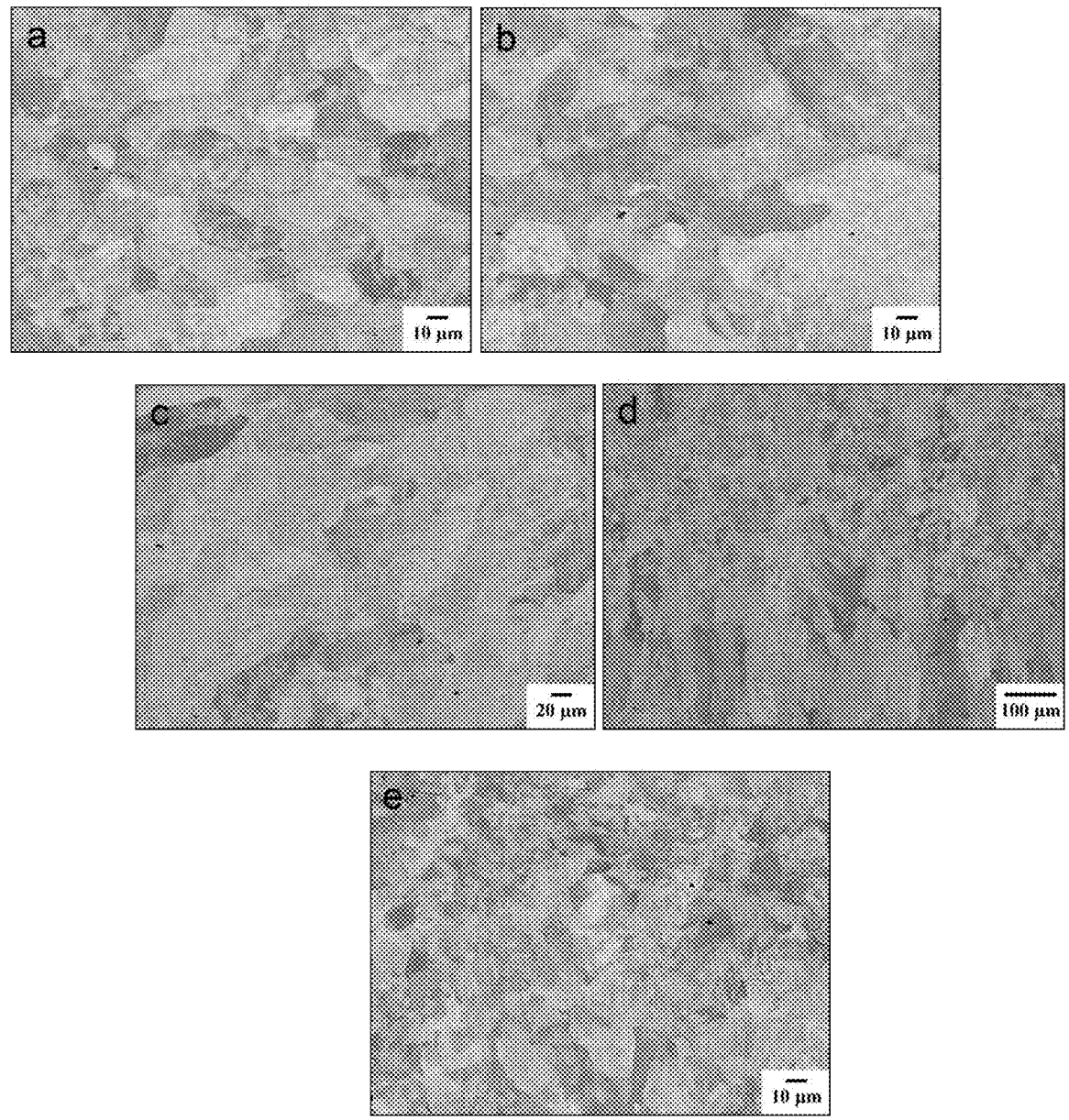
FIG. 51 SEM images of microstructure in the IF steel self-to-self welded sample; a) in the base metal b) at the interface between the base metal and the heat affected zone, c) in the heat affected zone, d) at the interface between the heat affected zone and the fusion zone, and e) in the fusion zone.

An optimized self-to-self spot welding of IF steel was performed and analyzed. The weld parameters used to form the IF steel to IF steel spot weld join are listed in Table 32. A micrograph of the spot weld is shown in FIG. 49. Microhardness measurements were made across the weld nugget starting from the HAZ through the fusion zone and HAZ on another side of the nugget to the base metal of IF steel. The results are listed in Table 33 and plotted in FIG. 50. The microhardness measurements showed that the fusion zone of the weld had higher hardness than the base metal with its gradual decrease in HAZ down to the values of microhardness for utilized IF steel sheet. Examination of the cross section of the weld nugget in a Zeiss MA-10 Scanning Electron Microscope (SEM) revealed distinct microstructural zones that are identified in the microhardness plot in FIG. 50. The base metal microstructure of IF steel is shown in FIG. 51*a*. The interface of the base metal with heat affected zone is shown in FIG. 51*b*. The microstructure in the heat affected zone is shown in FIG. 51*c*. FIG. 51*d* shows the interface between the heat affected zone and the fusion zone. The fusion zone microstructure is shown in FIG. 51*e*.

TABLE 32

IF Steel Self-to-Self Spot Welding Parameters

| Parameter | Range |
| --- | --- |
| Clamping Force | 2.4 kN |
| Weld Time | 220 ms |
| Weld Current | 12.5 kA |

TABLE 33

Microhardness Measurement Data Across the Weld Nugget After Self-to-Self Spot Welding of IF Steel

| | IF Steel to IF Steel | |
| --- | --- | --- |
| Area of the Weld | Distance (mm) | HV (kg/mm$^2$) |
| HAZ | −4.11 | 91 |
| | −3.60 | 97 |
| | −3.10 | 111 |
| | −2.58 | 143 |
| Fusion Zone | −2.07 | 153 |
| | −1.56 | 179 |
| | −1.04 | 166 |
| | −0.52 | 150 |
| | 0.00 | 157 |
| | 0.52 | 149 |
| | 1.04 | 137 |
| | 1.56 | 153 |
| HAZ | 2.08 | 118 |
| | 2.60 | 90 |
| Base Metal (IF Steel) | 3.11 | 85 |
| | 3.62 | 83 |
| | 4.14 | 81 |

Figure 54:
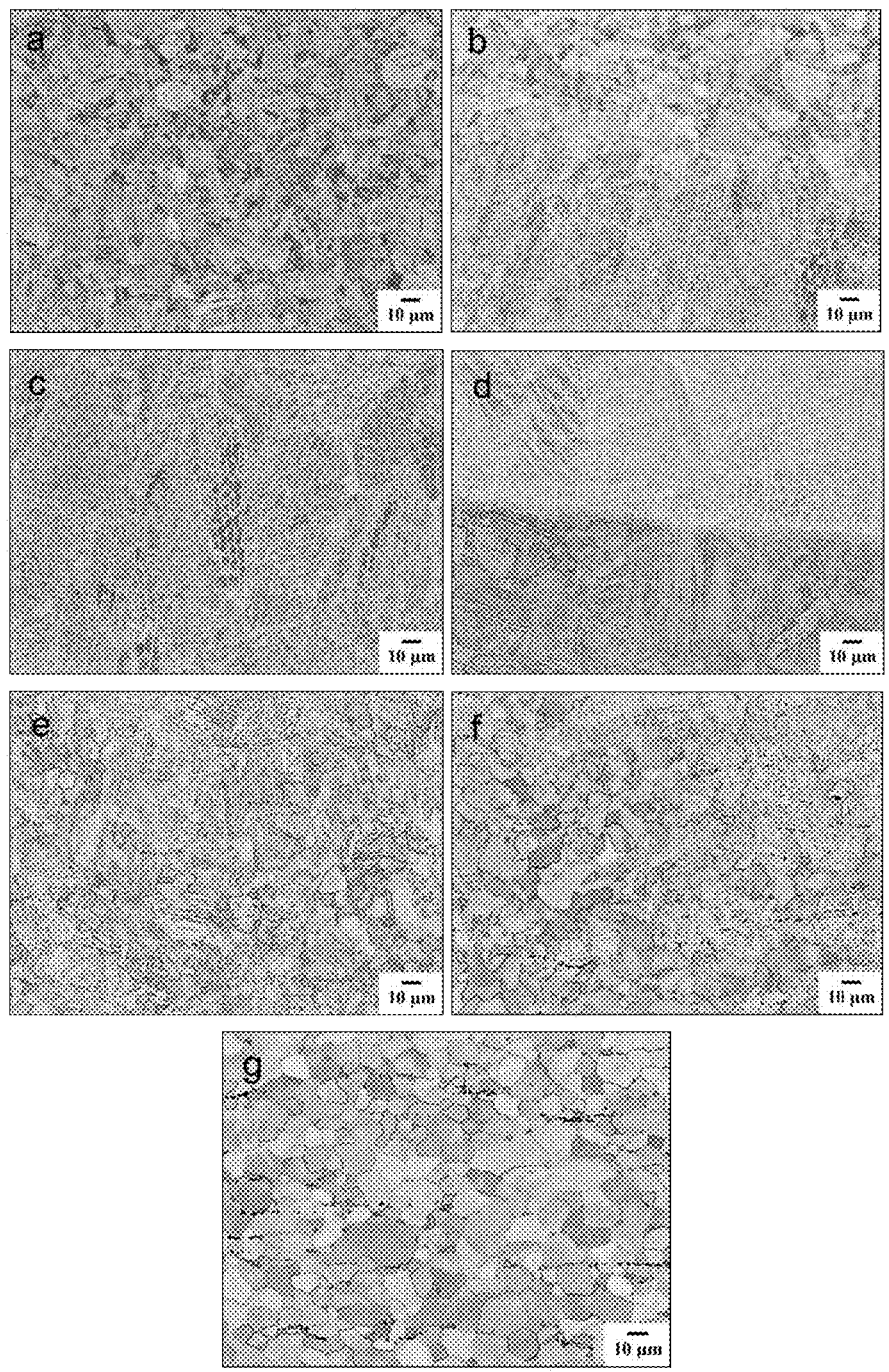
FIG. 54 SEM images of microstructure in the Alloy 8 to IF steel weld nugget; a) in the base metal of Alloy 8, b) at the interface between the base metal of Alloy 8 and the fusion zone c) in the fusion zone, d) at the interface between the fusion zone and the heat affected zone in IF steel, e) in the heat affected zone in IF steel, f) at the interface between the heat affected zone and the base metal of IF steel, and g) in the base metal of IF steel.

The weld parameters used to form the Alloy 8 to IF steel spot weld are listed in Table 34. A micrograph of the spot weld is shown in FIG. 52. Microhardness measurements were made across the weld nugget from the base metal of Alloy 8 through the fusion zone to the base metal of IF steel. The results are listed in Table 35 and plotted in FIG. 53. Structural analysis was performed using a Zeiss MA-10 Scanning Electron Microscope (SEM). The microstructure of the Alloy 8 base metal is shown in FIG. 54*a*. The base metal of Alloy 8 interface with the fusion zone of the weld nugget is shown in FIG. 54*b*. There is a gradual transition of the fusion zone microstructure to Alloy 8 base metal microstructure with no microstructural evidence of the HAZ. The fusion zone microstructure of the weld is shown in FIG. 54*c*. The fusion zone interface with the heat affected zone in the IF steel is shown in FIG. 54*d*. The heat affected zone microstructure in the IF steel is shown in FIG. 54*e*. The heat affected zone interface with the base metal of IF steel is shown in FIG. 54*f*. The IF steel base metal microstructure is shown in FIG. 54*g*, which is significantly different from that in the HAZ in FIG. 54*e*.

TABLE 34

Alloy 8 to IF Steel Spot Welding Parameters

| Parameter | Range |
| --- | --- |
| Clamping Force | 4.2 kN |
| Weld Time | 196 ms |
| Weld Current | 7.0 kA |
| Hold Time | 33 ms |

TABLE 35

Microhardness Measurement Data Across the Weld Nugget After Spot Welding of Alloy 8 to IF Steel

| | Alloy 8 to IF Steel | |
|---|---|---|
| Area of the Weld | Distance (mm) | HV (kg/mm$^2$) |
| Base Metal (Alloy 8) | -2.29 | 283 |
| | -2.03 | 278 |
| Fusion Zone | -1.77 | 382 |
| | -1.52 | 331 |
| | -1.27 | 335 |
| | -1.02 | 319 |
| | -0.76 | 307 |
| | -0.51 | 313 |
| HAZ | -0.25 | 327 |
| | 0.00 | 367 |
| | 0.51 | 369 |
| | 0.76 | 285 |
| | 1.02 | 281 |
| | 1.27 | 274 |
| | 1.52 | 248 |
| | 1.78 | 230 |
| Base Metal (IF Steel) | 2.03 | 178 |
| | 2.28 | 143 |

This Case Example shows that Alloy 8 can be spot welded to commercially produced IF steel using conventional spot welding technology. The resulting spot weld did not show a deleterious heat affected zone at the Alloy 8 interface with the fusion zone with microhardness value in sheet material adjacent to fusion zone slightly higher (from 278 to 283 HV) than the average value for the sheet material used (222 HV).

Case Example #6: Resistance Spot Welding—Alloy 8 to DP980

Alloy 8 sheet with a thickness of ~1.4 mm and commercial sheet from DP980 steel were used for welding trial. Alloy 8 sheet for welding was used in the annealed condition with ultimate tensile strength from 1141 to 1199 MPa, yield strength from 381 to 411 MPa, and tensile elongation from 44.2 to 61.8%. The average value of Vickers hardness of the sheet material used for welding was estimated to be 222 HV. The spot welding system is schematically diagrammed in FIG. 5, which was by the MFDC method. It consisted of a Miyachi MFDC ISA-500 inverter power supply with controller that provided power to the primary coil to a RoMan 9.0 V DC transformer. The secondary coil power from the transformer was reduced in voltage thus increasing the current in order to do the actual spot welding through B nose electrodes that were dressed with a face diameter of 5.5 mm. The weld current was measured using a Miyachi mm-326B weld checker system for feedback control.

Figure 55:
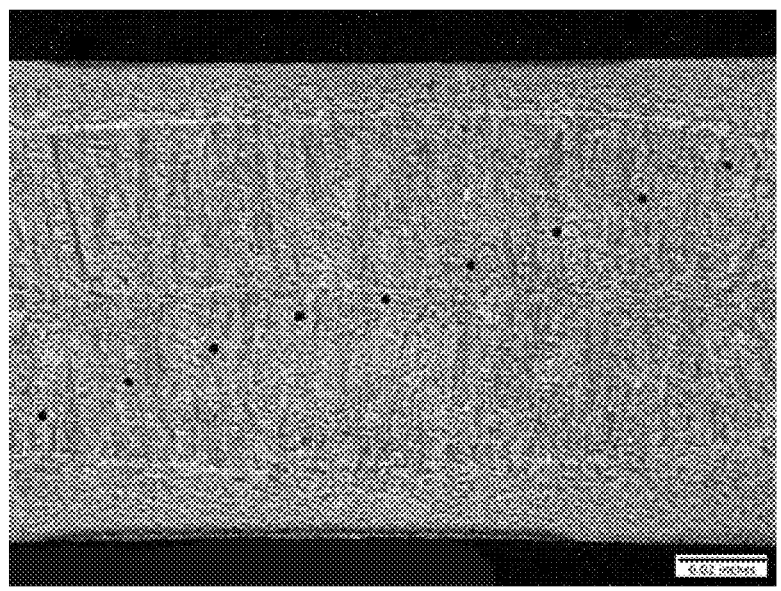
FIG. 55 A micrograph of the spot weld nugget cross section in the DP980 self-to-self spot welded sample.
Figure 56:
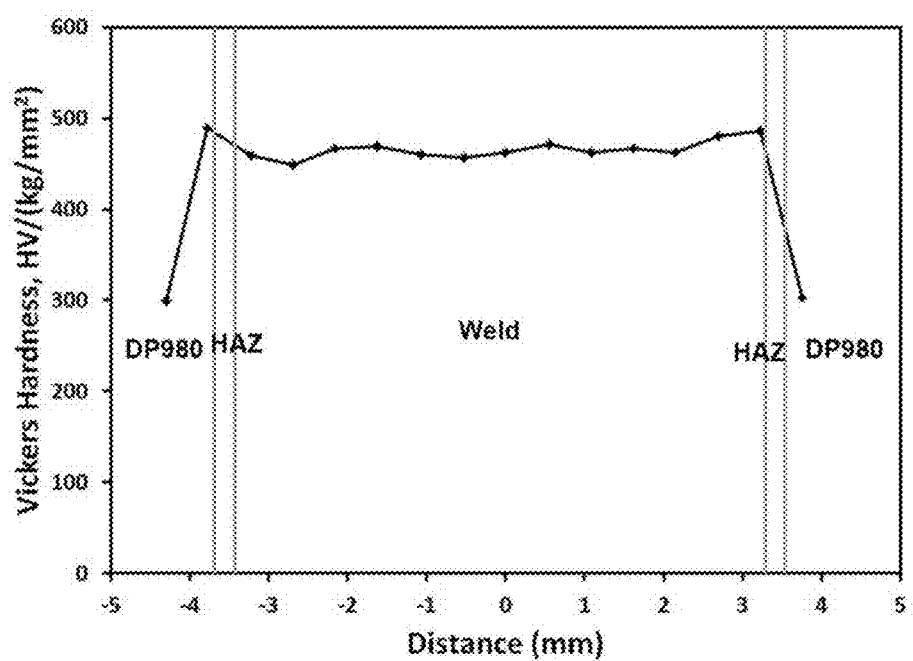
FIG. 56 Microhardness as a function of the distance across the weld nugget in the DP980 self-to-self spot welded sample.
Figure 57:
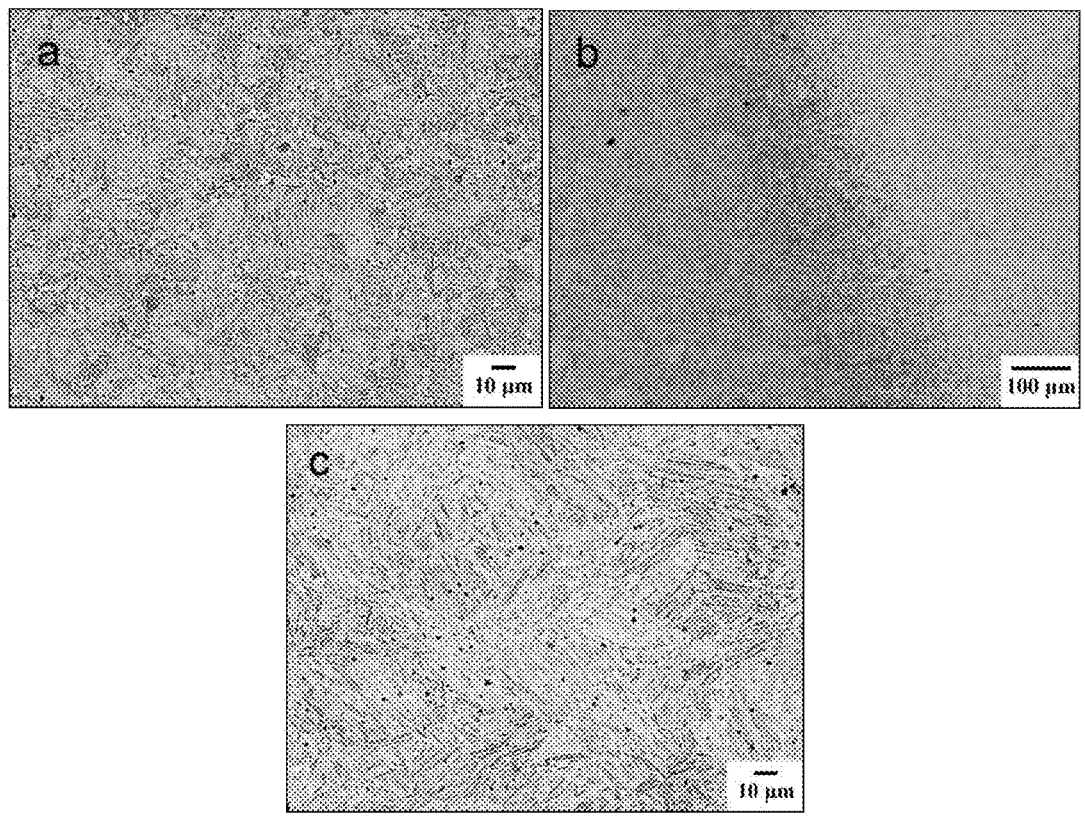
FIG. 57 SEM images of microstructure in the DP980 self-to-self spot welded sample; a) in the base metal, b) at the interface between the base metal and the fusion zone, and c) in the fusion zone.

An optimized self-to-self spot welding of DP980 steel was first examined as a control in order to compare to the case when Alloy 8 was spot welded to DP980. The weld parameters used to form self-to-self spot weld of DP980 are listed in Table 36. A micrograph of the spot weld is shown in FIG. 55. Microhardness measurements were made across the weld nugget from HAZ on one side to HAZ on another side. The results are listed in Table 37 and plotted in FIG. 56. Structural analysis was performed using a Zeiss MA-10 Scanning Electron Microscope (SEM). The base metal microstructure of DP980 is shown in FIG. 57*a*. The interface between the base metal and the fusion zone is presented in FIG. 57*b* at lower magnification clearly showing the presence of the HAZ with different contrast along the interface. The fusion zone microstructure is shown in FIG. 57*c*.

TABLE 36

DP980 Self-to-Self Spot Welding Parameters

| Parameter | Range |
|---|---|
| Clamping Force | 4.2 kN |
| Weld Time | 270 ms |
| Weld Current | 8.2 kA |

TABLE 37

Microhardness Measurement Data Across the Weld Nugget After Self-to-Self Spot Welding of DP980 Steel

| | DP980 to DP980 | |
|---|---|---|
| Area of the Weld | Distance (mm) | HV (kg/mm$^2$) |
| HAZ | -4.30 | 299 |
| Fusion Zone | -3.77 | 489 |
| | -3.22 | 459 |
| | -2.69 | 449 |
| | -2.15 | 467 |
| | -1.62 | 469 |
| | -1.07 | 460 |
| | -0.53 | 457 |
| | 0.00 | 463 |
| | 0.55 | 471 |
| | 1.08 | 463 |
| | 1.62 | 467 |
| | 2.15 | 463 |
| | 2.69 | 480 |
| | 3.23 | 486 |
| HAZ | 3.76 | 303 |

Figure 58:
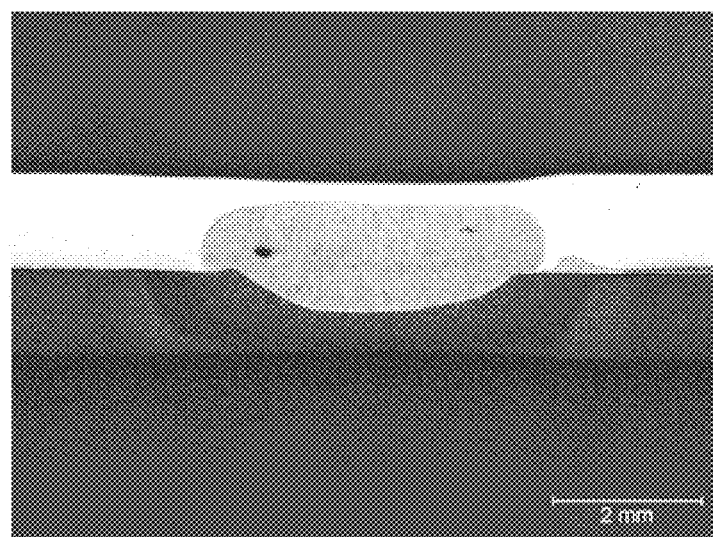
FIG. 58 A micrograph of the cross section of the Alloy 8 (top) to DP980 (bottom) spot weld nugget.
Figure 59:
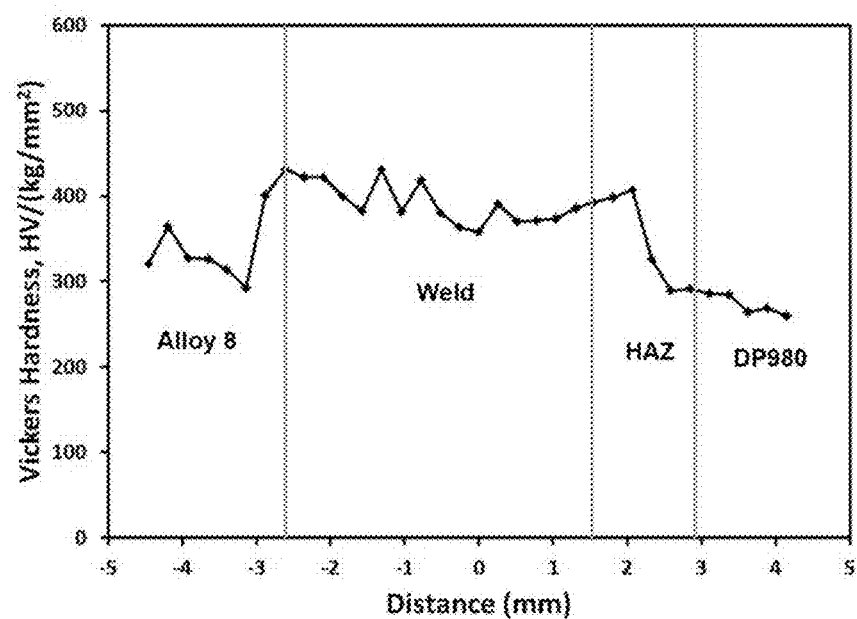
FIG. 59 Microhardness as a function of the distance across the Alloy 8 to DP980 spot weld nugget.
Figure 60:
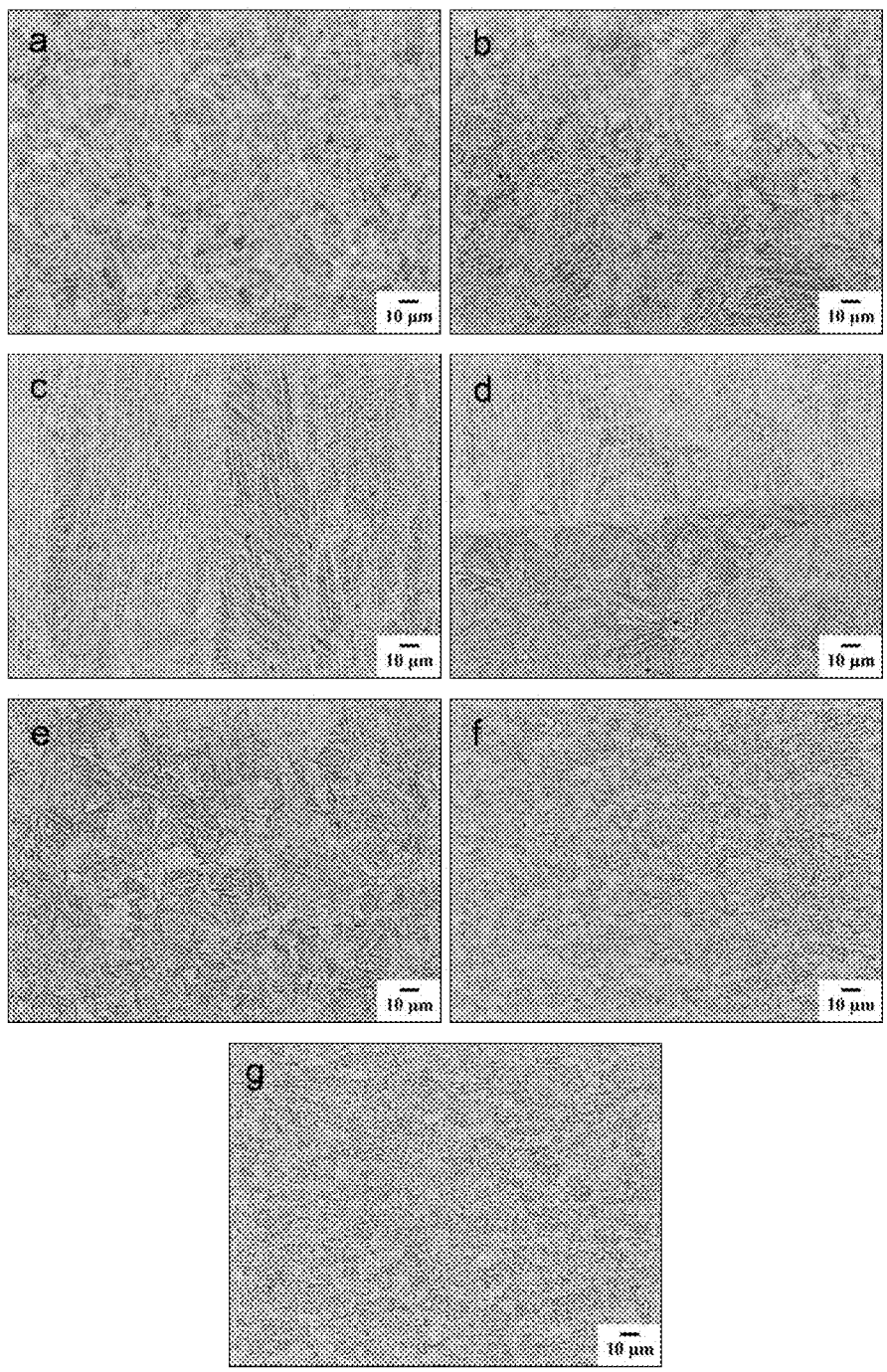
FIG. 60 SEM images of microstructure in the Alloy 8 to DP980 weld nugget; a) in the base metal of Alloy 8, b) at the interface between the base metal of Alloy 8 and the fusion zone c) in the fusion zone, d) at the interface between the fusion zone and the heat affected zone in DP980, e) in the heat affected zone in DP980, f) at the interface between the heat affected zone and the base metal of DP980, and g) in the base metal of DP980.

The weld parameters used to form the Alloy 8 to DP980 spot weld are listed in Table 38. A micrograph of the spot weld is shown in FIG. 58. Microhardness measurements were made across the weld nugget for which the results are listed in Table 39 and plotted in FIG. 59. Structural analysis was performed using a Zeiss MA-10 Scanning Electron Microscope (SEM). The microstructure of the Alloy 8 base metal is shown in FIG. 60*a*. The base metal of Alloy 8 interface with the fusion zone of the weld nugget is shown in FIG. 60*b*. There is a gradual transition of the fusion zone microstructure to Alloy 8 base metal microstructure with no microstructural evidence of the HAZ. The fusion zone microstructure of the weld is shown in FIG. 60*c*. The fusion zone interface with the heat affected zone in the DP980 steel is shown in FIG. 60*d*. The heat affected zone microstructure in the DP980 steel is shown in FIG. 60*e*. The heat affected zone interface with the base metal of DP980 steel is shown in FIG. 60*f*. The DP980 steel base metal microstructure is shown in FIG. 60*g*.

TABLE 38

Alloy 8 to DP980 Weld Lobe Parameters

| Parameter | Range |
|---|---|
| Clamping Force | 4.2 kN |
| Weld Time | 196 ms |
| Weld Current | 7.0 kA |
| Hold Time | 33 ms |

TABLE 39

Microhardness Measurement Data Across the Weld Nugget
After Spot Welding of Alloy 8 to DP980 Steel

| | Alloy 8 to DP980 | |
|---|---|---|
| Area of the Weld | Distance (mm) | HV (kg/mm$^2$) |
| Base Metal | −4.46 | 321 |
| (Alloy 8) | −4.19 | 365 |
| | −3.93 | 328 |
| | −3.65 | 326 |
| | −3.40 | 314 |
| Fusion Zone | −3.14 | 293 |
| | −2.88 | 401 |
| | −2.62 | 431 |
| | −2.35 | 422 |
| | −2.09 | 422 |
| | −1.83 | 399 |
| | −1.57 | 383 |
| | −1.31 | 431 |
| | −1.05 | 381 |
| | −0.79 | 419 |
| | −0.52 | 380 |
| | −0.27 | 364 |
| | 0.00 | 358 |
| | 0.26 | 391 |
| | 0.52 | 370 |
| | 0.77 | 371 |
| | 1.04 | 374 |
| | 1.30 | 386 |
| | 1.56 | 393 |
| | 1.82 | 398 |
| | 2.08 | 407 |
| HAZ | 2.33 | 326 |
| | 2.60 | 289 |
| Base Metal | 2.86 | 292 |
| (DP980) | 3.11 | 286 |
| | 3.37 | 285 |
| | 3.63 | 265 |
| | 3.89 | 269 |
| | 4.15 | 260 |

This Case Example shows that Alloy 8 can be spot welded to commercially produced DP980 using conventional spot welding technology. The resulting spot weld did not show a deleterious heat affected zone on the Alloy 8 interface with the fusion zone with microhardness value in sheet material adjacent to fusion zone slightly higher (from 314 to 365 HV) than the average value for the sheet material used (222 HV).

Case Example #7: Resistance Spot Welding—Alloy 8 to TRIP 700

Alloy 8 sheet with a thickness of ~1.4 mm and commercial sheet from TRIP 700 steel were used for welding trials. Alloy 8 sheet material for welding was used in annealed condition with ultimate tensile strength from 1141 to 1199 MPa, yield strength from 381 to 411 MPa, and tensile elongation from 44.2 to 61.8%. The average value of Vickers hardness of the sheet material used for welding was estimated to be 222 HV.

The spot welding system is schematically diagrammed in FIG. 5, which was by the MFDC method. It consisted of a Miyachi MFDC ISA-500 inverter power supply with controller that provided power to the primary coil to a RoMan 9.0 V DC transformer. The secondary coil power from the transformer was reduced in voltage thus increasing the current in order to do the actual spot welding through B nose electrodes that were dressed with a face diameter of 5.5 mm. The weld current was measured using a Miyachi mm-326B weld checker system for feedback control.

Figure 61:
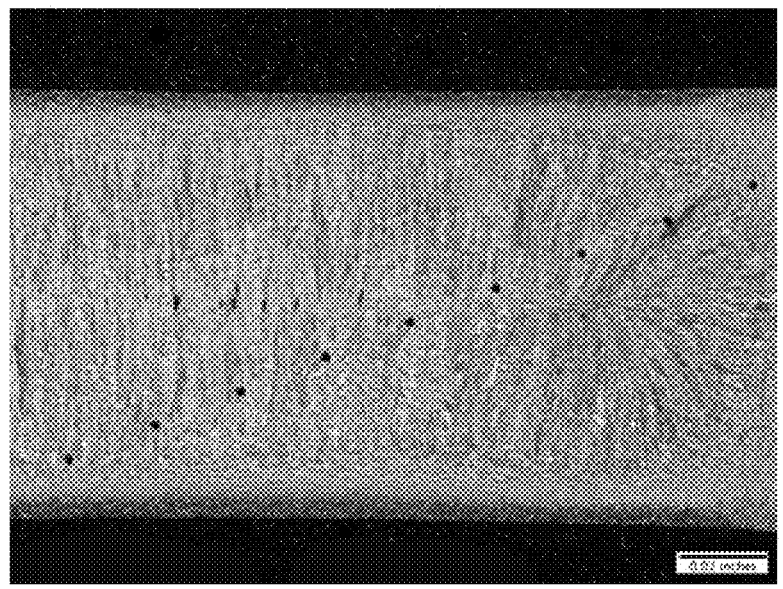
FIG. 61 A micrograph of the cross section of the spot weld nugget in the TRIP 700 self-to-self welded sample.
Figure 62:
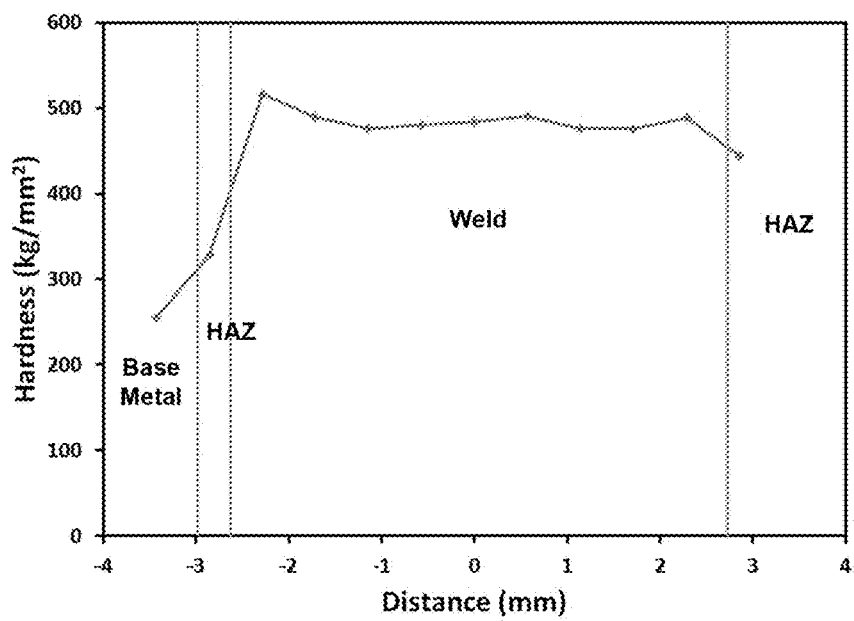
FIG. 62 Microhardness as a function of the distance across the spot weld nugget in the TRIP 700 self-to-self welded sample.
Figure 63:
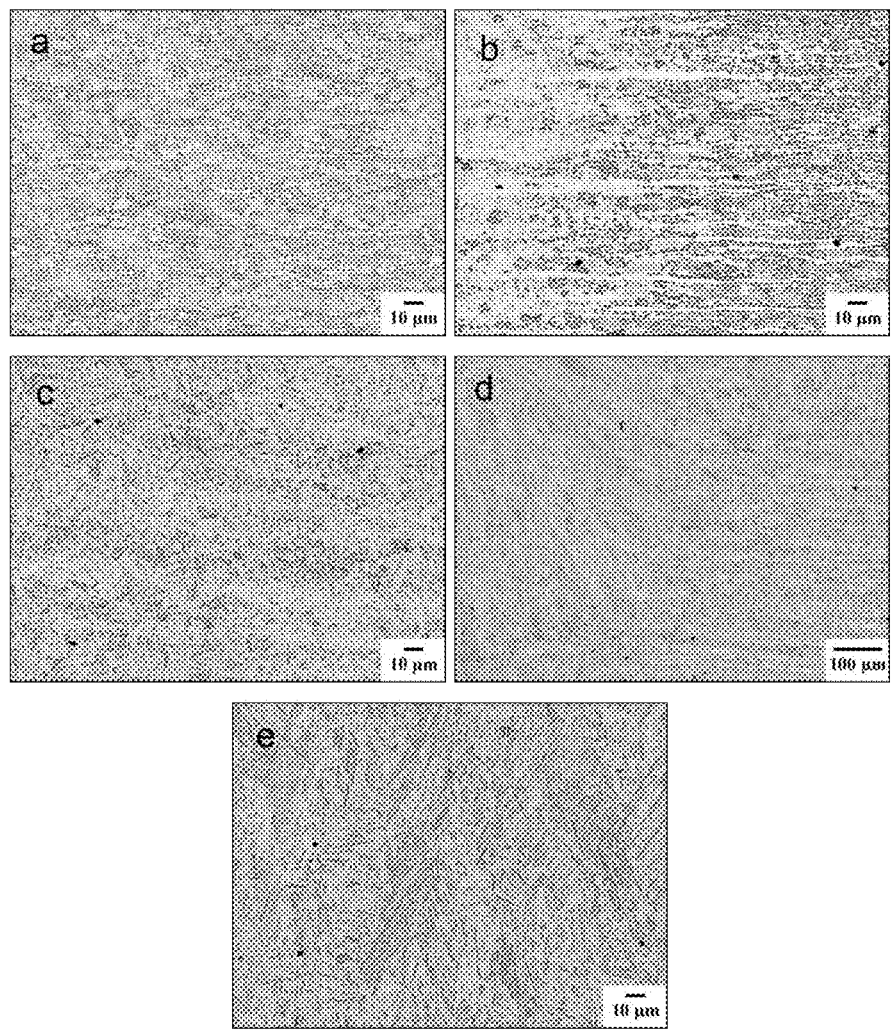
FIG. 63 SEM images of microstructure in the TRIP 700 self-to-self welded sample; a) in the base metal b) at the interface between the base metal and the heat affected zone, c) in the heat affected zone, d) at the interface between the heat affected zone and the fusion zone, and e) in the fusion zone.

An optimized self-to-self spot weld of TRIP 700 was first examined. The weld parameters used are listed in Table 40. A micrograph of the spot weld is shown in FIG. 61. Microhardness measurements were made across the weld nugget starting from the base metal through the HAZ and the fusion zone to the HAZ on another side of the nugget. The results are listed in Table 41 and plotted in FIG. 62. Examination of the cross section in a Zeiss MA-10 Scanning Electron Microscope (SEM) revealed distinct microstructural zones that are identified from the microhardness plot in FIG. 62. The base metal microstructure of TRIP 700 is shown in FIG. 63a. The interface of the base metal with heat affected zone is shown in FIG. 63b. The microstructure in the heat affected zone is shown in FIG. 63c. FIG. 63d shows the interface between the heat affected zone and the fusion zone. The fusion zone microstructure is shown in FIG. 63e.

TABLE 40

TRIP 700 Self-to-Self Spot Welding Parameters

| Parameter | Range |
|---|---|
| Clamping Force | 3.8 kN |
| Weld Time | 270 ms |
| Weld Current | 8.5 kA |

TABLE 41

Microhardness Measurement Data Across the Weld Nugget
After Self-To-Self Spot Welding of TRIP 700

| | TRIP 700 to TRIP 700 | |
|---|---|---|
| Area of the Weld | Distance (mm) | HV (kg/mm$^2$) |
| TRIP700 | −3.43 | 255 |
| HAZ | −2.86 | 329 |
| Fusion Zone | −2.29 | 517 |
| | −1.72 | 489 |
| | −1.14 | 476 |
| | −0.57 | 480 |
| | 0.00 | 484 |
| | 0.57 | 491 |
| | 1.14 | 476 |
| | 1.71 | 476 |
| | 2.29 | 488 |
| HAZ | 2.85 | 445 |

Figure 64:
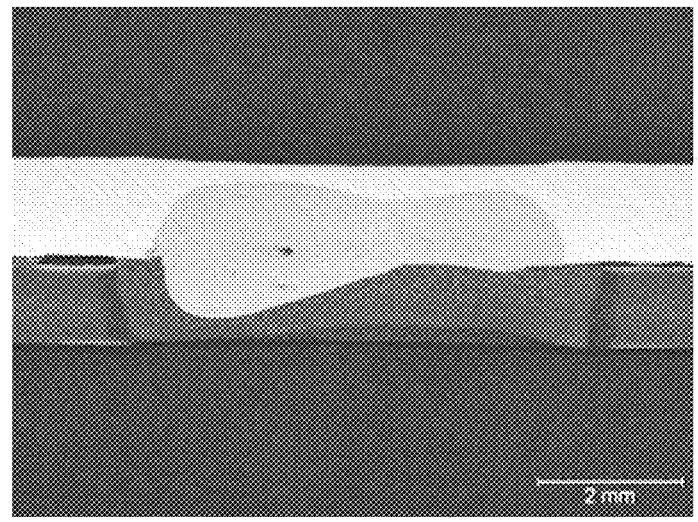
FIG. 64 Micrograph of the cross section of the Alloy 8 (top) to TRIP 700 (bottom) spot weld nugget.
Figure 65:
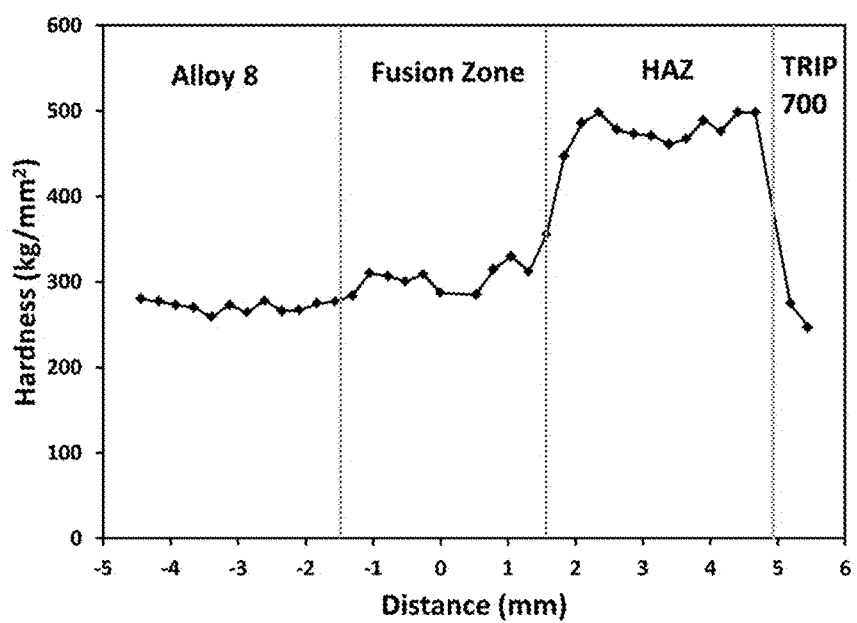
FIG. 65 Microhardness as a function of the distance across the Alloy 8 to TRIP 700 spot weld nugget.
Figure 66:
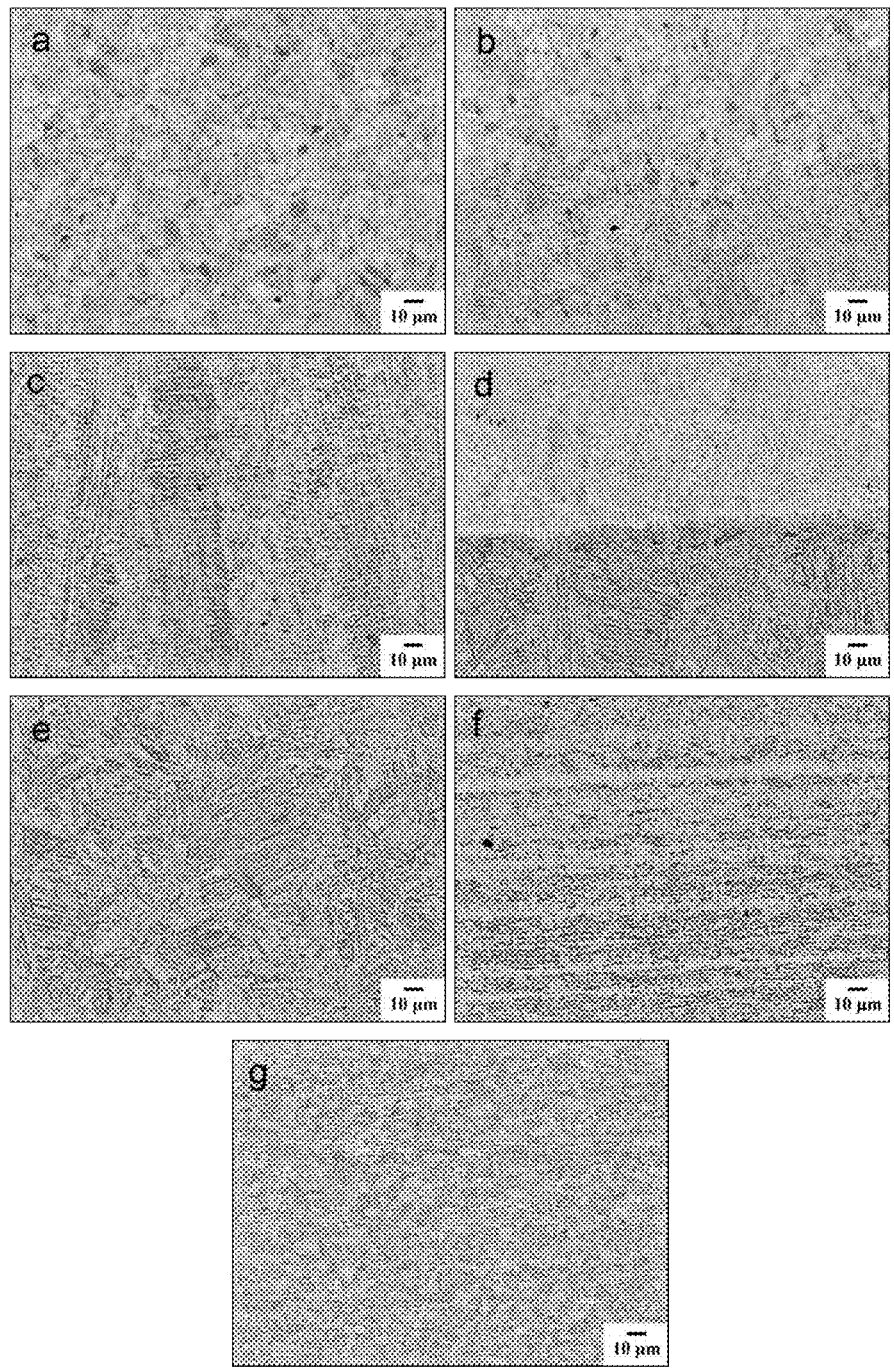
FIG. 66 SEM images of microstructure in the Alloy 8 to TRIP 700 weld nugget; a) in the base metal of Alloy 8, b) at the interface between the base metal of Alloy 8 and the fusion zone c) in the fusion zone, d) at the interface between the fusion zone and the heat affected zone in TRIP 700, e) in the heat affected zone in TRIP 700, f) at the interface between the heat affected zone and the base metal of TRIP 700, and g) in the base metal of TRIP 700.

The weld parameters used to form the Alloy 8 to TRIP 700 spot weld are listed in Table 42. A micrograph of the spot weld is shown in FIG. 64. Microhardness measurements were made across the cross section of the weld nugget from the base metal of Alloy 8 through the fusion zone to the base metal of TRIP 700 steel. The results are listed in Table 43 and plotted in FIG. 65. Structural analysis was performed using a Zeiss MA-10 Scanning Electron Microscope (SEM). The microstructure of the Alloy 8 base metal is shown in FIG. 66a. The base metal of Alloy 8 interface with the fusion zone of the weld nugget is shown in FIG. 66b. There is a gradual transition of the fusion zone microstructure to Alloy 8 base metal microstructure with no microstructural evidence of the HAZ. The fusion zone microstructure of the weld is shown in FIG. 66c. The fusion zone interface with the heat affected zone in the TRIP 700 steel is shown in FIG. 66d. The heat affected zone microstructure in the TRIP 700 steel is shown in FIG. 66e. The heat affected zone interface with the base metal of TRIP 700 steel is shown in FIG. 66f. The TRIP 700 steel base metal microstructure is shown in FIG. 66g.

TABLE 42

Alloy 8 to TRIP 700 Spot Welding Parameters

| Parameter | Range |
|---|---|
| Clamping Force | 4.2 kN |
| Weld Time | 196 ms |
| Weld Current | 7.6 kA |
| Hold Time | 33 ms |

TABLE 43

Microhardness Measurement Data Across the Weld Nugget After Spot Welding of Alloy 8 to TRIP 700 Steel

| | Alloy 8 to TRIP 700 | |
|---|---|---|
| Area of the Weld | Distance (mm) | HV (kg/mm$^2$) |
| Alloy 8 | −4.44 | 280 |
| | −4.18 | 277 |
| | −3.92 | 273 |
| | −3.65 | 270 |
| | −3.39 | 259 |
| | −3.13 | 273 |
| | −2.87 | 264 |
| | −2.61 | 278 |
| | −2.35 | 266 |
| | −2.09 | 267 |
| | −1.82 | 275 |
| | −1.57 | 277 |
| Fusion Zone | −1.31 | 284 |
| | −1.05 | 310 |
| | −0.78 | 307 |
| | −0.52 | 300 |
| | −0.26 | 309 |
| | 0.00 | 287 |
| | 0.53 | 285 |
| | 0.79 | 315 |
| | 1.05 | 330 |
| | 1.31 | 312 |
| HAZ | 1.57 | 356 |
| | 1.83 | 447 |
| | 2.09 | 486 |
| | 2.35 | 498 |
| | 2.61 | 478 |
| | 2.87 | 473 |
| | 3.13 | 471 |
| | 3.38 | 461 |
| | 3.65 | 467 |
| | 3.90 | 489 |
| | 4.15 | 476 |
| | 4.41 | 498 |
| | 4.67 | 498 |
| TRIP700 | 5.18 | 275 |
| | 5.44 | 247 |

This Case Example shows that Alloy 8 can be spot welded to commercially produced TRIP 700 using conventional spot welding technology. The resulting spot weld did not show a heat affected zone on the Alloy 8 interface. The microhardness measurements showed that value in sheet material adjacent to fusion zone slightly higher (from 259 to 280 HV) than the average value for the sheet material used (222 HV).

Case Example #8: Resistance Spot Welding—IF Steel Between Two Alloy 8 Sheets Alloy 8 sheet at 1.4 mm gauge and commercial sheet from IF steel were used for welding trial. Sheet material from Alloy 8 was used in two conditions, cold rolled and annealed and cold rolled and annealed and warm rolled. The cold rolled and annealed condition was achieved through annealing from 900 to 1100° C. Warm rolling was an additional step which then occurred at a temperature range from 150° C. to 250° C. and a rolling reduction range from 20 to 30% is called the hardened condition. Note that by either applying a cold rolling reduction or a warm rolling reduction such as the above, the yield strength properties of the alloys herein can be increased to achieve a hardened condition. The annealed Alloy 8 sheet with a thickness of ~1.4 mm had the following tensile properties; ultimate tensile strength from 1141 to 1199 MPa, yield strength from 381 to 411 MPa, and a tensile elongation from 44.2 to 61.8%. The hardened Alloy 8 sheet with a thickness of ~1.2 mm had the following tensile properties; ultimate tensile strength from 1566 to 1574 MPa, yield strength from 1025 to 1071 MPa, and a tensile elongation from 17.6 to 24.9%.

Figure 67:
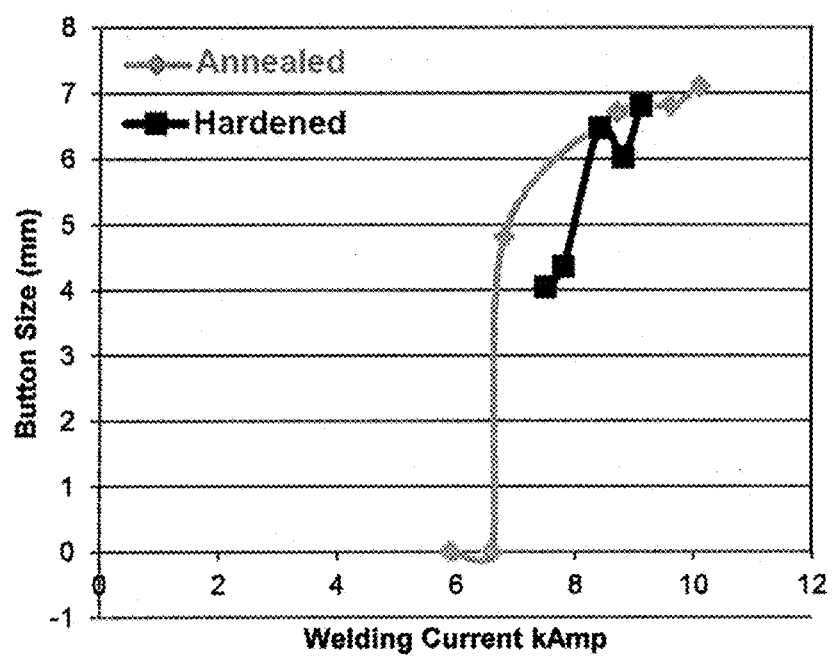
FIG. 67 A nugget size as a function of the spot welding current for Alloy 8 sheet material in two conditions welded to coated IF steel.

Sheet samples from the coil were used for three sheet thickness (3-$t$) testing to aggravate conditions that may produce liquid metal embrittlement (LME). A 1.0 mm thick sheet sample of IF galvannealed steel with Zn coating was welded between two sheet samples from Alloy 8 sheet in both conditions (annealed and hardened). The welds were done using b-nose electrode with 6-mm face under ~5 kN (1100-lbs) weld force with 5-degrees of planar tilt with respect to the electrode face to increase the tensile stress in weld joint. Welding was done to achieve a weld nugget size of 4√t and 5.5√t to assess LME susceptibility across the nugget size range. The samples were welded with the same current range. The nugget size as a function of welding current is shown in FIG. 67 for welded samples from Alloy 8 in both conditions.

Samples of cross section of the welds were examined for the presence of LME by optical microscopy in un-etched conditions and photographs were taken with polarized light to reveal grain size. The results for each experimental condition are listed in Table 44. Sample identification includes nugget size (4√t or 5.5√t); A or B refers to first and second sample from each material; L corresponds to annealed condition and H corresponds to hardened condition.

TABLE 44

Metallographic Analysis Results

| | | | | Crack Depth | |
|---|---|---|---|---|---|
| Sample | Alloy 8 Sheet | Nugget Size (mm) | LME Presence | (μm) | (% of sheet thickness) |
| A4L | Annealed | 4.8 | Yes | 145 | 10 |
| B4L | Annealed | 4.8 | No | — | — |
| A5.5L | Annealed | 6.7 | No | — | — |
| B5.5L | Annealed | 6.7 | No | — | — |
| A4H | Hardened | 4.2 | No | — | — |
| B4H | Hardened | 4.2 | Yes | 49 | 4.1 |
| A5.5H | Hardened | 6.1 | Yes | 160 | 13.3 |
| B5.5H | Hardened | 6.1 | No | — | — |

Figure 68:
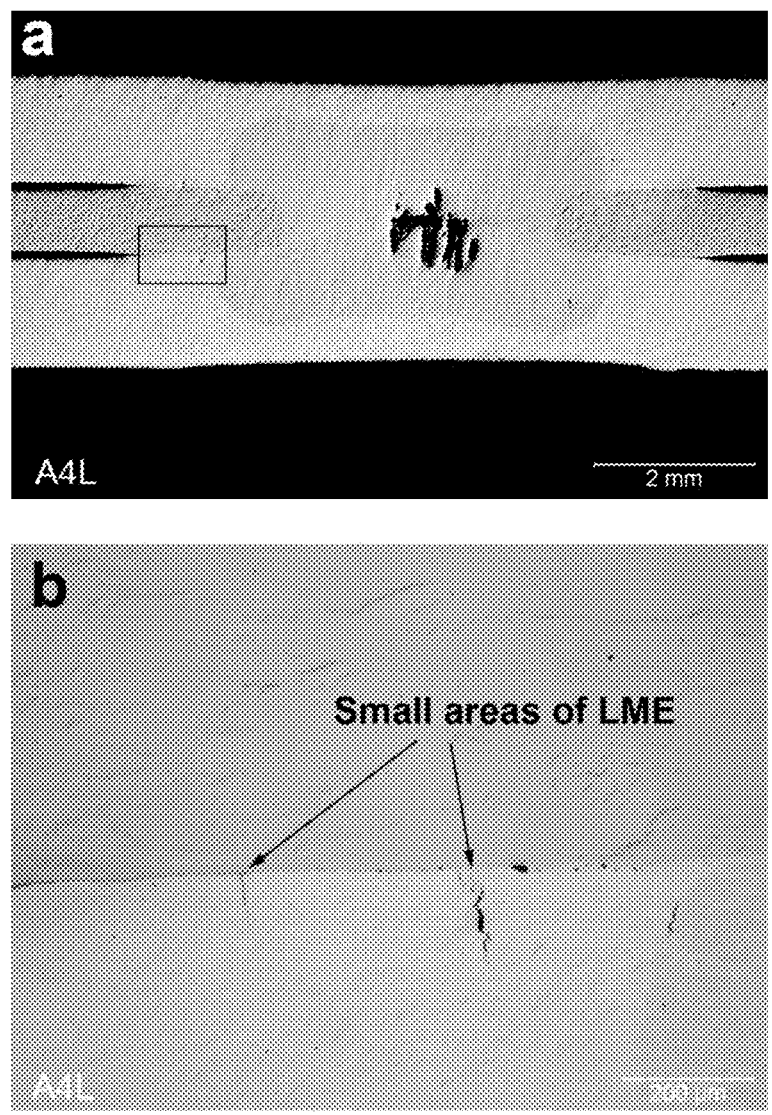
FIG. 68 Images of the nugget cross section in the first sample of IF steel sheet welded between two sheets from Alloy 8 in the annealed condition with the nugget size of 4√t; a) General view and b) Enlarged view of the area marked by a box in a).
Figure 69:
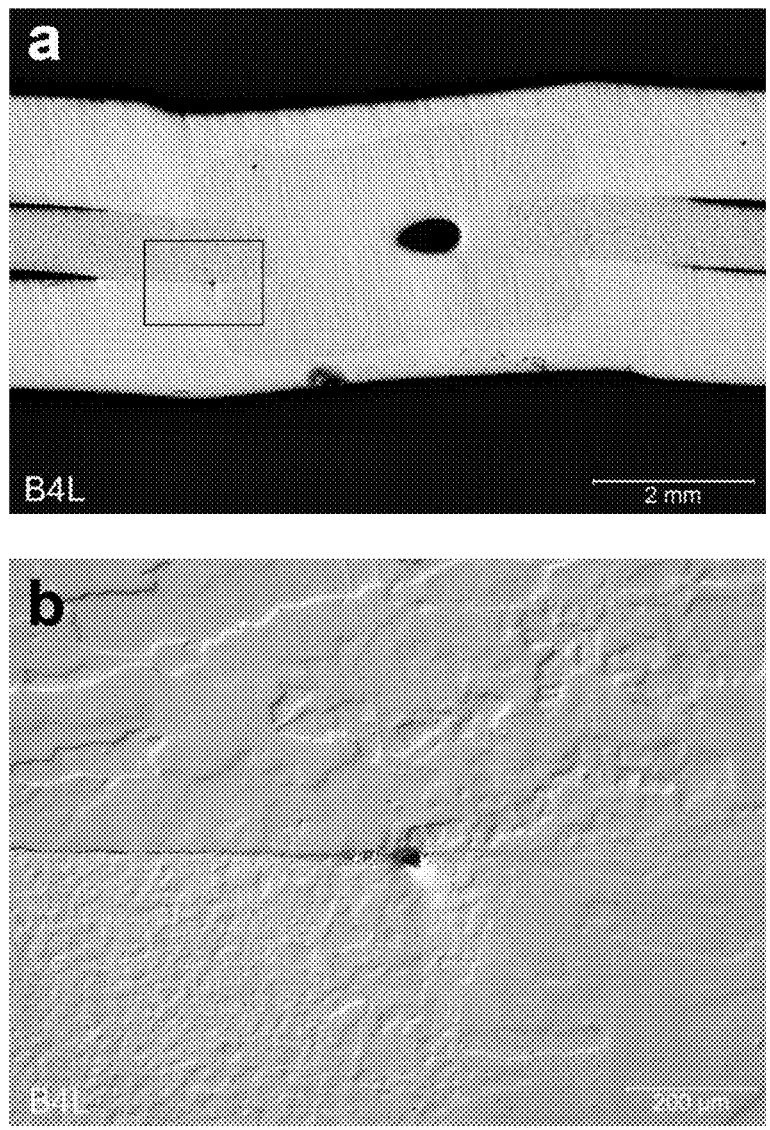
FIG. 69 Images of the nugget cross section in the second sample of IF steel sheet welded between two sheets from Alloy 8 in the annealed condition with the nugget size of 4√t; a) General view and b) Enlarged view of the area marked by a box in a).
Figure 70:
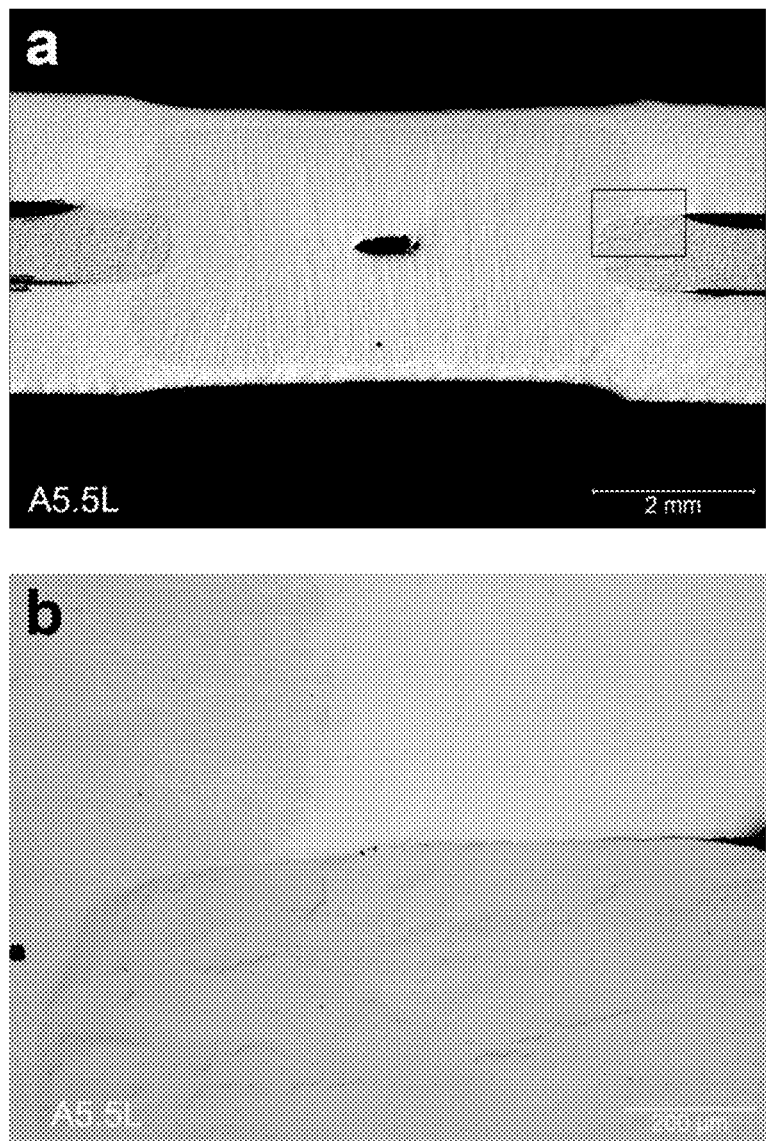
FIG. 70 Images of the nugget cross section in the first sample of IF steel sheet welded between two sheets from Alloy 8 in the annealed condition with the nugget size of 5.5√t; a) General view and b) Enlarged view of the area marked by a box in a).
Figure 71:
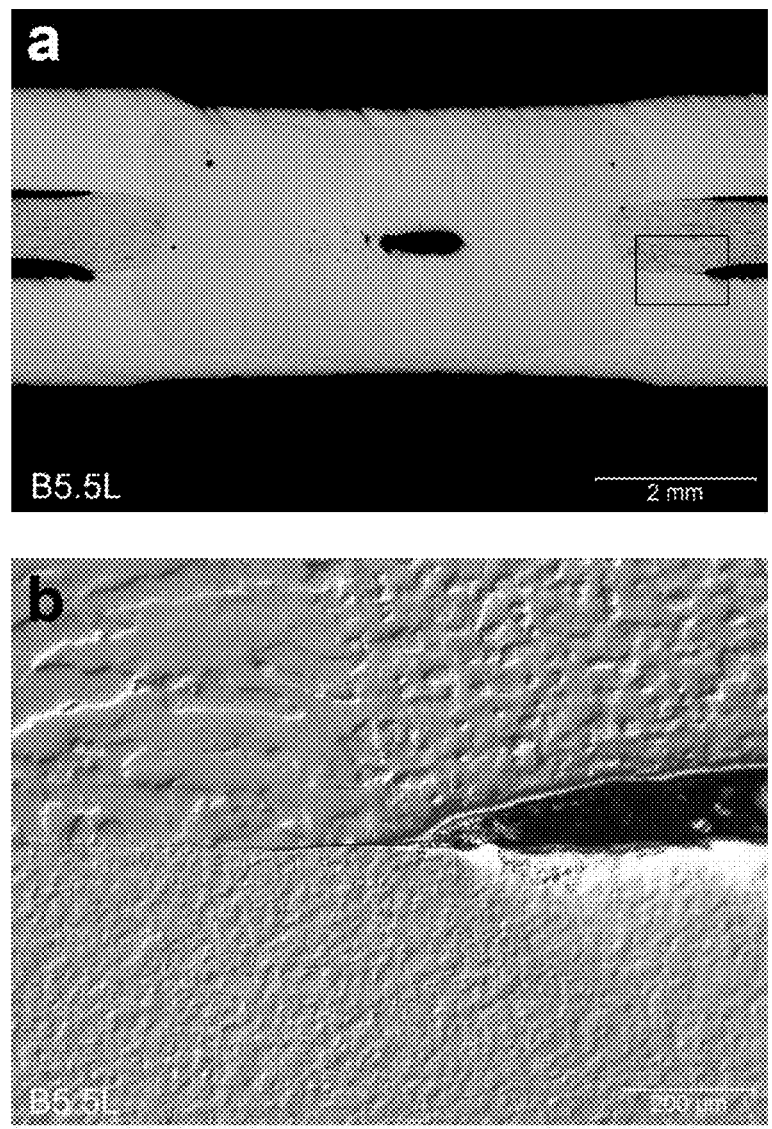
FIG. 71 Images of the nugget cross section in the second sample of IF steel sheet welded between two sheets from Alloy 8 in the annealed condition with the nugget size of 5.5√t; a) General view and b) Enlarged view of the area marked by a box in a).

A general view of the nugget in the A4L sample is shown in FIG. 68a. Shallow cracks of LME were found in this sample as shown in FIG. 68b. A general view of the nugget in the B4L sample is shown in FIG. 69a. Enlarged image of the area marked in FIG. 69a is shown in FIG. 69b. No LME observed in any corners of the weld in this sample. A general view of the nugget in the A5.5L sample is shown in FIG. 70a. Enlarged image of the area marked in FIG. 70a is shown in FIG. 70b. No cracks observed in any corners of the weld in this sample. A general view of the nugget in the B5.5L sample is shown in FIG. 71a. Enlarged image of the area marked in FIG. 71a is shown in FIG. 71b. No cracks observed in any corners of the weld in this sample.

Figure 72:
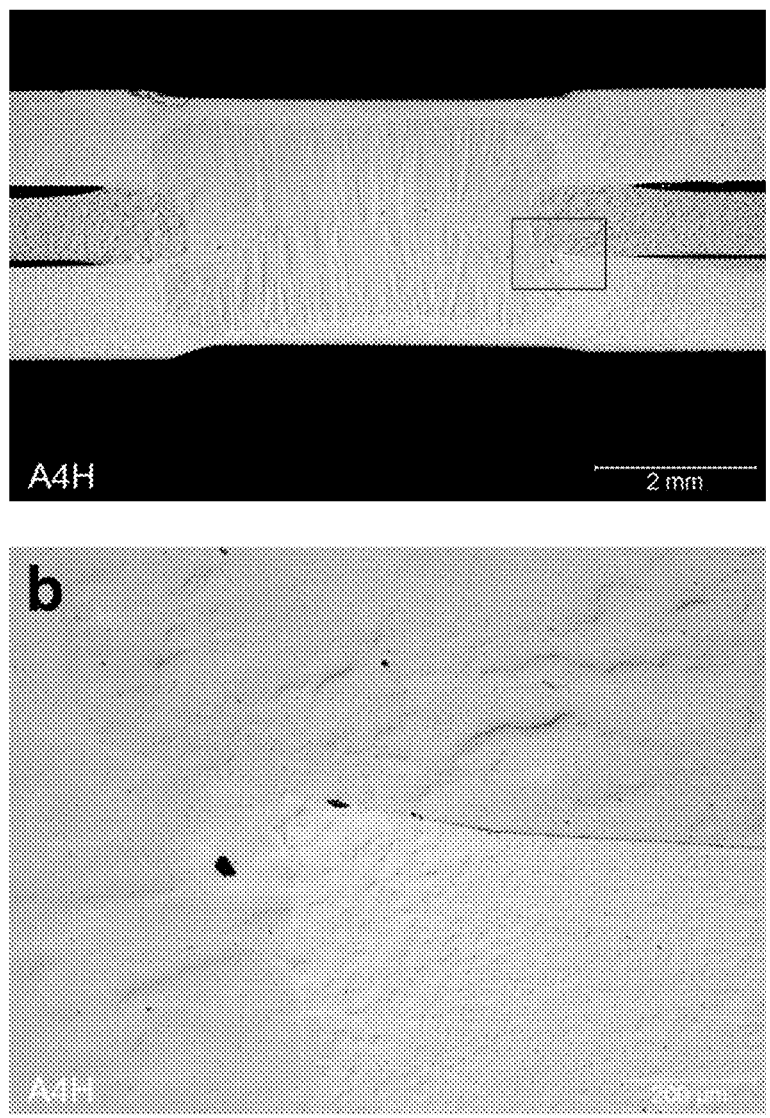
FIG. 72 Images of the nugget cross section in the first sample of IF steel sheet welded between two sheets from Alloy 8 in the hardened condition with the nugget size of 4√t; a) General view, b) Enlarged view of the area marked by a box in a).
Figure 73:
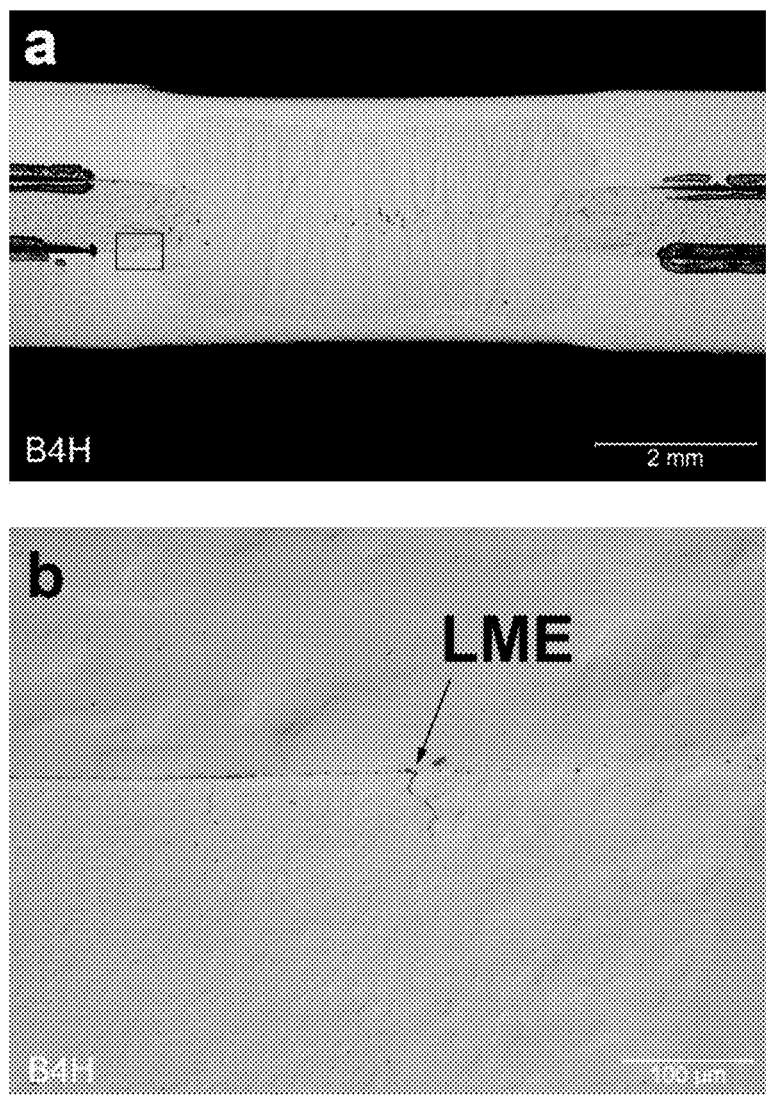
FIG. 73 Images of the nugget cross section in the second sample of IF steel sheet welded between two sheets from Alloy 8 in the hardened condition with the nugget size of 4√t; a) General view and b) Enlarged view of the area marked by a box in a).
Figure 74:
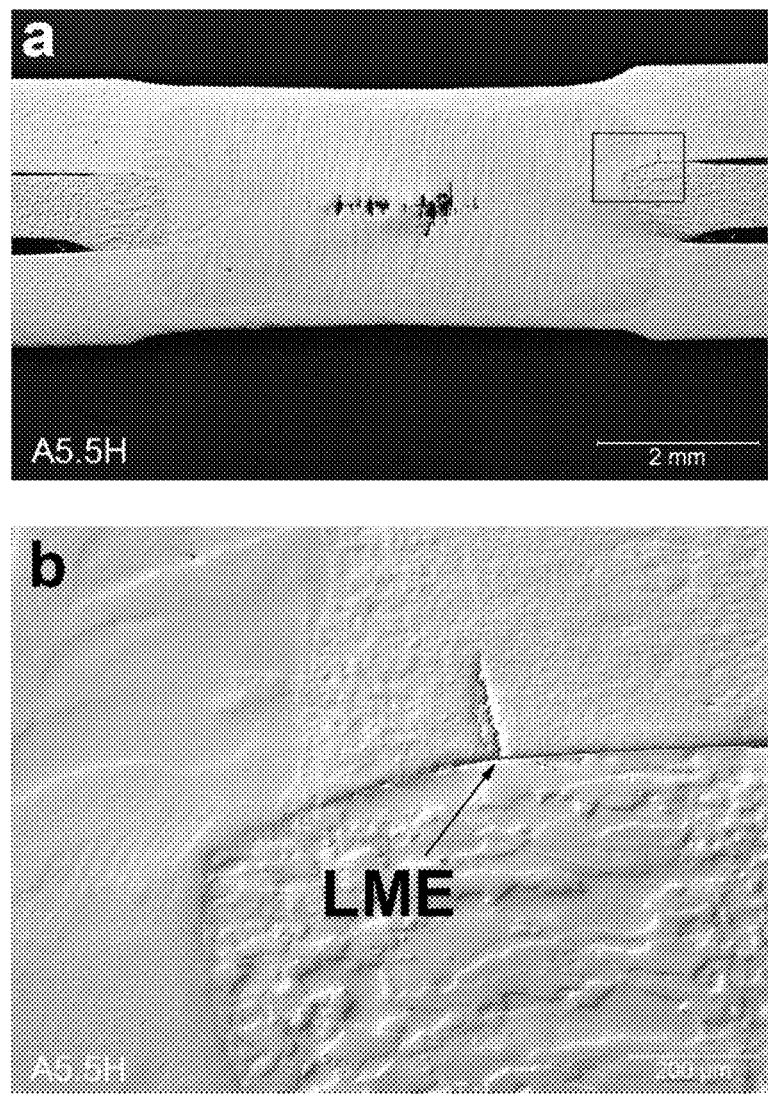
FIG. 74 Images of the nugget cross section in the first sample of IF steel sheet welded between two sheets from Alloy 8 in the hardened condition with the nugget size of 5.5√t; a) General view and b) Enlarged view of the area marked by a box in a).
Figure 75:
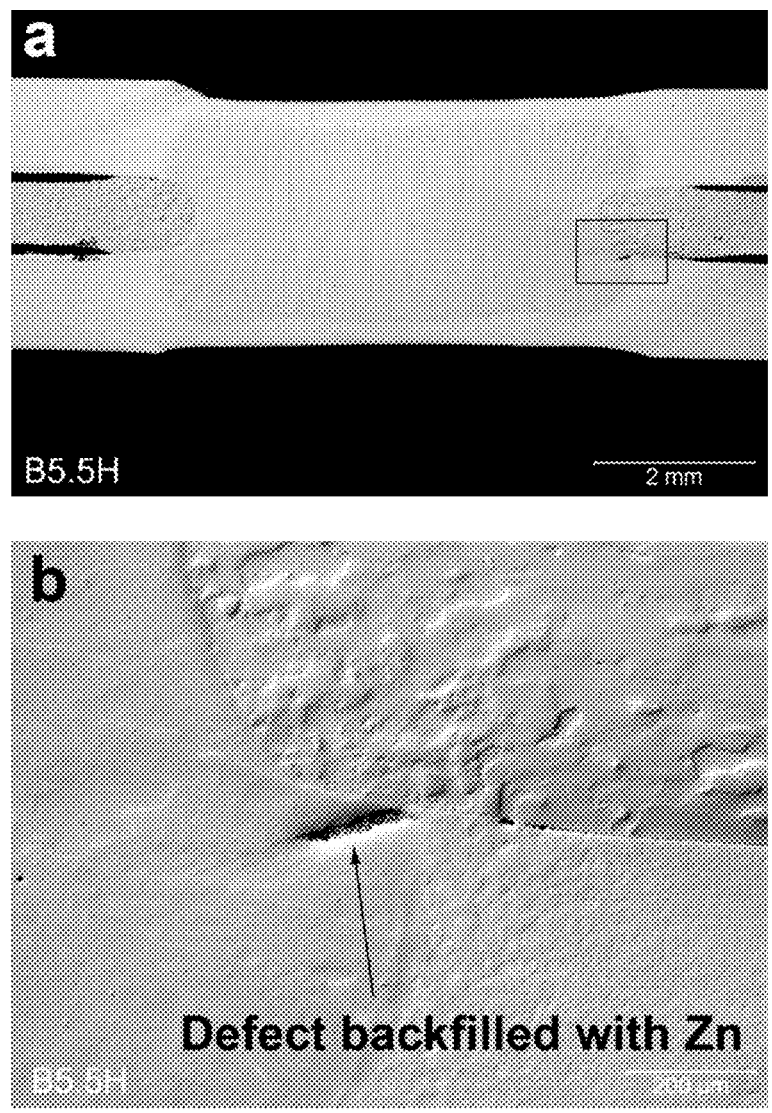
FIG. 75 Images of the nugget cross section in the second sample of IF steel sheet welded between two sheets from Alloy 8 in the hardened condition with the nugget size of 5.5√t; a) General view and b) Enlarged view of the area marked by a box in a).

Similar analysis was performed on the weld samples which utilized the hardened version of the Alloy 8 sheet. A general view of the nugget in the A4H sample is shown in FIG. 72a. Enlarged image of the area marked in FIG. 72a is shown in FIG. 72b. No cracks observed in any corners of the weld in this sample. A general view of the nugget in the B4H sample is shown in FIG. 73a. A very shallow LME crack was observed in this sample as shown in FIG. 73b. A general view of the nugget in the A5.5H sample is shown in FIG. 74a. A LME crack was observed in this sample at the edge of the area with grain growth in Alloy 8 sheet as shown in FIG. 74b. A general view of the nugget in the B5.5H sample is shown in FIG. 75a. A pore appears to form at the edge of the fusion zone that was backfilled with Zn as shown in FIG. 75b.

This Case Example demonstrates that Alloy 8 sheet material in annealed and hardened conditions during initial welding trial in a presence of Zn coating and without optimization produced welds showing high resistance to LME. In three out of eight samples, very shallow cracks of LME were found with penetration less than 15% of the material thickness.

Case Example #9: Resistance Spot Welding of Selected Alloys to DP980

Alloy 1, Alloy 3, Alloy 6, Alloy 9, and Alloy 15 sheet with a thickness of 1.2 mm were laboratory produced by casting of 50 mm thick slab and processing by hot rolling, cold rolling and annealing as described in the Main Body section of this application. The sheet material from alloys herein was joined to DP980 by melting and re-solidification process using spot welding method. Steel sheets were cleaned with a nylon mesh abrasive pad after heat treatment and prior to welding to reduce the quantity of surface oxide. H&H programmable spot welder with a P10 controller was used. The spot welding procedure started with two materials being clamped together for ⅙ of a second prior to welding. The welding was done using a single pulse weld with 40 cycles of 1/60 sec at 40% power level. After welding the sample remained clamped for ⅙ of a second to cool. The electrode diameter was 0.125 inches and the clamping force is approximately 850 lbs. The melted and re-solidified area of the joined sheets formed a fusion zone. Sheet material adjacent to the fusion zone that was affected by heat during welding corresponds to a heat affected zone (HAZ).

The welded samples were cut by EDM across the weld nuggets for microhardness measurements. Cross section samples were mounted in epoxy. The samples were polished progressively with 9 μm, 6 μm and 1 μm diamond suspension solution then finally with 0.02 μm silica solution. After polishing the cross section was etched with 2% Nital solution. Microhardness measurements as a function of distance across the weld nugget from the base metal of DP980 through the fusion zone to the base metal of alloys herein were done with the load of 500 g. The results of the microhardness measurement as a function of distance are listed in Table 45 through Table 49 for each alloy herein. The hardness difference between base metal of the alloys herein and the heat affected zone in the mixed metal welds is summarized in Table 50.

TABLE 45

Microhardness Measurement Data Across the Weld Nugget After Spot Welding of Alloy 1 to DP980 Steel

| Area of the Weld | Distance (mm) | HV (kg/mm$^2$) |
| --- | --- | --- |
| DP980 (Base) | 0 | 287 |
|  | 0.23 | 265 |
| Heat Affected Zone | 0.45 | 245 |
|  | 0.68 | 232 |
| Fusion Zone | 0.91 | 412 |
|  | 1.14 | 468 |
|  | 1.37 | 476 |
|  | 1.59 | 481 |
|  | 1.81 | 457 |
|  | 2.04 | 481 |
|  | 2.27 | 459 |
|  | 2.49 | 479 |
|  | 2.71 | 487 |
|  | 2.94 | 470 |
| Heat Affected Zone | 3.22 | 409 |
|  | 3.51 | 395 |
|  | 3.79 | 404 |
|  | 4.06 | 402 |
| Alloy 1 (Base Metal) | 4.34 | 287 |
|  | 4.61 | 270 |
|  | 4.89 | 302 |
|  | 5.15 | 325 |

TABLE 46

Microhardness Measurement Data Across the Weld Nugget After Spot Welding of Alloy 3 to DP980 Steel

| Area of the Weld | Distance (mm) | HV (kg/mm$^2$) |
| --- | --- | --- |
| DP980 (Base) | 0 | 291 |
|  | 0.20 | 191 |
| Heat Affected Zone | 0.40 | 252 |
| Fusion Zone | 0.60 | 254 |
|  | 0.80 | 265 |
|  | 1.01 | 269 |
|  | 1.21 | 250 |
|  | 1.42 | 246 |
|  | 1.61 | 260 |
|  | 1.81 | 238 |
|  | 2.01 | 263 |
|  | 2.21 | 258 |
|  | 2.41 | 254 |
| Heat Affected Zone | 2.62 | 366 |
|  | 2.83 | 372 |
|  | 3.04 | 365 |
|  | 3.25 | 389 |
|  | 3.46 | 404 |
|  | 3.67 | 363 |
| Alloy 3 (Base) | 3.87 | 321 |
|  | 4.07 | 258 |
|  | 4.27 | 274 |
|  | 4.48 | 291 |
|  | 4.69 | 310 |

TABLE 47

Microhardness Measurement Data Across the Weld Nugget After Spot Welding of Alloy 6 to DP980 Steel

| Area of the Weld | Distance (mm) | HV (kg/mm$^2$) |
| --- | --- | --- |
| DP980 (Base) | 0 | 271 |
|  | 0.19 | 264 |
| Heat Affected Zone | 0.41 | 216 |
| Fusion Zone | 0.61 | 462 |
|  | 0.81 | 479 |

TABLE 47-continued

Microhardness Measurement Data Across the Weld Nugget After Spot Welding of Alloy 6 to DP980 Steel

| Area of the Weld | Distance (mm) | HV (kg/mm$^2$) |
|---|---|---|
| | 1.02 | 366 |
| | 1.22 | 476 |
| | 1.42 | 485 |
| | 1.62 | 412 |
| | 1.83 | 438 |
| | 2.03 | 496 |
| | 2.23 | 468 |
| | 2.43 | 412 |
| Heat Affected Zone | 2.64 | 370 |
| | 2.85 | 407 |
| | 3.06 | 402 |
| | 3.27 | 392 |
| | 3.47 | 400 |
| | 3.69 | 386 |
| Alloy 6 (Base) | 3.89 | 281 |
| | 4.09 | 274 |
| | 4.29 | 294 |

TABLE 48

Microhardness Measurement Data Across the Weld Nugget After Spot Welding of Alloy 9 to DP980 Steel

| Area of the Weld | Distance (mm) | HV (kg/mm$^2$) |
|---|---|---|
| DP980 (Base) | 0 | 305 |
| Heat Affected Zone | 0.22 | 257 |
| | 0.43 | 273 |
| Fusion Zone | 0.64 | 276 |
| | 0.85 | 276 |
| | 1.06 | 281 |
| | 1.27 | 288 |
| | 1.49 | 238 |
| | 1.70 | 275 |
| | 1.91 | 285 |
| | 2.13 | 270 |
| Heat Affected Zone | 2.34 | 378 |
| | 2.61 | 389 |
| | 2.84 | 365 |
| | 3.06 | 378 |
| | 3.28 | 387 |
| Alloy 9 (Base) | 3.51 | 336 |

TABLE 49

Microhardness Measurement Data Across the Weld Nugget After Spot Welding of Alloy 15 to DP980 Steel

| Area of the Weld | Distance (mm) | HV (kg/mm$^2$) |
|---|---|---|
| DP980 (Base) | 0 | 305 |
| | 0.21 | 307 |
| | 0.41 | 297 |
| Heat Affected Zone | 0.62 | 313 |
| Fusion Zone | 0.83 | 298 |
| | 1.03 | 387 |
| | 1.23 | 399 |
| | 1.43 | 369 |
| | 1.63 | 372 |
| | 1.83 | 372 |
| | 2.00 | 363 |
| | 2.21 | 376 |
| | 2.41 | 366 |
| | 2.61 | 370 |
| | 2.81 | 379 |
| | 3.01 | 425 |

TABLE 49-continued

Microhardness Measurement Data Across the Weld Nugget After Spot Welding of Alloy 15 to DP980 Steel

| Area of the Weld | Distance (mm) | HV (kg/mm$^2$) |
|---|---|---|
| Heat Affected Zone | 3.22 | 392 |
| | 3.44 | 384 |
| | 3.65 | 395 |
| | 3.86 | 404 |
| | 4.07 | 402 |
| | 4.28 | 407 |
| Alloy 15 (Base) | 4.49 | 317 |
| | 4.70 | 255 |
| | 4.92 | 271 |

TABLE 50

A Summary on Microhardness of the Base Metal and the Heat Affected Zone

| Alloy | Average Microhardness (HV) of Base Metal (kg/mm$^2$) | Average Microhardness (HV) of HAZ (kg/mm$^2$) | Microhardness (HV) Difference of HAZ (kg/mm$^2$) |
|---|---|---|---|
| Alloy 1 | 296 | 403 | +107 |
| Alloy 3 | 291 | 385 | +94 |
| Alloy 6 | 283 | 393 | +110 |
| Alloy 9 | 336 | 397 | +61 |
| Alloy 15 | 281 | 397 | +116 |

This Case Example shows that alloys herein can be spot welded to commercially produced DP980 using conventional spot welding technology. The resulting spot welds did not show a deleterious heat affected zone on the alloy interface with the fusion zone. Microhardness values in the sheet material adjacent to the fusion zone corresponding to HAZ slightly higher than the average value for the sheet material used (from +61 to +116 HV).

What is claimed is:

1. A method for joining high strength sheet steel comprising:
   a. supplying a metal alloy consisting essentially of 70 to 90 atomic % iron, one or both of Ni and Cu, and at least two elements selected from Si, Mn, Cr, and C, and inevitable impurities, and melting said alloy and cooling at a rate of <250 K/s and solidifying to a thickness of 25 mm up to 500 mm and forming an alloy having a melting point Tm;
   b. processing said alloy into sheet form with thickness up to 5.0 mm with the sheet exhibiting a total elongation 10.0 to 75.0%, a yield strength 250 to 1200 MPa, a tensile strength 700 to 1700 MPa, and a hardness H1;
   c. welding said sheet self-to-self by heating and forming: (i) a fusion zone in said sheet at a temperature T1 above the alloy Tm, the fusion zone containing >50 volume % austenite; and (ii) a heat affected zone in said sheet at a temperature T2 that is less than the alloy Tm;
   d. cooling said sheet and forming a hardness H2 in said heat affected zone of said sheet wherein H2=H1+/−100 HV.

2. The method of claim 1 wherein said sheet has a thickness of 0.1 mm to 5.0 mm.

3. The method of claim 1 wherein said alloy formed in step (a) exhibits a Tm from 1250 and 1650° C.

4. The method of claim 1 wherein said alloy formed in step (b) exhibits H1 from 150 to 650 HV.

5. The method of claim 1 wherein said welding comprises one or more of resistance spot welding, resistance seam welding, upset welding, laser beam welding, or electron beam welding.

6. The method of claim 1 in step (c) wherein T1 is ≥1250° C. and less than 2500° C.

7. The method of claim 1 in step (c) wherein T2 is ≥400° C. and less than the melting temperature Tm of the alloy.

8. The method of claim 1 wherein said alloy contains both nickel and copper.

9. The method of claim 1 further comprising positioning said sheet formed in step (d) in a vehicular frame, vehicular chassis, or vehicular panel.

10. The method of claim 1 further comprising positioning said sheet formed in step (d) in a storage tank, freight car, or railway tank car including tank, jacket, or headshield.

11. A method for joining high strength sheet steel with other steel grades comprising:
   a. supplying a metal alloy consisting essentially of 70 to 90 atomic % iron, one or both of Ni and Cu, and at least two elements selected from Si, Mn, Cr, and C, and inevitable impurities, and melting said alloy and cooling at a rate of <250 K/s and solidifying to a thickness of 25 mm up to 500 mm and forming an alloy having a melting point Tm;
   b. processing said alloy into sheet form with thickness up to 5.0 mm with the sheet exhibiting a total elongation 10.0 to 75.0%, yield strength 250 to 1200 MPa, tensile strength 700 to 1700 MPa, and a hardness H1;
   c. welding said sheet to another steel by heating and forming: (i) a fusion zone in said sheet at a temperature T1 above the alloy Tm, said fusion zone containing >50 volume % austenite; and (ii) a heat affected zone in said sheet at a temperature T2 that is less than the alloy Tm; and
   d. cooling said sheet and forming a hardness H3 in said heat affected zone of said sheet wherein H3=H1+/−125 HV.

12. The method of claim 11 wherein said sheet has a thickness of 0.1 mm to 5.0 mm.

13. The method of claim 11 wherein said alloy formed in step (a) exhibits a Tm from 1250 and 1650° C.

14. The method of claim 11 wherein said alloy formed in step (b) exhibits H1 from 150 to 650 HV.

15. The method of claim 11 wherein said welding comprises one or more of resistance spot welding, resistance seam welding, upset welding, laser beam welding, or electron beam welding.

16. The method of claim 11 in step (c) wherein T1 is ≥1250° C. and less than 2500° C.

17. The method of claim 11 in step (c) wherein T2 is ≥400° C. and less than the melting temperature Tm of the alloy.

18. The method of claim 11 wherein said alloy contains both nickel and copper.

19. The method of claim 11 further comprising positioning the sheet formed in step (d) in a vehicular frame, vehicular chassis, or vehicular panel.

20. The method of claim 11 further comprising positioning the sheet formed in step (d) in a storage tank, freight car, or railway tank car including tank, jacket, or headshield.

21. A method for joining a coated high strength sheet steel comprising:
   a. supplying a metal alloy consisting essentially of 70 to 90 atomic % iron, one or both of Ni and Cu, and at least two elements selected from Si, Mn, Cr, and C, and inevitable impurities, and melting said alloy and cooling at a rate of <250 K/s and solidifying to a thickness of 25 mm up to 500 mm and forming an alloy having a melting point Tm;
   b. processing said alloy into sheet form with thickness L1, with the sheet exhibiting a total elongation 10.0 to 75.0%, a yield strength 250 to 1200 MPa, a tensile strength 700 to 1700 MPa;
   c. applying a zinc containing coating to said alloy sheet and forming a coated sheet;
   d. welding said coated sheet self-to-self or to other steels by heating and forming a fusion zone that contains >50 volume % austenite, wherein said other steels have uncoated surfaces or surfaces with zinc containing coatings;
   e. cooling to form a weld which: (1) is crack free; or (2) contains one or more cracks with the depth of the largest crack at L2, which is ≤15% of sheet thickness L1.

22. The method of claim 21 wherein said alloy formed in step (a) exhibits a Tm from 1250 and 1650° C.

23. The method of claim 21 wherein said coated alloy sheet in step (b) has a thickness of up to 5.0 mm.

24. The method of claim 21 wherein said alloy contains both nickel and copper.

25. The method of claim 21 wherein said alloy in step (c) has a zinc containing coating which is from 1 to 50 μm thick.

26. The method of claim 21 wherein said welding comprises one or more of resistance spot welding, resistance seam welding, upset welding, laser beam welding, or electron beam welding.

27. The method of claim 21 wherein said alloy containing a weld formed in step (e) exhibits a maximum crack depth L2 of 75 to 1500 μm.

28. The method of claim 21 wherein said cooled alloy containing a weld formed in step (e) is positioned in a vehicular frame, vehicular chassis, or vehicular panel.

29. The method of claim 21 wherein said cooled alloy containing a weld formed in step (e) is positioned in a storage tank, freight car, or railway tank car including tank, jacket, or headshield.

* * * * *